US009456232B2

(12) United States Patent
Yamashita

(10) Patent No.: US 9,456,232 B2
(45) Date of Patent: Sep. 27, 2016

(54) SIGNAL PROCESSING APPARATUS, SIGNAL PROCESSING METHOD, PROGRAM, AND SIGNAL TRANSMISSION SYSTEM

(71) Applicant: SONY CORPORATION, Minato-ku (JP)

(72) Inventor: Shigeyuki Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 114 days.

(21) Appl. No.: 14/477,375

(22) Filed: Sep. 4, 2014

(65) Prior Publication Data

US 2015/0101002 A1 Apr. 9, 2015

(30) Foreign Application Priority Data

Oct. 8, 2013 (JP) ................................. 2013-211186

(51) Int. Cl.
H04N 7/16 (2011.01)
H04N 21/236 (2011.01)
H04N 21/2389 (2011.01)

(52) U.S. Cl.
CPC .. *H04N 21/23602* (2013.01); *H04N 21/23895* (2013.01)

(58) Field of Classification Search
CPC ...................... H04N 21/234; H04N 21/23406; H04N 21/236; H04N 21/23602
See application file for complete search history.

(56) References Cited

U.S. PATENT DOCUMENTS

| 6,618,095 | B1 * | 9/2003 | Takeuchi | H04N 7/015 348/426.1 |
| 6,934,465 | B1 * | 8/2005 | Iwasaki | G11B 27/002 386/248 |
| 2002/0131509 | A1 * | 9/2002 | Otaka | H04N 5/919 375/240.26 |
| 2006/0210065 | A1 * | 9/2006 | Ito | H04N 21/2347 380/28 |
| 2006/0210254 | A1 * | 9/2006 | Yamashita | H04N 5/765 386/228 |
| 2007/0247549 | A1 * | 10/2007 | Jeong | H04N 19/70 348/471 |
| 2009/0213265 | A1 * | 8/2009 | Yamashita | H04N 5/08 348/500 |
| 2009/0244368 | A1 * | 10/2009 | Noguchi | H04N 5/268 348/448 |
| 2009/0256863 | A1 * | 10/2009 | Komorowski | G06T 3/4092 345/660 |
| 2009/0303385 | A1 * | 12/2009 | Yamashita | H04N 7/015 348/500 |

(Continued)

FOREIGN PATENT DOCUMENTS

JP 2012-244419 12/2012

*Primary Examiner* — Pankaj Kumar
*Assistant Examiner* — Timothy Newlin
(74) *Attorney, Agent, or Firm* — Oblon, McClelland, Maier & Neustadt, L.L.P.

(57) ABSTRACT

Provided is a signal processing apparatus, including: a mapping unit configured to map one of an 8K video signal and a 4K video signal into SDI data streams on a plurality of channels, the SDI data streams on the plurality of channels each conforming to a predetermined Serial Digital Interface (SDI) format; and multiplexing units configured to perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

20 Claims, 70 Drawing Sheets

(56) References Cited

U.S. PATENT DOCUMENTS

| | | | |
|---|---|---|---|
| 2010/0149412 A1* | 6/2010 | Yamashita | H04N 7/015 348/443 |
| 2011/0181781 A1* | 7/2011 | Oh | H04N 21/42646 348/565 |
| 2011/0211116 A1* | 9/2011 | Yamashita | H04N 5/225 348/455 |
| 2011/0273623 A1* | 11/2011 | Yamashita | H04N 7/181 348/723 |
| 2012/0189286 A1* | 7/2012 | Takayama | H04N 5/765 386/337 |
| 2012/0327302 A1* | 12/2012 | Halak | H04N 21/4305 348/571 |
| 2013/0265461 A1* | 10/2013 | Kano | G06T 3/4015 348/222.1 |
| 2014/0026177 A1* | 1/2014 | Hashiguchi | H04N 21/6156 725/129 |
| 2014/0282804 A1* | 9/2014 | Bowler | H04B 10/25751 725/129 |

* cited by examiner

| System category | System name | Luminance or number of R'G'B' samples per active line | Number of active lines per frame | Frame rate (Hz) |
|---|---|---|---|---|
| UHDTV1 | 3840 × 2160/23.98/P | 3840 | 2160 | 24/1.001 |
| | 3840 × 2160/24/P | 3840 | 2160 | 24 |
| | 3840 × 2160/25/P | 3840 | 2160 | 25 |
| | 3840 × 2160/29.97/P | 3840 | 2160 | 30/1.001 |
| | 3840 × 2160/30/P | 3840 | 2160 | 30 |
| | 3840 × 2160/50/P | 3840 | 2160 | 50 |
| | 3840 × 2160/59.94/P | 3840 | 2160 | 60/1.001 |
| | 3840 × 2160/60/P | 3840 | 2160 | 60 |
| UHDTV2 | 7680 × 4320/23.98/P | 7680 | 4320 | 24/1.001 |
| | 7680 × 4320/24/P | 7680 | 4320 | 24 |
| | 7680 × 4320/25/P | 7680 | 4320 | 25 |
| | 7680 × 4320/29.97/P | 7680 | 4320 | 30/1.001 |
| | 7680 × 4320/30/P | 7680 | 4320 | 30 |
| | 7680 × 4320/50/P | 7680 | 4320 | 50 |
| | 7680 × 4320/59.94/P | 7680 | 4320 | 60/1.001 |
| | 7680 × 4320/60/P | 7680 | 4320 | 60 |

FIG.1

FIG.3A  R'G'B' or Y'C$_B$'C$_R$' 4:4:4 system
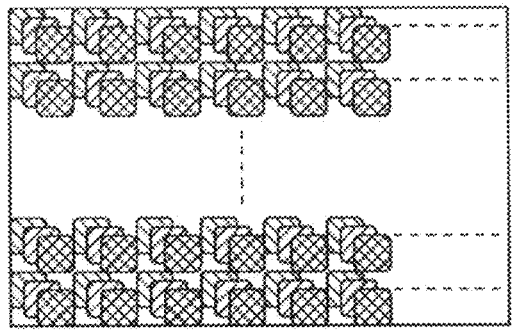
- R' or C$_R$' component
- G' or Y' component
- B' or C$_B$' component
FIG.3B  Y'C$_B$'C$_R$' 4:2:2 system
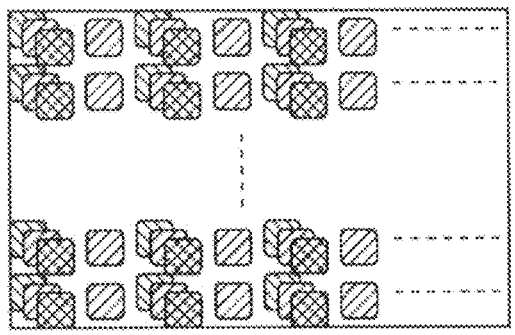
- R' or C$_R$' component
- G' or Y' component
- B' or C$_B$' component
FIG.3C  Y'C$_B$'C$_R$' 4:2:0 system
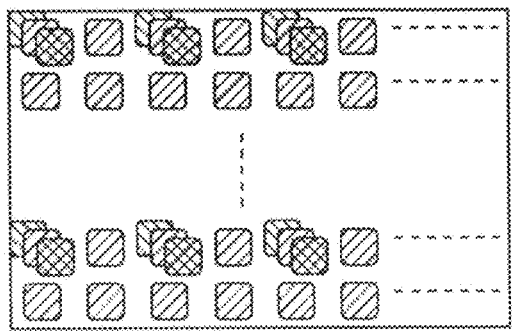
- R' or C$_R$' component
- G' or Y' component
- B' or C$_B$' component

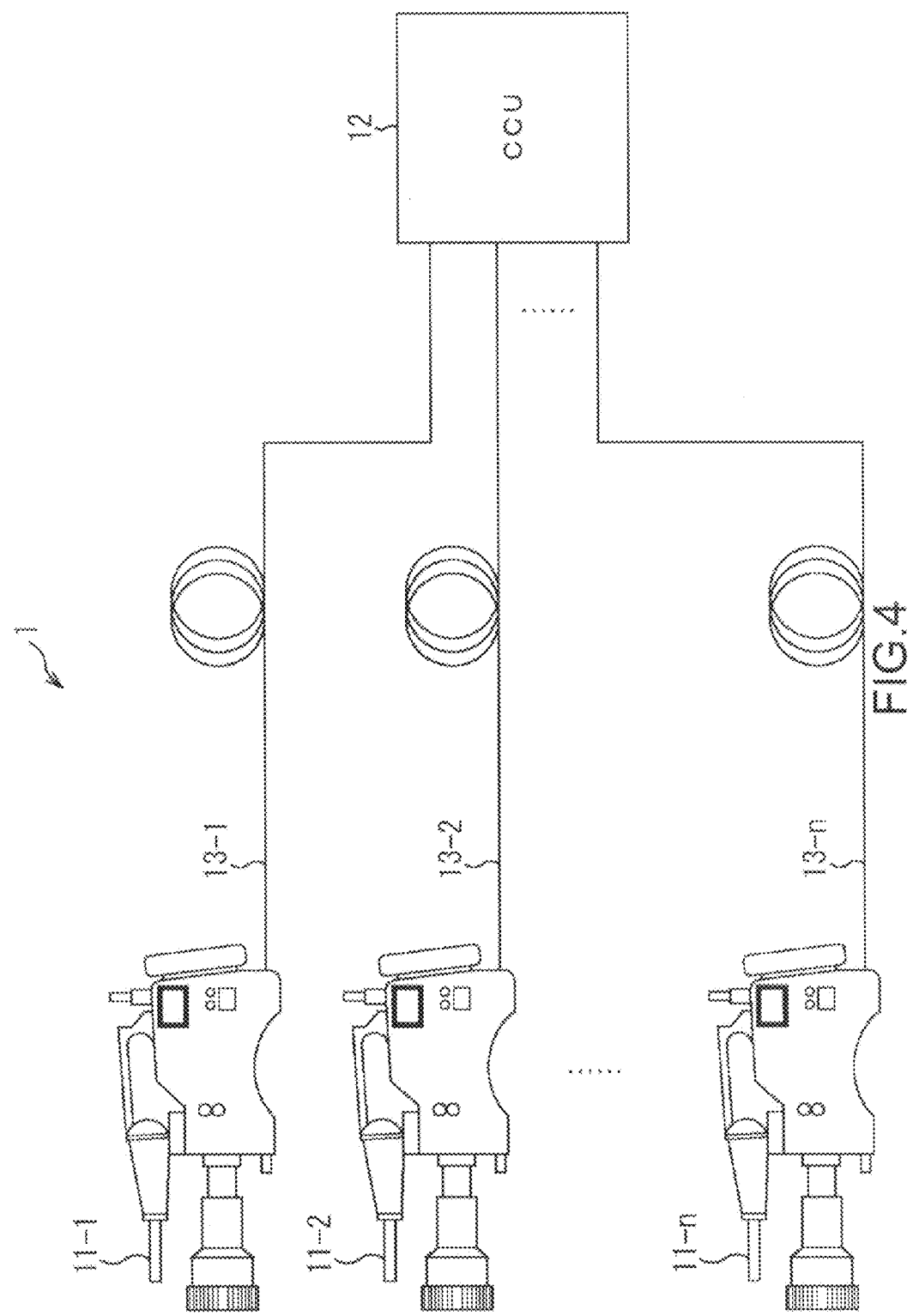

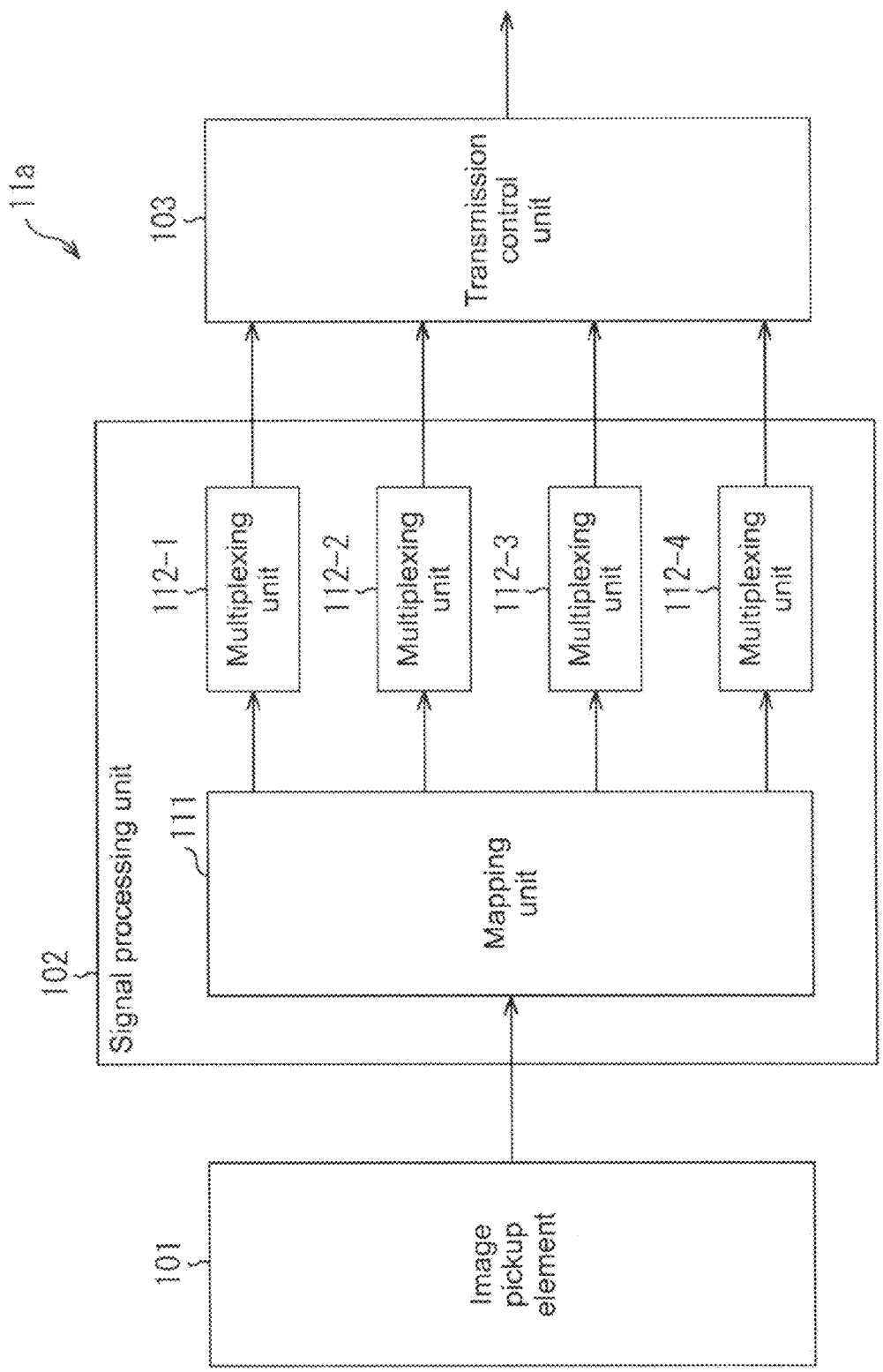

Ch1 — Scrambling

Ch2 — 8B/10B conversion

Ch3 — Scrambling

Ch4 — 8B/10B conversion

Ch16 — 8B/10B conversion

Ch1 [grid] 8B/10B conversion

Ch2 [grid] 8B/10B conversion

Ch3 [grid] 8B/10B conversion

Ch4 [grid] 8B/10B conversion

Ch5 [grid] 8B/10B conversion

Ch6 [grid] 8B/10B conversion

FIG.67

FIG. 68

# SIGNAL PROCESSING APPARATUS, SIGNAL PROCESSING METHOD, PROGRAM, AND SIGNAL TRANSMISSION SYSTEM

CROSS REFERENCE TO RELATED APPLICATIONS

This application claims the benefit of Japanese Priority Patent Application JP 2013-211186 filed Oct. 8, 2013, the entire contents of which are incorporated herein by reference.

BACKGROUND

The present technology relates to a signal processing apparatus, a signal processing apparatus, a signal processing method, a program, and a signal transmission system. More specifically, the present technology relates to a signal processing apparatus, a signal processing apparatus, a signal processing method, a program, and a signal transmission system that are suited to transmission of 8K or 4K video signals via a 100 Gigabit Ethernet device (Ethernet is a trademark).

In related art, there has been progress in development of a reception system and an imaging system for ultra-high-definition video signals that are higher in definition than existing high definition (HD) video signals for frames each having a size of 1,920 samples×1,080 lines. Specifically, international organizations such as ITU (International Telecommunication Union) and SMPTE (Society of Motion Picture and Television Engineers) have been standardizing next-generation broadcasting systems for 8K or 4K video signals corresponding to pixels that are 16 times or 4 times as large in number as pixels of the existing HD. Further, among video standards of the 8K or 4K video signals, video standards standardized by ITU are referred to as LSDI (Large Screen Digital Imagery), and video standards proposed to SMPTE are referred to as UHDTV. Specifically, video signals of the UHDTV are specified as shown in FIG. 1.

Further, ITU-R Recommendation BT.2020 was approved on October, 2012, and parameters of a wide color gamut and a frame rate of 120P were added to a UHDTV signal standard. SMPTE has carried out procedure for revising SMPTE 2036-1 so as to add those parameters thereto.

In addition, in related art, there has been disclosed a technology of serial transmission of UHDTV video signals corresponding to frame rates higher than 50P-60P via an HD-SDI interface or a 10 Gbps serial interface (for example, Japanese Patent Application Laid-open No. 2012-244419).

SUMMARY

Incidentally, IEEE 802.3ba, which is a standard of the Ethernet (40 GbE and 100 GbE) corresponding to maximum transmission rates of 40 Gigabit/second (40 Gbps) and 100 Gigabit/second (100 Gbps), was approved in 2010. Under the circumstances, there have been demands to enable the 8K or 4K video signals to be transmitted via 100 GbE devices (such as optical module).

There is a need to enable transmission of an 8K or 4K video signal via 100 GbE devices.

According to a first embodiment of the present technology, there is provided a signal processing apparatus, including:

a mapping unit configured to map one of an 8K video signal and a 4K video signal into (Serial Digital Interface) (SDI) data streams on a plurality of channels, the SDI data streams on the plurality of channels each conforming to a predetermined SDI format; and multiplexing units configured to perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

The mapping unit can be made to map one of
an 8K video signal of 48P-60P/4:4:4/10 bits,
an 8K video signal of 48P-60P/4:4:4/12 bits, and
an 8K video signal of 48P-60P/4:2:2/12 bits into one of
first SDI data streams on 64 channels, the first SDI data streams on the 64 channels each conforming to an HD-SDI format, and
second SDI data streams on 32 channels, the second SDI data streams on the 32 channels each conforming to a 3G-SDI format, and
the multiplexing units each can be made to
perform the 8B/10B conversion in units of 40 bits of the one of
the first SDI data streams on any one of odd-numbered channels and even-numbered channels of the 64 channels, and
the second SDI data streams on any one of odd-numbered channels and even-numbered channels of the 32 channels,
extract 32-bit data items from each of the units of 40 bits of the one of
the first SDI data streams on another of the odd-numbered channels and the even-numbered channels of the 64 channels, and
the second SDI data streams on another of the odd-numbered channels and the even-numbered channels of the 32 channels,
perform the 8B/10B conversion of the extracted 32-bit data items, and
multiplex the one of
the first SDI data streams on both the odd-numbered channels and the even-numbered channels of the 64 channels subjected to the 8B/10B conversion, and
the second SDI data streams on both the odd-numbered channels and the even-numbered channels of the 32 channels subjected to the 8B/10B conversion. In this way, serial data streams in four lanes can be generated as the serial data streams in the plurality of lanes.

The mapping unit can be made to map an 8K video signal of 48P-60P/4:2:2/10 bits into one of
first SDI data streams on 32 channels, the first SDI data streams on the 32 channels each conforming to an HD-SDI format, and
second SDI data streams on 16 channels, the second SDI data streams on the 16 channels each conforming to a 3G-SDI format, and
the multiplexing units each can be made to
perform the 8B/10B conversion in units of 40 bits of the one of
the first SDI data streams on any one of odd-numbered channels and even-numbered channels of the 32 channels, and the second SDI data streams on any one of odd-numbered channels and even-numbered channels of the 16 channels,
perform scrambling in each of the units of 40 bits of the one of
   the first SDI data streams on another of the odd-numbered channels and the even-numbered channels of the 32 channels, and
   the second SDI data streams on another of the odd-numbered channels and the even-numbered channels of the 16 channels, and
multiplex the one of
   the first SDI data streams on both the odd-numbered channels and the even-numbered channels of the 32 channels respectively subjected to corresponding ones of the 8B/10B conversion and the scrambling, and
   the second SDI data streams on both the odd-numbered channels and the even-numbered channels of the 16 channels respectively subjected to corresponding ones of the 8B/10B conversion and the scrambling. In this way, serial data streams in two lanes can be generated as the serial data streams in the plurality of lanes.

The mapping unit can be made to map one of
an 8K video signal of 48P-60P/4:4:4/10 bits,
an 8K video signal of 48P-60P/4:4:4/12 bits, and
an 8K video signal of 48P-60P/4:2:2/12 bits into one of
   first SDI data streams on 64 channels, the first SDI data streams each conforming to an HD-SDI format, and
   second SDI data streams on 32 channels, the second SDI data streams each conforming to a 3G-SDI format, and
the multiplexing units each can be made to
perform scrambling in units of 40 bits of the one of
   the first SDI data streams on any one of odd-numbered channels and even-numbered channels of the 64 channels, and
   the second SDI data streams on any one of odd-numbered channels and even-numbered channels of the 32 channels,
extract 32-bit data items from each of the units of 40 bits of the one of
   the first SDI data streams on another of the odd-numbered channels and the even-numbered channels of the 64 channels, and
   the second SDI data streams on another of the odd-numbered channels and the even-numbered channels of the 32 channels,
perform the 8B/10B conversion of the extracted 32-bit data items, and
multiplex the one of
   the first SDI data streams on both the odd-numbered channels and the even-numbered channels of the 64 channels respectively subjected to corresponding ones of the scrambling and the 8B/10B conversion, and
   the second SDI data streams on both the odd-numbered channels and the even-numbered channels of the 32 channels respectively subjected to corresponding ones of the scrambling and the 8B/10B conversion. In this way, serial data streams in four lanes can be generated as the serial data streams in the plurality of lanes.

The mapping unit can be made to map a 4K RAW signal of 48P-60P/4:4:4/16 bits into one of
   first SDI data streams on 32 channels, the first SDI data streams on the 32 channels each conforming to an HD-SDI format, and
   second SDI data streams on 16 channels, the second SDI data streams on the 16 channels each conforming to a 3G-SDI format, and
the multiplexing units each can be made to
perform the 8B/10B conversion in units of 40 bits of the one of
   the first SDI data streams on any one of odd-numbered channels and even-numbered channels of the 32 channels, and
   the second SDI data streams on any one of odd-numbered channels and even-numbered channels of the 16 channels,
extract 32-bit data items from each of the units of 40 bits of the one of
   the first SDI data streams on another of the odd-numbered channels and the even-numbered channels of the 32 channels, and
   the second SDI data streams on another of the odd-numbered channels and the even-numbered channels of the 16 channels,
perform the 8B/10B conversion of the extracted 32-bit data items, and
multiplex the one of
   the first SDI data streams on both the odd-numbered channels and the even-numbered channels of the 32 channels subjected to the 8B/10B conversion, and
   the second SDI data streams on both the odd-numbered channels and the even-numbered channels of the 16 channels subjected to the 8B/10B conversion. In this way, serial data streams in two lanes can be generated as the serial data streams in the plurality of lanes.

The mapping unit can be made to map one of
an 8K video signal at 96P-120P and
a 4K video signal at 96P-120P
into the SDI data streams on the plurality of channels in units of two frames.

The mapping unit can be made to map one of
an 8K video signal of 50P-60P/4:4:4/10 bits and
an 8K video signal of 50P-60P/4:4:4/12 bits into SDI data streams on 48 channels as the SDI data streams on the plurality of channels, the SDI data streams on the 48 channels each having a 12-bit word length, and
the multiplexing units each can be made to
perform the 8B/10B conversion in units of 48 bits of the SDI data streams on the 48 channels, and
multiplex the SDI data streams on the 48 channels subjected to the 8B/10B conversion. In this way, serial data streams in four lanes can be generated as the serial data streams in the plurality of lanes.

The mapping unit can be made to map one of
an 8K video signal of 100P-120P/4:4:4/10 bits and
an 8K video signal of 100P-120P/4:4:4/12 bits into SDI data streams on 48 channels as the SDI data streams on the plurality of channels, the SDI data streams on the 48 channels each having a 12-bit word length, and
the multiplexing units each can be made to
perform the 8B/10B conversion in units of 48 bits of the SDI data streams on the 48 channels, and
multiplex the SDI data streams on the 48 channels subjected to the 8B/10B conversion. In this way, serial data streams in eight lanes can be generated as the serial data streams in the plurality of lanes.

The multiplexing units can be provided as many as the number of lanes of the serial data streams in the plurality of lanes, and
the multiplexing units each can include
a plurality of signal processing units configured to
allow the SDI data streams on the plurality of channels to be input respectively to the plurality of signal processing units,
perform one of the 8B/10B conversion and the scrambling of the input SDI data streams on the plurality of channels in the units of the predetermined bit, to thereby generate predetermined-bit data blocks,
a data stream generating unit configured to generate a parallel data stream having a predetermined word length by multiplexing, in a predetermined order, the predetermined-bit data blocks generated by the plurality of signal processing units, and
a parallel/serial conversion unit configured to perform parallel/serial conversion of the parallel data stream, to thereby generate the serial data streams in the plurality of lanes.

The plurality of signal processing units can be made to execute processes in synchronization with one of a clock signal of 148.5 MHz and a clock signal of 148.5/1.001 MHz, and
output data of a total of 720 bits in each set of four clocks, the data stream generating unit can be made to
operate in synchronization with a clock signal of x MHz, and
output one of parallel data of 180 bits×148.5 MHz÷x MHz (bits) and parallel data of 180 bits×148.5/1.001 MHz÷x MHz (bits) in each clock.

The data stream generating unit can be made to multiplex a predetermined synchronization signal into a head of each line of each of the serial data streams in the plurality of lanes.

The mapping unit can be made to
secure an area for multiplexing ancillary data containing audio data within a horizontal ancillary data area of each of the SDI data streams on the plurality of channels, and
multiplex data of pixel samples in extra pixel areas in a horizontal direction of the one of the 8K video signal and the 4K video signal into rest of the horizontal ancillary data area.

The mapping unit can be made to multiplex
ancillary data containing audio data into a horizontal ancillary data area of each of the SDI data streams on predetermined channels of the plurality of channels, and
data of pixel samples in extra pixel areas in a horizontal direction of the one of the 8K video signal and the 4K video signal into a horizontal ancillary data area of each of the SDI data streams on other channels of the plurality of channels than the predetermined channels on which the ancillary data is multiplexed.

The signal processing apparatus according to the first embodiment of the present technology can further include a transmission control unit configured to control the serial data streams in the plurality of lanes so that the serial data streams in the plurality of lanes are subjected to wavelength multiplexing and sent via a 100 Gbps Ethernet device.

According to the first embodiment of the present technology, there is also provided a signal processing method, including:
mapping one of an 8K video signal and a 4K video signal into SDI data streams on a plurality of channels, the SDI data streams on the plurality of channels each conforming to a predetermined SDI format;
performing one of 8B/10B conversion and scrambling of the SDI data streams on the plurality of channels in units of a predetermined bit; and
multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

According to the first embodiment of the present technology, there is also provided a program for causing a computer to execute a process including:
mapping one of an 8K video signal and a 4K video signal into SDI data streams on a plurality of channels, the SDI data streams on the plurality of channels each conforming to a predetermined SDI format;
performing one of 8B/10B conversion and scrambling of the SDI data streams on the plurality of channels in units of a predetermined bit; and
multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

According to a second embodiment of the present technology, there is provided a signal processing apparatus, including:
a data stream reproducing unit configured to reproduce SDI data streams on a plurality of channels from serial data streams in a plurality of lanes, the serial data streams in the plurality of lanes being generated by
mapping one of an 8K video signal and a 4K video signal into the SDI data streams on the plurality of channels, the SDI data streams on the plurality of channels each conforming to a predetermined SDI format, and
performing one of 8B/10B conversion and scrambling of the SDI data streams on the plurality of channels in units of a predetermined bit, and
multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and
a video reproducing unit configured to reproduce the one of the 8K video signal and the 4K video signal from the SDI data streams on the plurality of channels.

According to the second embodiment of the present technology, there is also provided a signal processing method, including:
reproducing SDI data streams on a plurality of channels from serial data streams in a plurality of lanes, the serial data streams in the plurality of lanes being generated by
mapping one of an 8K video signal and a 4K video signal into the SDI data streams on the plurality of channels, the SDI data streams on the plurality of channels each conforming to a predetermined SDI format, and
performing one of 8B/10B conversion and scrambling of the SDI data streams on the plurality of channels in units of a predetermined bit, and
multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and reproducing the one of the 8K video signal and the 4K video signal from the SDI data streams on the plurality of channels.

According to the second embodiment of the present technology, there is also provided a program for causing a computer to execute a process including:

reproducing SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and reproducing the one of the 8K video signal and the 4K video signal from the SDI data streams on the plurality of channels.

According to a third embodiment of the present technology, there is provided a signal transmission system, including:

a signal transmission apparatus including a mapping unit configured to map one of an 8K video signal and a 4K video signal into SDI data streams on a plurality of channels, the SDI data streams on the plurality of channels each conforming to a predetermined SDI format, multiplexing units configured to perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps, and a transmission control unit configured to control sending of the serial data streams in the plurality of lanes; and a signal receiving apparatus including a reception control unit configured to control reception of the serial data streams in the plurality of lanes, a data stream reproducing unit configured reproduce the SDI data streams on the plurality of channels from the serial data streams in the plurality of lanes, and a video reproducing unit configured to reproduce the one of the 8K video signal and the 4K video signal from the SDI data streams on the plurality of channels.

In the first embodiment of the present technology, one of an 8K video signal and a 4K video signal is mapped into SDI data streams on a plurality of channels, the SDI data streams on the plurality of channels each conforming to a predetermined SDI format, one of 8B/10B conversion and scrambling of the SDI data streams on the plurality of channels is performed in units of a predetermined bit, and the SDI data streams on the plurality of channels subjected to the one of the 8B/10B conversion and the scrambling are multiplexed, to thereby generate serial data streams in a plurality of lanes, the serial data streams in the plurality of lanes each having a bit rate within a range of from 25 Gbps to 28.3 Gbps.

In the second embodiment of the present technology,

SDI data streams on a plurality of channels are reproduced from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps.

The one of the 8K video signal and the 4K video signal is reproduced from the SDI data streams on the plurality of channels.

In the third embodiment of the present technology, one of an 8K video signal and a 4K video signal is mapped into SDI data streams on a plurality of channels, the SDI data streams on the plurality of channels each conforming to a predetermined SDI format, one of 8B/10B conversion and scrambling of the SDI data streams on the plurality of channels is performed in units of a predetermined bit, and the SDI data streams on the plurality of channels subjected to the one of the 8B/10B conversion and the scrambling are multiplexed, to thereby generate serial data streams in a plurality of lanes, the serial data streams in the plurality of lanes each having a bit rate within a range of from 25 Gbps to 28.3 Gbps.

Sending of the serial data streams in the plurality of lanes is controlled, reception of the serial data streams in the plurality of lanes is controlled, the SDI data streams on the plurality of channels are reproduced from the serial data streams in the plurality of lanes, and the one of the 8K video signal and the 4K video signal is reproduced from the SDI data streams on the plurality of channels.

According to the first to third embodiments of the present technology, an 8K or 4K video signal can be transmitted via 100 GbE devices.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a table showing standards of video signals of UHDTV;

FIGS. 3A, 3B, and 3C show examples of a sample structure of a video signal according to a UHDTV standard;

FIG. 4 shows an overall configuration of a signal transmission system according to embodiments of the present technology;

FIG. 5 is a block diagram showing a configuration example of functions of a broadcasting camera according to a first embodiment;

FIG. 19 is a diagram showing an example of data blocks generated from HD-SDIs in the video signal transmission process according to the first embodiment;

Figure 20:
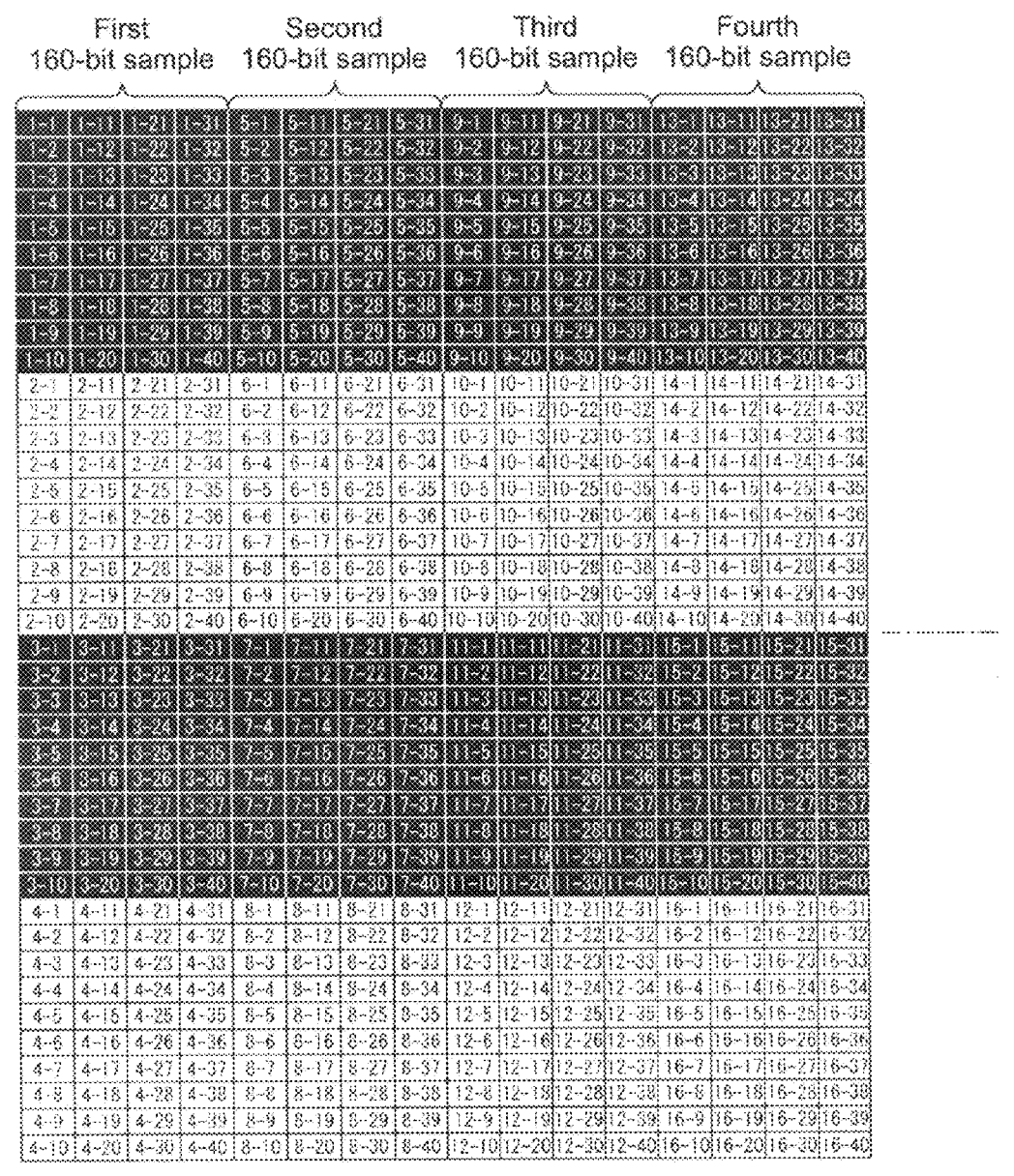

FIG. 20 is another diagram showing the example of data blocks generated from HD-SDIs in the video signal transmission process according to the first embodiment;

FIG. 30 is a diagram showing an example of data blocks generated from HD-SDIs in the video signal transmission process according to the second embodiment;

FIG. 31 is another diagram showing the example of data blocks generated from HD-SDIs in the video signal transmission process according to the second embodiment;

FIG. 39 is a diagram showing an example of data blocks generated from HD-SDIs in the video signal transmission process according to the third embodiment;

FIG. 40 is another diagram showing the example of data blocks generated from HD-SDIs in the video signal transmission process according to the third embodiment;

FIG. 58 is a diagram showing an example of data blocks generated from basic streams in the video signal transmission process according to the seventh embodiment;

FIG. 59 is another diagram showing the example of data blocks generated from basic streams in the video signal transmission process according to the seventh embodiment;

FIG. 67 is a diagram showing an example of data blocks generated from basic streams in the video signal transmission process according to the eighth embodiment;

Figure 68:
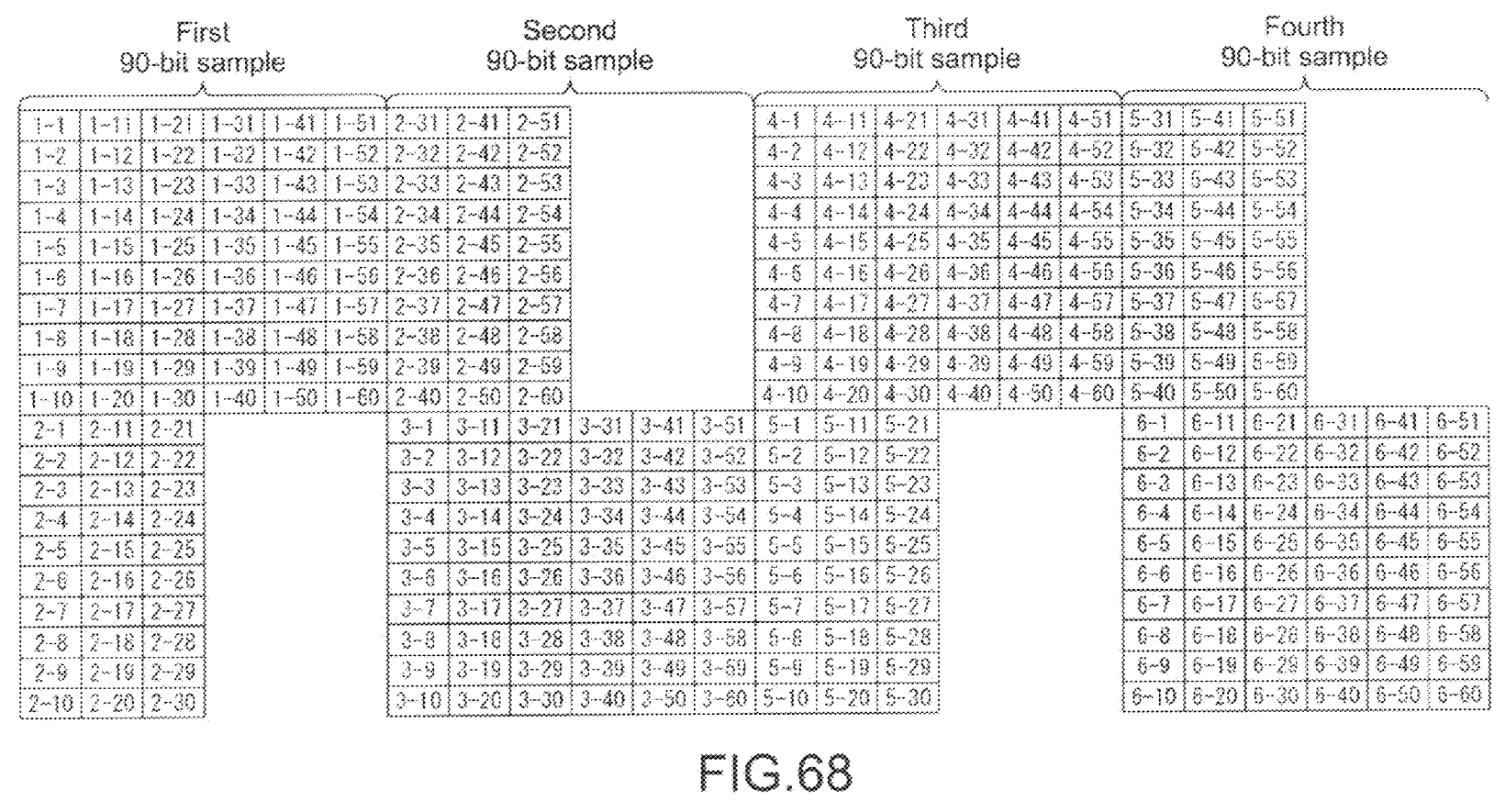

FIG. 68 is another diagram showing the example of data blocks generated from basic streams in the video signal transmission process according to the eighth embodiment;

DETAILED DESCRIPTION OF EMBODIMENTS

Hereinafter, embodiments of the present disclosure will be described with reference to the drawings.

In the following, description is made of best modes for carrying out the present technology (hereinafter, referred to as embodiments). Note that, the description is made in the following order.

1. Example of video signal to be transmitted with the present technology
2. Example of a signal transmission system
3. First embodiment (first example of transmitting 8K video signal at 48P-60P)
4. Second embodiment (second example of transmitting 8K video signal at 48P-60P)
5. Third embodiment (third example of transmitting 8K video signal at 48P-60P)
6. Fourth embodiment (example of transmitting 8K video signal at 96P-120P)
7. Fifth embodiment (example of transmitting 4K RAW signal at 48P-60P)
8. Sixth embodiment (example of transmitting 4K RAW signal at 96P-120P)
9. Seventh embodiment (example of transmitting 8K video signal at 50P-60P)
10. Eighth embodiment (example of transmitting 8K video signal at 100P-120P)
11. Modifications 1. Example of Video Signal to be Transmitted with the Present Technology First, prior to the description of the embodiments of the present technology, description is made of an example of a video signal to be transmitted with the present technology. With the present technology, 8K video signals corresponding to approximately 8,000 horizontal samples and approximately 4,000 vertical lines, such as video signals corresponding to active pixel areas having a size of 7,680 samples×4,320 lines (UHDTV2) or a size of 8,192 samples× 4,320 lines, are transmitted. Further, 4K video signals corresponding to approximately 4,000 horizontal samples and approximately 2,000 vertical lines, such as video signals corresponding to active pixel areas having a size of 3,840 samples×2,160 lines (UHDTV1) or a size of 4,096 samples× 2,160 lines are transmitted.

Note that, in the following, the 8K video signal is also referred to as 8K signal, and the 4K video signal is also referred to as 4K signal.

Figure 2:
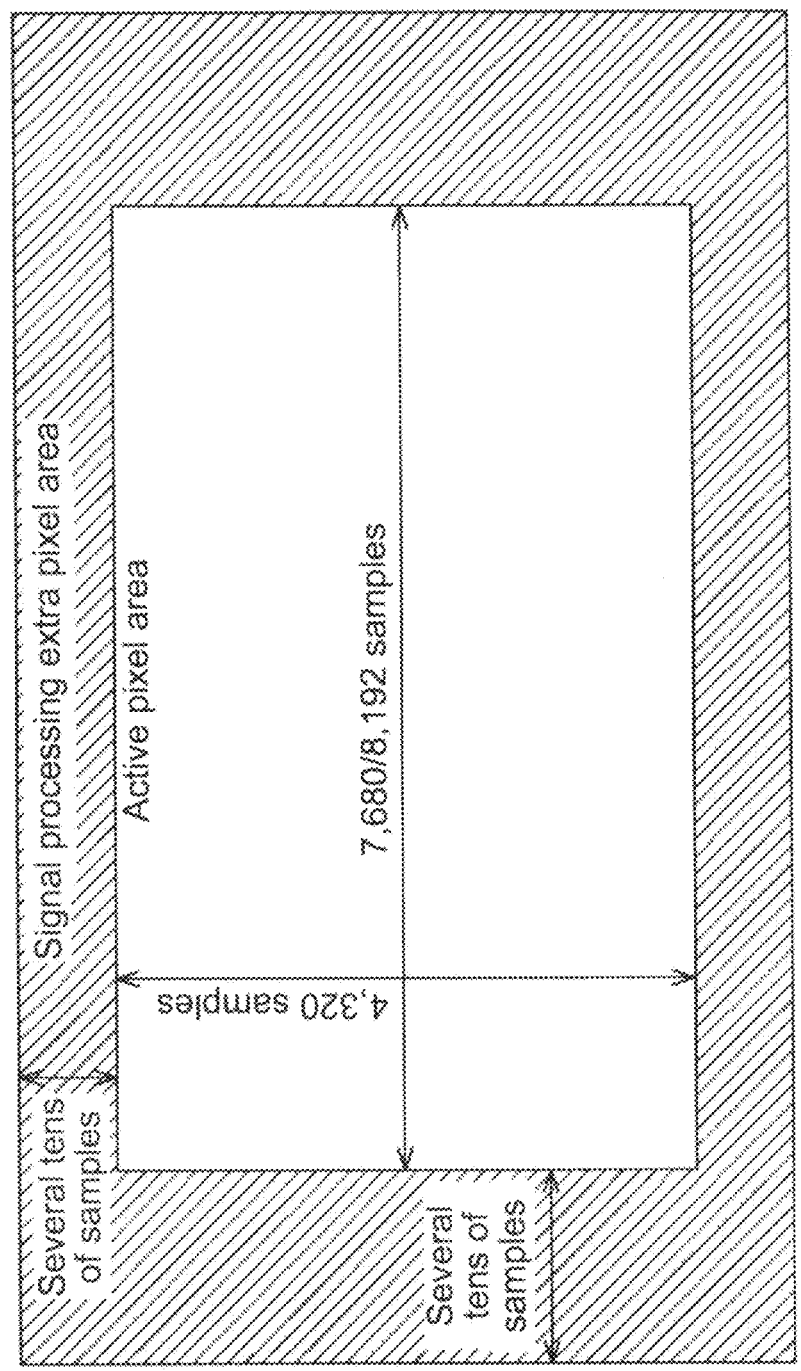
FIG. 2 is a configuration example of pixels in one frame to be transmitted with an 8K video signal.

FIG. 2 is a configuration example of pixels in one frame to be transmitted with the 8K signal. Around the active pixel area at a center of this video signal, a signal processing extra pixel area having a size of several samples to several tens of samples in a horizontal direction and a vertical direction is provided. Pixel samples in the signal processing extra pixel area are used for various purposes such as defect correction in the active pixel area.

Note that, in the following, a signal processing extra pixel is also simply referred to as extra pixel, and the signal processing extra pixel area is also simply referred to as extra pixel area.

FIG. 3 show examples of a sample structure of the 8K signal or the 4K signal. Specifically, the examples of the sample structure of the 8K signal or the 4K signal include the following three types. Note that, signals with a prime mark "'", such as R'G'B', represent signals subjected to gamma correction and the like.

FIG. 3A shows an example of an R'G'B' or Y'Cb'Cr' 4:4:4 system. In this system, all the samples include components of RGB or YCbCr.

FIG. 3B shows an example of a Y'Cb'Cr' 4:2:2 system. In this system, even-numbered samples include YCbCr components, and odd-numbered samples include Y components.

FIG. 3C shows an example of a Y'Cb'Cr' 4:2:0 system. In this system, even-numbered samples in even-numbered lines include YCbCr components, and odd-numbered samples in the even-numbered lines and all the samples in odd-numbered lines include Y components.

Note that, in the following, video signal formats are represented as m×n/a-b/r:g:b/10-bit or 12-bit and the like.

The multiplicand "m" and the multiplier "n" respectively represent the number of samples (pixels) in the horizontal direction and the number of lines in the vertical direction in the active pixel area. The subtraction a-b represents the number of frames per second (frame rate). The proportion r:g:b represents a signal proportion in a predetermined signal transmission method. For example, the proportion r:g:b represents a proportion between a red signal R, a green signal G, and a blue signal B in a primary color signal transmission method, and the proportion r:g:b represents a proportion between a luminance signal Y, a first color-difference signal 1Cb, and a second color-difference signal 2Cr in a color difference signal transmission method. Note that, in the following, the video signal formats may be abbreviated as m×n/a−b signal and the like.

Further, in the following, progressive-signal frame rates 50P, 59.94P, and 60P are collectively abbreviated as "50P-60P," and progressive-signal frame rates 47.95P, 48P, 50P, 59.94P, and 60P are collectively abbreviated as "48P-60P." Still further, progressive-signal frame rates 100P, 119.88P, and 120P are collectively abbreviated as "100P-120P," and progressive-signal frame rates 95.9P, 96P, 100P, 119.88P, and 120P are collectively abbreviated as "96P-120P." In addition, interlaced-signal frame rates 50I, 59.94I, and 60I are collectively abbreviated as "50I-60I," and interlaced-signal frame rates 47.95I, 48I, 50I, 59.94I, and 60I are collectively abbreviated as "48I-60I."

Further, in the following, a data stream according to an HD-SDI format may be abbreviated as HD-SDI data stream or more simply as HD-SDI. In addition, in the following, a data stream according to a 3G-SDI format may be abbreviated as 3G-SDI data stream or more simply as 3G-SDI.

2. Configuration Example of Signal Transmission System 1

Next, with reference to FIG. 4, description is made of a configuration example of a signal transmission system 1 that is commonly used in the following first to eighth embodiments of the present technology.

The signal transmission system 1 includes "n" broadcasting cameras 11-1 to 11-n and a CCU (camera control unit) 12. The broadcasting cameras 11-1 to 11-n are connected to the CCU 12 respectively with optical fiber cables 13-1 to 13-n.

Note that, in the following, unless the broadcasting cameras 11-1 to 11-n need to be distinguished from each other, those cameras are simply referred to as broadcasting cameras 11. Further, in the following, unless the optical fiber cables 13-1 to 13-n need to be distinguished from each other, those cables are simply referred to as optical fiber cables 13.

The broadcasting cameras 11 are each used as a signal transmission apparatus employing a signal sending method of sending video signals via a 100 GbE device (such as optical module). Further, the CCU 12 is used as a signal receiving apparatus employing a signal receiving method of receiving the video signals via the 100 GbE device. The signal transmission system 1 obtained by the combination of the broadcasting cameras 11 and the CCU 12 is used as a signal transmission system configured to exchange video signals via a 100 GbE device.

The broadcasting cameras 11 send video signals obtained as a result of imaging to the CCU 12 via the optical fiber cables 13.

The CCU 12 is configured, for example, to control the broadcasting cameras 11, receive the video signals from the broadcasting cameras 11, and send video signals (return video) for causing monitors of the broadcasting cameras 11 to display video being captured by another one of the broadcasting cameras 11.

3. First Embodiment

Next, with reference to FIGS. 5 to 23, description is made of the first embodiment of the present technology.

In the first embodiment, an 8K signal at 48P-60P is transmitted via the 100 GbE device. Examples of the 8K signal at 48P-60P include video signals of
7680×4320/50P-60P/4:4:4/10 bits or 12 bits,
7680×4320/50P-60P/4:2:2/12 bits,
8192×4320/48P-60P/4:4:4/10 bits or 12 bits, and
8192×4320/48P-60P/4:2:2/12 bits.

(Configuration Example of Broadcasting Camera 11a)

FIG. 5 is a block diagram showing a configuration example of functions of the broadcasting camera 11a as an embodiment of the broadcasting cameras 11 according to the first embodiment. The broadcasting camera 11a includes an image pickup element 101, a signal processing unit 102, and a transmission control unit 103.

Examples of the image pickup element 101 include a CMOS image sensor and a CCD image sensor. The image pickup element 101 supplies video signals obtained as a result of imaging to a mapping unit 111 of the signal processing unit 102. Examples of the video signals include video signals of
7680×4320/50P-60P/4:4:4/10 bits or 12 bits,
7680×4320/50P-60P/4:2:2/12 bits,
8192×4320/48P-60P/4:4:4/10 bits or 12 bits, and
8192×4320/48P-60P/4:2:2/12 bits.

The signal processing unit 102 multiplexes the video signals supplied from the image pickup element 101 into data streams of a type that can be transmitted via 100 GbE devices, and generates and supplies the data streams to the transmission control unit 103. The signal processing unit 102 includes the mapping unit 111 and multiplexing units 112-1 to 112-4.

As described below, the mapping unit 111 maps the video signals supplied from the image pickup element 101 so as to generate HD-SDIs on 64 channels. Then, the mapping unit 111 supplies HD-SDIs on channels 1 to 16 to the multiplexing unit 112-1, and supplies HD-SDIs on channels 17 to 32 to the multiplexing unit 112-2. Further, the mapping unit 111 supplies HD-SDIs on channels 33 to 48 to the multiplexing unit 112-3, and supplies HD-SDIs on channels 49 to 64 to the multiplexing unit 112-4.

As described below, the multiplexing units 112-1 to 112-4 each perform multiplexing by channel coding (such as scrambling and 8B/10B conversion) of the HD-SDIs on 16 channels supplied from the mapping unit 111. With this, data streams having bit rates within a range of from 25 Gbps to 28.3 Gbps, which conform to the specifications of electrical interface standards such as CAUI-4 and OIF (Optical Internetworking Forum) CEI-28G, are generated (hereinafter, referred to as transmission data streams). The multiplexing units 112-1 to 112-4 each supply the generated transmission data stream to the transmission control unit 103.

Note that, in the following, unless the multiplexing units 112-1 to 112-4 need to be distinguished from each other, those units are simply referred to as multiplexing units 112.

The transmission control unit 103 controls sending of the transmission data streams to a CCU 12a as an embodiment of the CCU 12 according to the first embodiment.

(Configuration Example of Multiplexing Unit 112)

Figure 6:
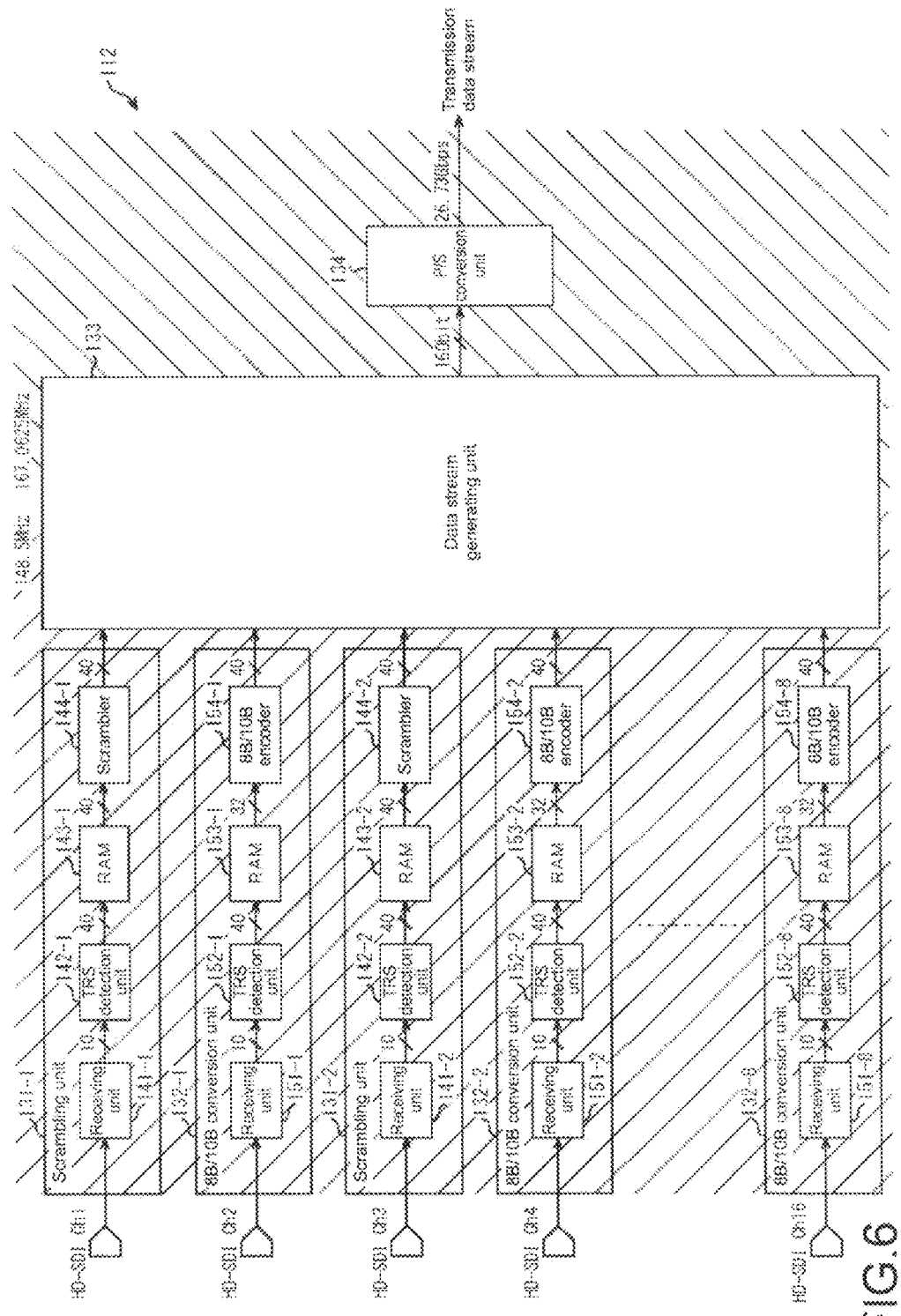
FIG. 6 is a block diagram showing a configuration example of functions of a multiplexing unit of the broadcasting camera according to the first embodiment.

FIG. 6 is a block diagram showing a configuration example of functions of the multiplexing unit 112.

The multiplexing units 112 each include scrambling units 131-1 to 131-8, 8B/10B conversion units 132-1 to 132-8, a data stream generating unit 133, and a parallel/serial (P/S) conversion unit 134. The scrambling units 131-$i$ ($i$=1 to 8) respectively include receiving units 141-$i$, TRS detection units 142-$i$, RAMs 143-$i$, and scramblers 144-$i$. The 8B/10B conversion units 132-$i$ ($i$=1 to 8) respectively include receiving units 151-$i$, TRS detection units 152-$i$, RAMs 153-$i$, and 8B/10B encoders 154-$i$.

Among 16-channel HD-SDIs to be input to each of the multiplexing units 112, HD-SDIs on odd-numbered channels are input respectively to the scrambling units 131-1 to 131-8, and HD-SDIs on even-numbered channels are input respectively to the 8B/10B conversion units 132-1 to 132-8.

The receiving unit 141-1 of the scrambling unit 131-1 performs S/P conversion and descrambling of the HD-SDI input thereto, and supplies the HD-SDI to the TRS detection unit 142-1. Further, the receiving unit 141-1 reproduces a clock signal that is superimposed on the HD-SDI, and supplies the clock signal to each of the units in the scrambling unit 131-1.

The TRS detection unit 142-1 detects an SAV (Start of Active Video) and an EAV (End of Active Video) included in the HD-SDI so as to synchronize words in the HD-SDI. Further, the TRS detection unit 142-1 extracts data in units of a predetermined bit (for example, 40 bits) sequentially from the head of the SAV of the HD-SDI, and stores the data to the RAM 143-1.

The scrambler 144-1 reads the data from the RAM 143-1 in units of blocks of a predetermined bit (for example, 40 bits), and scrambles the read data. Then, the scrambler 144-1 supplies the scrambled data blocks to the data stream generating unit 133.

The scrambling units 131-2 to 131-8 each execute the same process as that by the scrambling unit 131-1 on the HD-SDI input thereto.

As well as the receiving unit 141-1, the receiving unit 151-1 of the 8B/10B conversion unit 132-1 performs S/P conversion and descrambling of the HD-SDI input thereto, and supplies the HD-SDI to the TRS detection unit 152-1. Further, the receiving unit 151-1 reproduces a clock signal that is superimposed on the HD-SDI, and supplies the clock signal to each of the units in the 8B/10B conversion unit 132-1.

The TRS detection unit 152-1 detects an SAV and an EAV included in the HD-SDI so as to synchronize the words in the HD-SDI. Further, the TRS detection unit 152-1 extracts data in units of a predetermined bit (for example, 40 bits) from the head of the SAV of the HD-SDI, and stores the data to the RAM 153-1.

The 8B/10B encoder 154-1 reads the data from the RAM 153-1 in units of blocks of a predetermined bit (for example, 32 bits), and performs 8B/10B conversion of the read data. The 8B/10B encoder 154-1 supplies the data blocks obtained by the 8B/10B conversion to the data stream generating unit 133.

The 8B/10B conversion units 132-2 to 132-8 each execute the same process as that by the 8B/10B conversion unit 132-1 on the HD-SDI input thereto.

Note that, in the following, unless the scrambling units 131-1 to 131-8 and the 8B/10B conversion units 132-1 to 132-8 need to be distinguished from each other, those units are simply referred to respectively as scrambling units 131 and 8B/10B conversion units 132. Further, in the following, unless the receiving units 141-1 to 141-8, the TRS detection units 142-1 to 142-8, the RAMs 143-1 to 143-8, and the scramblers 144-1 to 144-8 need to be distinguished from each other, those units are simply referred to respectively as receiving units 141, TRS detection units 142, RAMs 143, and scramblers 144. Still further, in the following, unless the receiving units 151-1 to 151-8, the TRS detection units 152-1 to 152-8, the RAMs 153-1 to 153-8, the 8B/10B encoders 154-1 to 154-8 need to be distinguished from each other, those units are simply referred respectively as receiving units 151, TRS detection unit 152, RAMs 153, and 8B/10B encoders 154.

The data stream generating unit 133 generates a parallel transmission data stream having a predetermined word length by multiplexing, by a predetermined procedure, the data blocks supplied from the scramblers 144 and the 8B/10B encoders 154. The data stream generating unit 133 supplies the generated transmission data stream to the P/S conversion unit 134.

The P/S conversion unit 134 performs parallel/serial conversion (P/S conversion) of the transmission data stream supplied from the data stream generating unit 133, and supplies serial transmission data stream obtained by the conversion to the transmission control unit 103.

Note that, the scrambling units 131 and the 8B/10B conversion units 132 execute their processes in synchronization with a clock signal of 148.5 MHz. Meanwhile, the data stream generating unit 133 and the P/S conversion unit 134 execute their processes in synchronization with a clock signal of 167.0625 MHz.

(Configuration Example of Data Stream Generating Unit 133)

Figure 7:
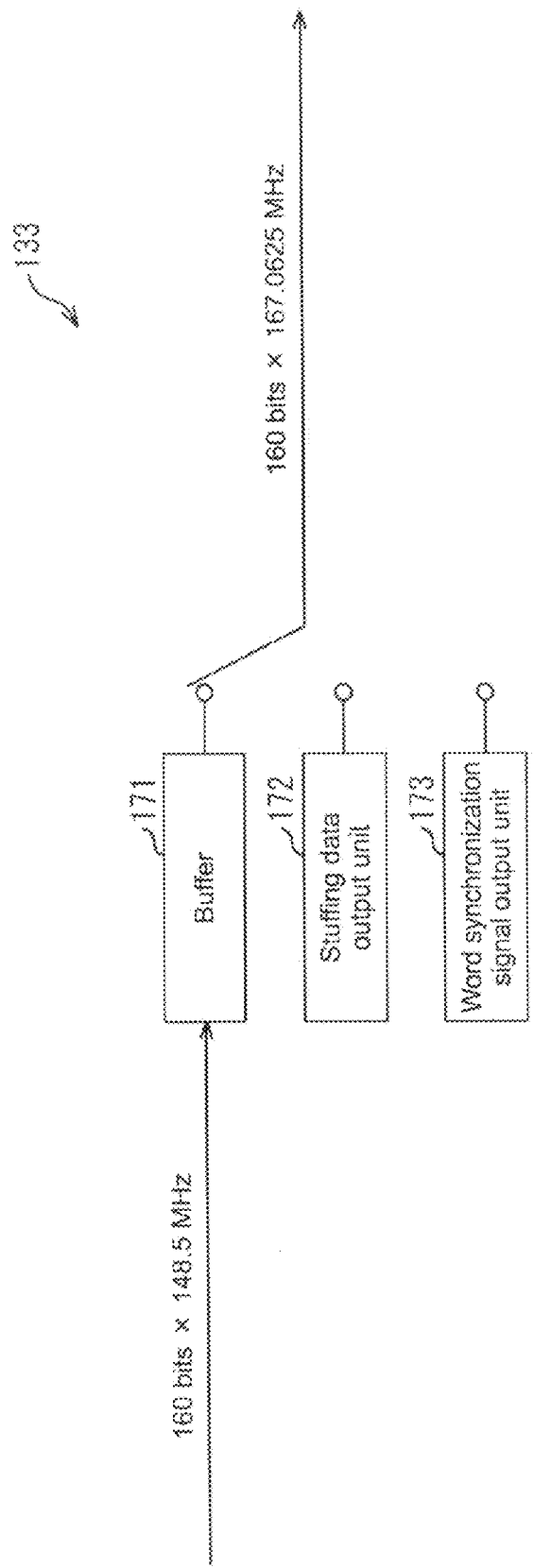
FIG. 7 is a block diagram showing a configuration example of functions of a data stream generating unit.

FIG. 7 is a block diagram showing a configuration example of functions of the data stream generating unit 133.

The data stream generating unit 133 includes a buffer 171, a stuffing data output unit 172, and a word synchronization signal output unit 173.

The buffer 171 generates parallel data having a predetermined word length from the data blocks supplied from the scramblers 144 and the 8B/10B encoders 154, and outputs the parallel data to the P/S conversion unit 134.

The stuffing data output unit 172 generates stuffing data for adjusting bit rates of the transmission data stream, and outputs the stuffing data to the P/S conversion unit 134.

The word synchronization signal output unit 173 generates a word synchronization signal to be used for synchronization of the transmission data stream, and outputs the word synchronization signal to the P/S conversion unit 134.

Note that, as described below, the data streams to be supplied to the data stream generating unit 133 (specifically, to the buffer 171 thereof) each have a bit rate of substantially 160 bits×148.5 MHz. Then, the data stream generating unit 133 converts the data streams to data streams each having a bit rate of substantially 160 bits×167.0625 MHz.

(Configuration Example of CCU 12$a$)

Figure 8:
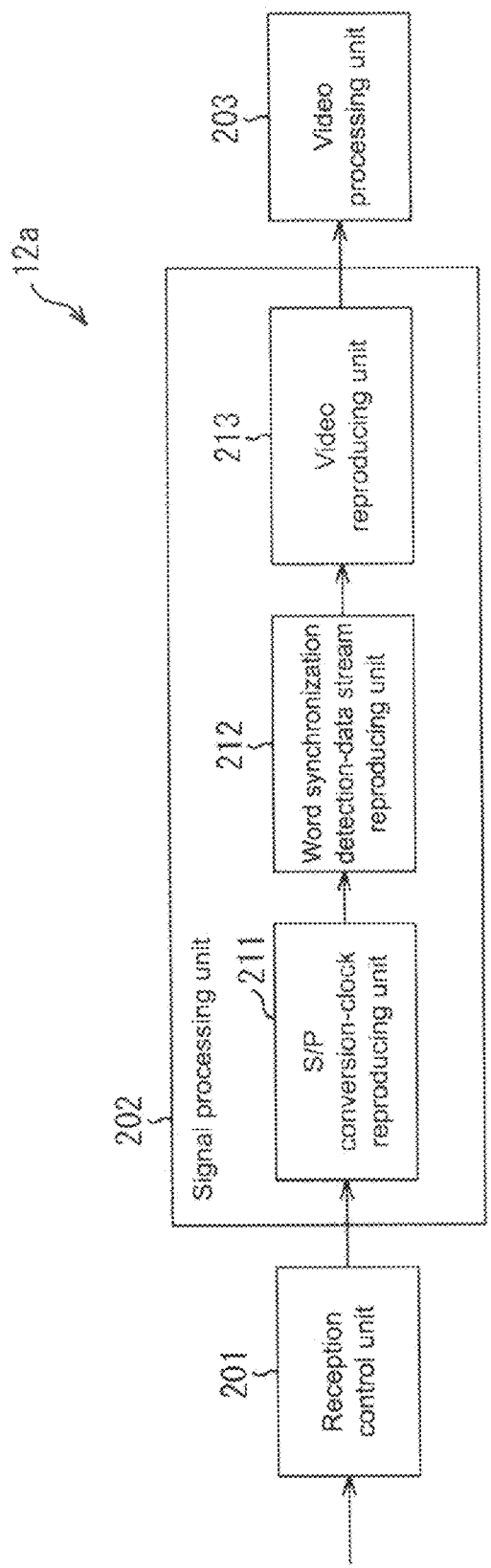
FIG. 8 is a block diagram showing a configuration example of functions of a CCU according to the first embodiment.

FIG. 8 is a block diagram showing a configuration example of functions of the CCU 12$a$.

The CCU 12$a$ includes a reception control unit 201, a signal processing unit 202, and a video processing unit 203. Further, the signal processing unit 202 includes an S/P conversion-clock reproducing unit 211, a word synchronization detection-data stream reproducing unit 212, and a video reproducing unit 213.

The reception control unit 201 controls reception of the transmission data streams from the broadcasting cameras 11. The reception control unit 201 supplies the received transmission data streams to the S/P conversion-clock reproducing unit 211 of the signal processing unit 202.

The S/P conversion-clock reproducing unit 211 performs serial/parallel conversion (S/P conversion) of the transmission data streams, and supplies the transmission data streams to the word synchronization detection-data stream reproducing unit 212. Further, the S/P conversion-clock reproducing unit 211 reproduces the clock signals that are superimposed on the transmission data streams, and supplies the clocks signals to each of the units in the signal processing unit 202.

The word synchronization detection-data stream reproducing unit 212 detects the word synchronization signals from the transmission data streams subjected to the S/P conversion so as to synchronize words in the transmission data streams. Further, the word synchronization detection-data stream reproducing unit 212 executes processes reverse to those by the multiplexing units 112 of the broadcasting camera 11a so as to reproduce the HD-SDI data streams on 64 channels from the transmission data streams. Then, the word synchronization detection-data stream reproducing unit 212 supplies the HD-SDI data streams to the video reproducing unit 213.

The video reproducing unit 213 executes processes reverse to those by the mapping unit 111 of the broadcasting camera 11a so as to reproduce the original 8K signal from the HD-SDI data streams on 64 channels. Then, the video reproducing unit 213 supplies the 8K signal to the video processing unit 203.

An apparatus configured to execute various processes on video signals serves as the video processing unit 203. With this, a predetermined process is executed on the video signal (8K signal) supplied from the video reproducing unit 213. Specifically, examples of the video processing unit 203 include a display configured to display videos based on the video signals, and a storage apparatus configured to store the video signals.

(Specific Configuration Example of Combination of Transmission Control Unit 103 of Broadcasting Camera 11 and Reception Control Unit 201 of CCU 12)

Figure 9:
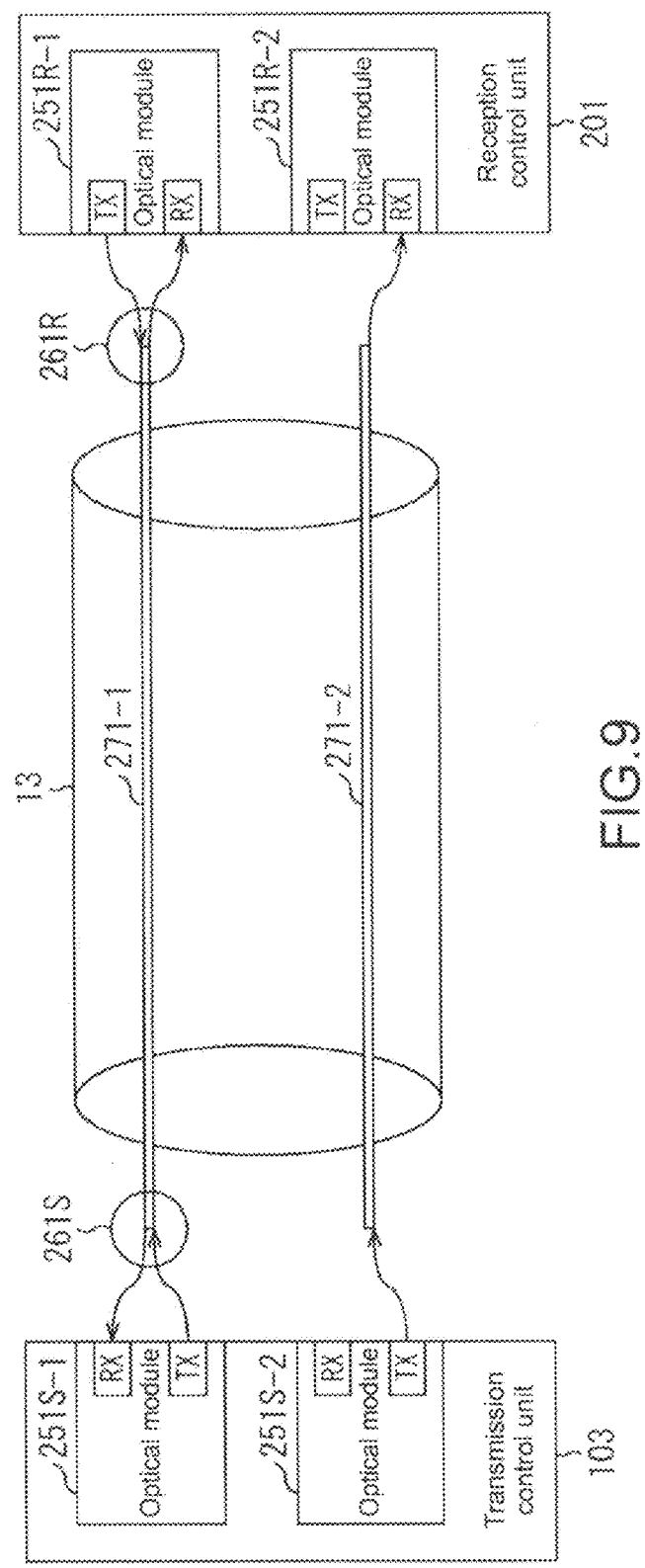
FIG. 9 shows a specific configuration example of a combination of a transmission control unit of the broadcasting camera and a reception control unit of the CCU.

FIG. 9 shows a specific configuration example of a combination of the transmission control unit 103 of the broadcasting camera 11 and the reception control unit 201 of the CCU 12.

The transmission control unit 103 includes optical modules 251S-1 and 251S-2. Further, the reception control unit 201 includes optical modules 251R-1 and 251R-2. Examples of the optical modules 251S-1 to 251R-2 include an optical module conforming to the specifications of, for example, CFP-2 or CFP-4. Further, examples of the optical fiber cable 13 include an optical cable conforming to SMPTE 311. The optical fiber cable 13 contains two optical fibers 271-1 and 271-2.

An optical transmission terminal (TX) of the optical module 251S-1 and an optical receiving terminal (RX) of the optical module 251R-1 are connected to each other through intermediation of an optical circulator 261S, the optical fiber 271-1, and an optical circulator 261R. An optical receiving terminal (RX) of the optical module 251S-1 and an optical transmission terminal (TX) of the optical module 251R-1 are connected to each other through intermediation of the optical circulator 261S, the optical fiber 271-1, and the optical circulator 261R. An optical transmission terminal (TX) of the optical module 251S-2 and an optical receiving terminal (RX) of the optical module 251R-2 are connected to each other through intermediation of the optical fiber 271-2.

In accordance with the specifications of IEEE 802.3ba-2010, the optical fibers 271-1 and 271-2 are configured to be capable of multiplexing and transmitting four signals each having a wavelength band of 1.3 µm. In other words, signals in four lanes can be multiplexed and transmitted at once.

Further, the optical circulators 261S and 261R are connected respectively to both ends of the optical fiber 271-1. With this, signals can be transmitted via the single optical fiber 271-1 in a bidirectional manner from the broadcasting cameras 11 to the CCU 12 and from the CCU 12 to the broadcasting camera 11. As a result, the broadcasting camera 11 can be operated, for example, while being locked to a return signal from the CCU 12, and perform optical transmission of large-volume video signals.

Note that, generally, a volume of the return signal to be transmitted from the CCU 12 is small, and hence the optical fiber 271-1 alone is sufficient to serve as a transmission path from the CCU 12 to the broadcasting camera 11. Thus, without being connected to optical circulators, the optical fiber 271-2 is used only for signal transmission in a direction of from the broadcasting camera 11 to the CCU 12.

(Video Signal Transmission Process According to First Embodiment)

Figure 10:
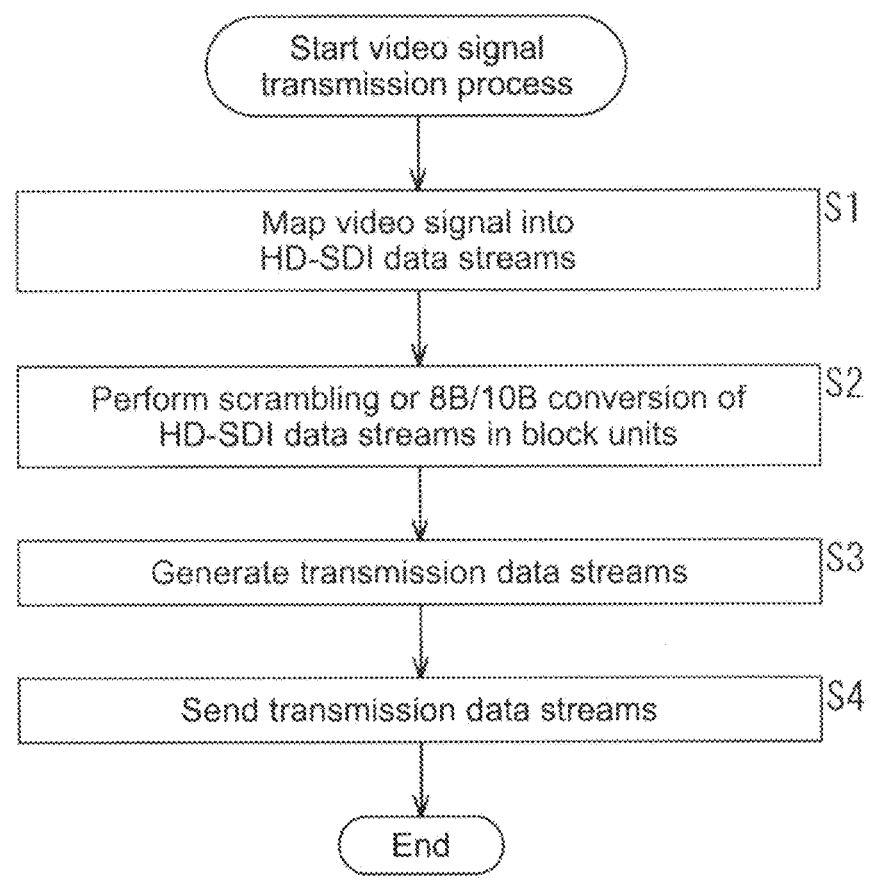
FIG. 10 is an explanatory flowchart of a video signal transmission process according to the first embodiment.

Next, with reference to the flowchart of FIG. 10, description is made of a video signal transmission process to be executed by the broadcasting camera 11a according to the first embodiment.

In Step S1, the mapping unit 111 of the signal processing unit 102 maps a video signal into HD-SDI data streams. Specifically, the mapping unit 111 maps an 8K signal into HD-SDIs on 64 channels. In this context, description is made of a specific example of the method of mapping the 8K signal into the HD-SDIs on 64 channels.

Figure 11:
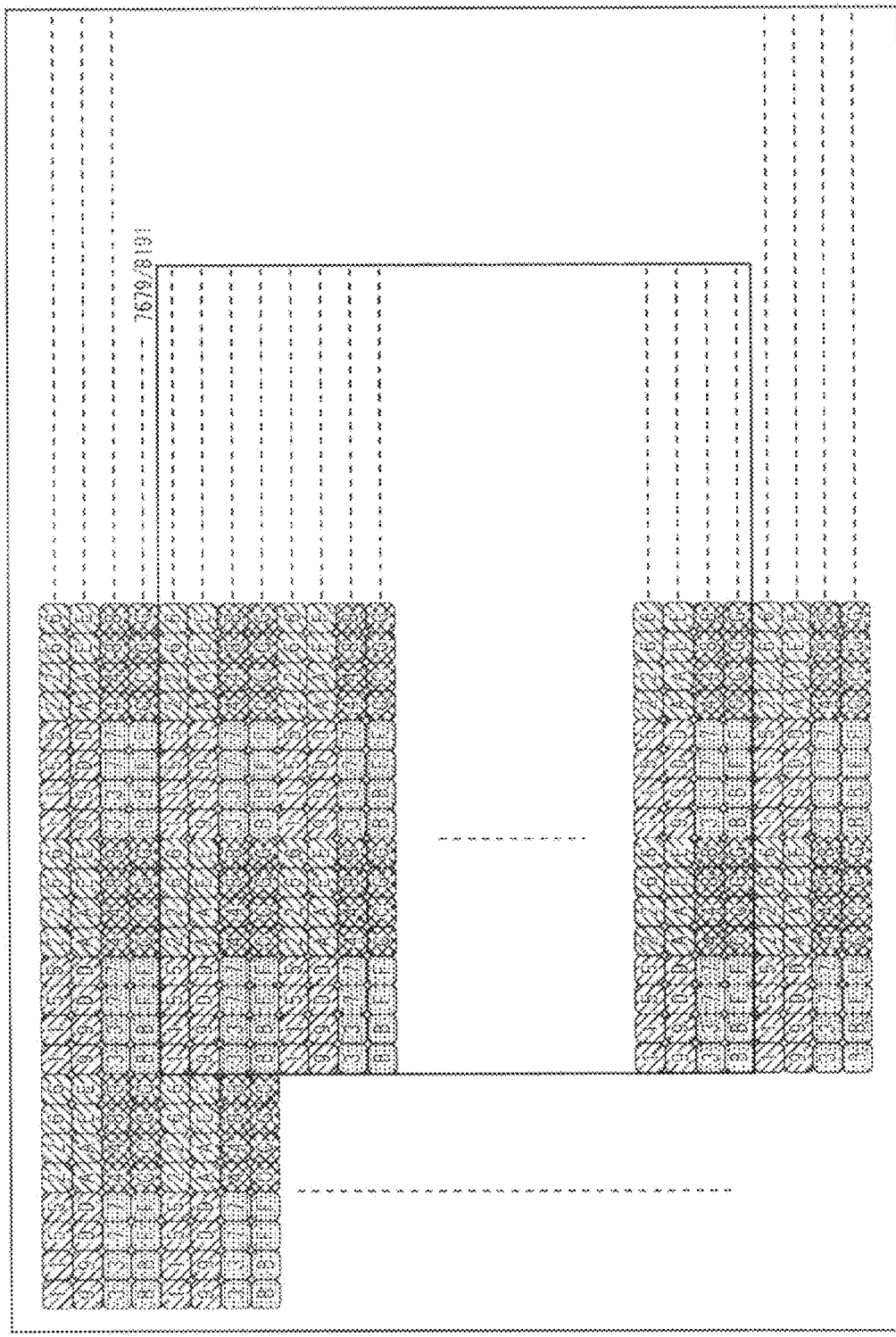
FIG. 11 shows a method of mapping an 8K video signal into 4 k video signals.
Figure 12:
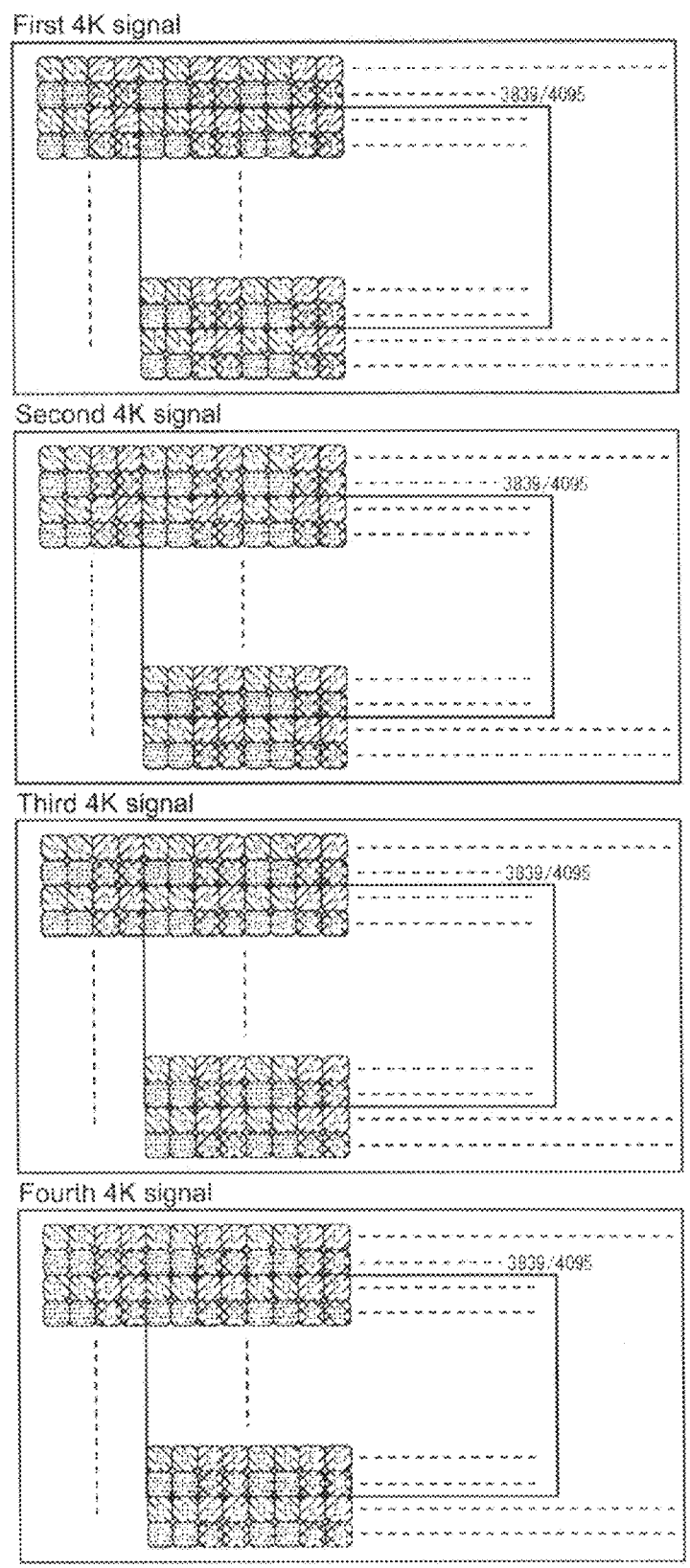
FIG. 12 shows the method of mapping the 8K video signal into the 4 k video signals.

First, in accordance with the specifications shown, for example, in FIG. 4 of SMPTE 2036-3, the mapping unit 111 maps pixel samples of the 8K signal into first to fourth 4K signals. Specifically, as shown in FIGS. 11 and 12, the mapping unit 111 thins out, also in the extra pixel area, every second pair of two adjacent pixel samples in every second line from the 8K signal. In this way, the mapping unit 111 performs the mapping into the first to fourth 4K signals.

Note that, in the following, the sample number and the line number in an active pixel area of each of the 8K signal and the 4K signals each start from zero. Thus, the active pixel area of the 8K signal occupies a total of 4,320 lines from a 0th line to a 4,319th line, each occupying a total of 7,680 samples from a 0th sample to a 7,679th sample or a total of 8,192 samples from the 0th sample to an 8,191st sample. Further, the active pixel area of each of the 4K signals occupies a total of 2,160 lines from a 0th line to a 2,159th line, each occupying a total of 3,840 samples from a 0th sample to a 3,839th sample or a total of 4,096 samples from the 0th sample to a 4,095th sample.

Further, in the following, a 0th line, a 2nd line, a 4th line, . . . of each of the 8K signal and the 4K signals are referred to as even-numbered lines, and a 1st line, a 3rd line, a 5th line, . . . of the same are referred to as odd-numbered lines.

For example, in a case where the active pixel area of the 8K signal occupies 7,680 samples, pixel samples corresponding to 4jth samples and 4j+1st samples (j=0 to 1,919) in 2ith lines (i=0 to 2,159), which are even-numbered lines in the active pixel area of the 8K signal, are mapped into 2jth samples and 2j+1st samples in ith lines in the active pixel area of the first 4K signal. Thus, the active pixel area of the first 4K signal is obtained by thinning out the pixel samples corresponding to the 4jth samples and the 4j+1st samples in the even-numbered lines in the active pixel area of the 8K signal and arraying the rest of the pixel samples in the original order.

Pixel samples corresponding to 4j+2nd samples and 4j+3rd samples (j=0 to 1,919) in the 2ith lines (i=0 to 2,159), which are even-numbered lines in the active pixel area of the 8K signal, are mapped into 2jth samples and 2j+1st samples in ith lines in the active pixel area of the second 4K signal. Thus, the active pixel area of the second 4K signal is obtained by thinning out the pixel samples corresponding to the 4j+2nd samples and the 4j+3rd samples in the even-numbered lines in the active pixel area of the 8K signal and arraying the rest of the pixel samples in the original order.

Pixel samples corresponding to 4jth samples and 4j+1st samples (j=0 to 1,919) in 2i+1st lines (i=0 to 2,159), which are odd-numbered lines in the active pixel area of the 8K signal, are mapped into 2jth samples and 2j+1st samples in ith lines in the active pixel area of the third 4K signal. Thus, the active pixel area of the third 4K signal is obtained by thinning out the pixel samples corresponding to the 4jth samples and the 4j+1st samples in the odd-numbered lines in the active pixel area of the 8K signal and arraying the rest of the pixel samples in the original order.

Pixel samples corresponding to 4j+2nd samples and 4j+3rd samples (j=0 to 1,919) in the 2i+1st lines (i=0 to 2,159), which are odd-numbered lines in the active pixel area of the 8K signal, are mapped into 2jth samples and 2j+1st samples in ith lines in the active pixel area of the fourth 4K signal. Thus, the active pixel area of the fourth 4K signal is obtained by thinning out the pixel samples corresponding to the 4j+2nd samples and the 4j+3rd samples in the odd-numbered lines in the active pixel area of the 8K signal and arraying the rest of the pixel samples in the original order.

Note that, also in a case where the active pixel area of the 8K signal occupies, for example, 8,192 samples, the pixel samples in the active pixel area of the 8K signal are mapped into the first to fourth 4K signals by the same method.

Further, the extra pixel area of the 8K signal is mapped into extra pixel areas of the first to fourth 4K signals by the same method as that for the active pixel area. Thus, as well as the 8K signal, also around the active pixel area of each of the first to fourth 4K signals, the signal processing extra pixel area having the size of several samples to several tens of samples in the horizontal direction and the vertical direction is provided.

Figure 13:
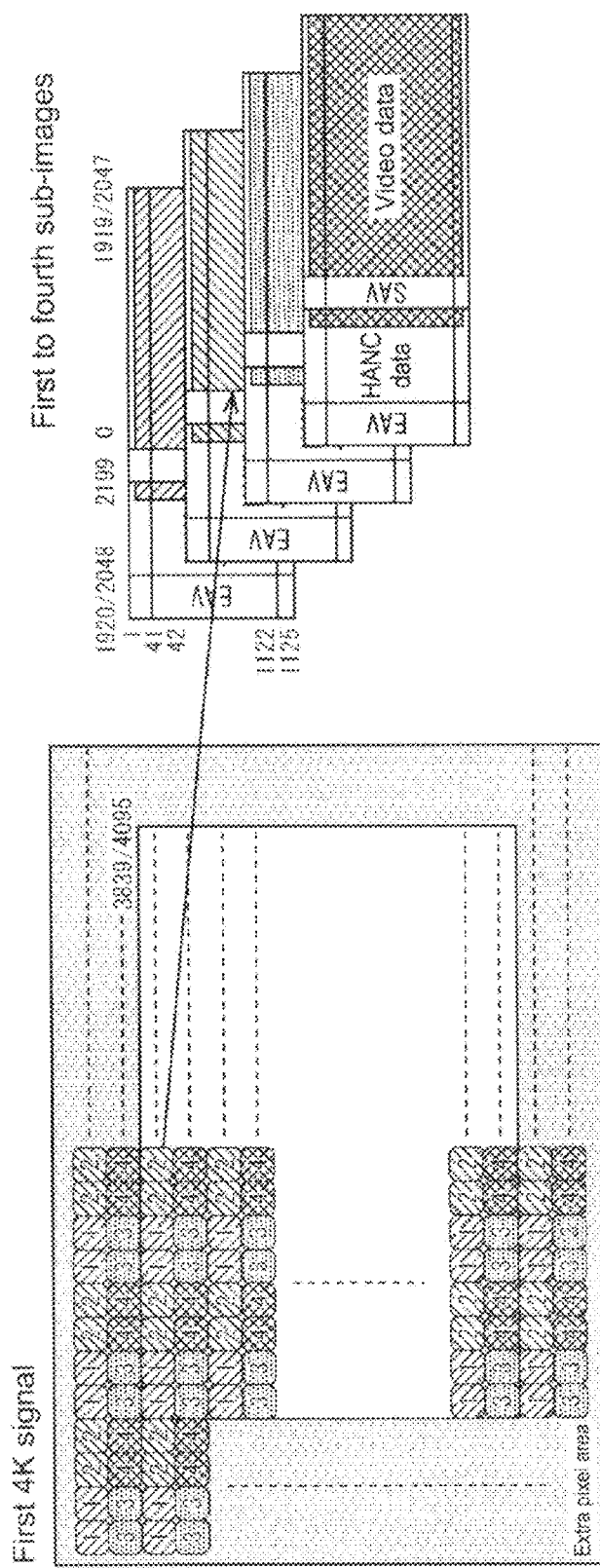
FIG. 13 is an explanatory diagram of a first method of mapping the 4K video signals into sub-images.

Then, the mapping unit 111 maps the first to fourth 4K signals into first to fourth sub-images. For example, as shown in FIG. 13, in accordance with the method specified, for example, in FIG. 1 of SMPTE 2036-3, the mapping unit 111 thins out the first 4K signal by 2-sample interleaving. With this, 2K signals on four channels are generated. In other words, the mapping unit 111 thins out every second pair of two adjacent pixel samples in every second line of the first 4K signal. In this way, the mapping unit 111 performs the mapping into the first to fourth sub-images.

For example, in a case where the active pixel area of the first 4K signal occupies 3,840 samples, pixel samples corresponding to 4jth samples and 4j+1st samples (j=0 to 959) in 2ith lines (i=0 to 1,079) in the active pixel area of the first 4K signal of each of the first to fourth sub-images are mapped into jth samples and j+1st samples in i+42nd lines in a video data area in the first sub-image.

Pixel samples corresponding to 4j+2nd samples and 4j+3rd samples (j=0 to 959) in the 2ith lines (i=0 to 1,079) in the active pixel area of the first 4K signal are mapped into jth samples and j+1st samples in i+42nd lines in a video data area in the second sub-image.

Pixel samples corresponding to 4jth samples and 4j+1st samples (j=0 to 959) in 2i+1st lines (i=0 to 1,079) in the active pixel area of the first 4K signal are mapped into jth samples and j+1st samples in i+42nd lines in a video data area in the third sub-image.

Pixel samples corresponding to 4j+2nd samples and 4j+3rd samples (j=0 to 959) in the 2i+1st lines (i=0 to 1,079) in the active pixel area of the first 4K signal are mapped into jth samples and j+1st samples in i+42nd lines in a video data area in the fourth sub-image.

Further, an EAV area is arranged in an area of from a 1,920th sample to a sample corresponding to a predetermined sample number in a horizontal direction of each of the first to fourth sub-images. For example, as for a signal at 60P, an HANC data area (hereinafter, also referred to as horizontal ancillary data area or horizontal blanking interval) is arranged in an area up to a 2,199th sample subsequent to the EAV area in the horizontal direction of each of the first to fourth sub-images. An SAV area is arranged in an area of from the 2,199th sample to a sample corresponding to a predetermined sample number in the horizontal direction of each of the first to fourth sub-images.

Then, as well as the pixel samples in the active pixel area, pixel samples in the extra pixel area of the first 4K signal are mapped into the first to fourth sub-images. At this time, pixel samples in the extra pixel area of the first 4K signal, which fall within a horizontal range corresponding to the active pixel area (within a range of from a 0th sample to a 3,839th sample), are mapped into an area corresponding to a range of from a 1st line to a 41st line and a range of from a 1,122nd line to a 1,125th line (that is, vertical blanking areas) in the video data area in each of the first to fourth sub-images. Further, pixel samples in the extra pixel area of the first 4K signal, which are out of the horizontal range corresponding to the active pixel area, are mapped into the horizontal ancillary data area in each of the first to fourth sub-images.

The second to fourth 4K signals are also mapped into the first to fourth sub-images as well as the first sub-image.

Further, for example, also in a case where the active pixel area of each of the first to fourth 4K signals occupies 4,096 samples, in the same way, the pixel samples of each of the first to fourth pixel signals are mapped respectively into the first to fourth sub-images.

Note that, in the case where the active pixel area of each of the first to fourth 4K signals occupies 4,096 samples, the video data area in each of the first to fourth sub-images corresponds to a range of from a 0th sample to a 2,047th sample. Subsequently to a 2,048th sample, the EAV area, the horizontal ancillary data area, and the SAV area are arranged.

Figure 14:
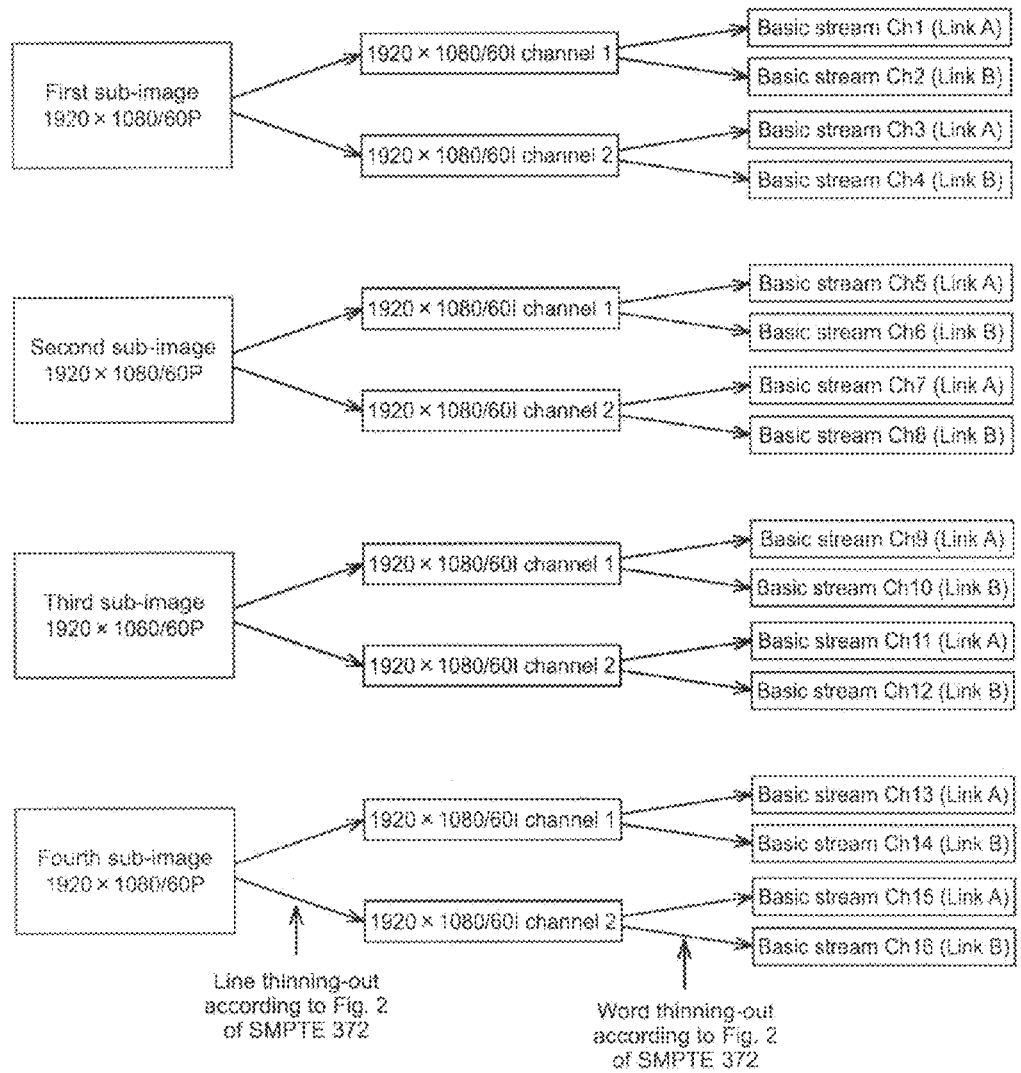
FIG. 14 is an explanatory diagram of a method of mapping the sub-images into HD-SDIs.

Then, as shown in FIG. 14, the mapping unit 111 performs line thinning-out and word thinning-out of the first to fourth sub-images.

For example, first, in accordance with the method specified, for example, in FIG. 2 of SMPTE 372, the mapping unit 111 thins out every second line of the first to fourth sub-images. With this, the sub-images each generated from a progressive video signal at 48P-60P are each converted to 48I-60I interlaced video signals on two channels of channels 1 and 2. For example, as shown in FIG. 14, in a case where the first to fourth sub-images are each generated from a 1920×1080/60P video signal, the first to fourth sub-images are each converted to 1920×1080/60I video signals on the channels 1 and 2.

Next, in accordance with the method specified, for example, in FIG. 4 of SMPTE 372, the mapping unit 111 thins out the generated interlaced video signals in word units. For example, the mapping unit 111 performs word thinning-out by the same method as those in FIGS. 3, 5, 7, 8, and 9 of SMPTE 372. With this, the interlaced video signals are each mapped into HD-SDIs on two channels of a link A and a link B (described as basic streams in FIG. 14).

FIG. 15 show an example of data structures of the HD-SDIs on the links A and B.

Figure 15A:
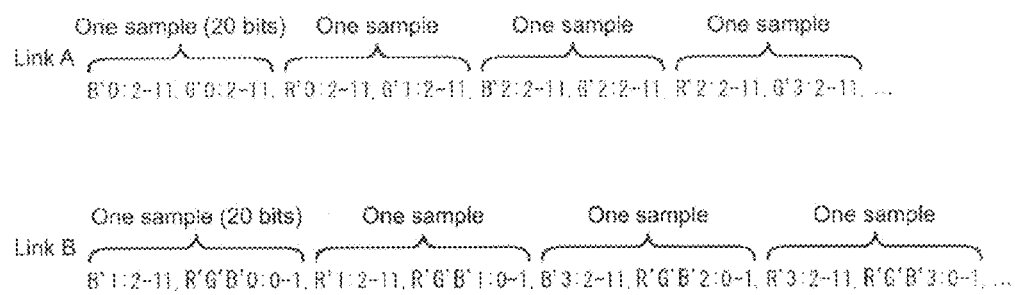
FIGS. 15A and 15B are explanatory diagrams of an example of data structures of links A and B according to SMPTE 372.

As shown in FIG. 15A, a data stream on the link A includes samples each having 20 bits, and all the bits represent RGB values.

Figure 15B:
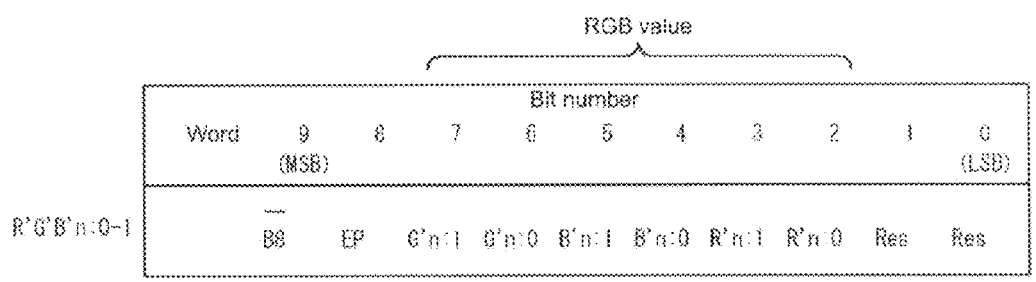

Meanwhile, as shown in FIG. 15B, a data stream on the link B also includes samples each having 20 bits. However, of 10 bits of R'G'B'n:0-1, only six bits corresponding to bit numbers 2 to 7 represent RGB values. Thus, sixteen bits of each of the samples represent RGB values. Note that, in a case where the interlaced video signals generated as a result of the line thinning-out are 10-bit signals of 4:4:4 or 4:2:2, the six bits corresponding to the bit numbers 2 to 7 are set to arbitrary values such as 0.

In this way, the first to fourth 4K signals are generated from the 8K signal at 48P-60P, and HD-SDI video streams on 16 channels are generated from each of the first to fourth 4K signals. Therefore, HD-SDIs on a total of 64 channels are generated from the 8K signal at 48P-60P.

At this time, the mapping unit 111 multiplexes the ancillary data and (horizontal) extra pixels on the left and right of the video signal into the horizontal ancillary data area of the HD-SDI on each of the channels.

Specifically, audio signals occupy a large proportion of a volume of the ancillary data to be transmitted for the 8K signal. More specifically, SMPTE 2036-2 specifies multiplexing of 96-kHz sampled audio signals on 24 channels (22.2 channels) into video signals of UHDTV2 prior to transmission. Further, SMPTE 428-2 specifies multiplexing of 96-kHz sampled audio signals on up to 16 channels for cinema use.

Still further, SMPTE 299-1 specifies formats of audio data packets for HD-SDIs. A minimum unit of the audio data packet specified in SMPTE 299-1 is 31 bytes. Further, in each audio data packet, 32-kHz, 44.1-kHz, or 48-kHz sampled audio signals on up to four channels can be multiplexed, and 96-kHz sampled audio signals on up to two channels can be multiplexed. Yet further, SMPTE 299-1 specifies multiplexing and transmission of up to eight audio data packets (four packets×two times) of the 31 bytes into the horizontal ancillary data areas of the HD-SDIs.

In addition, ancillary data containing the audio data packets of the 31 bytes, and extra pixels of the 8K signal are multiplexed into the horizontal ancillary data area of the HD-SDI on each of the channels.

Figure 16:
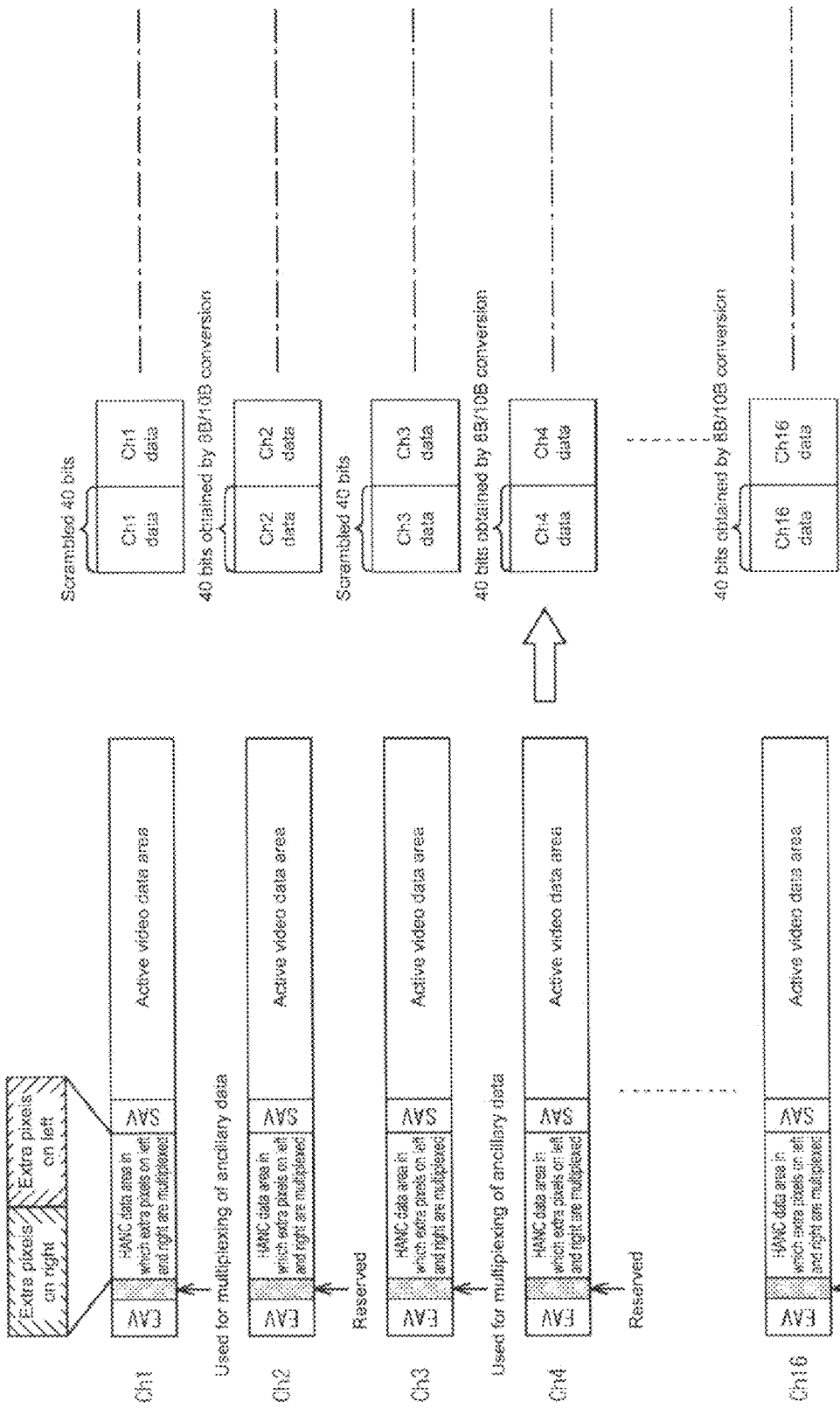
FIG. 16 is an explanatory diagram of a first example of a multiplexing method for ancillary data and extra pixels and a method of generating data blocks in the video signal transmission process according to the first embodiment.
Figure 17:
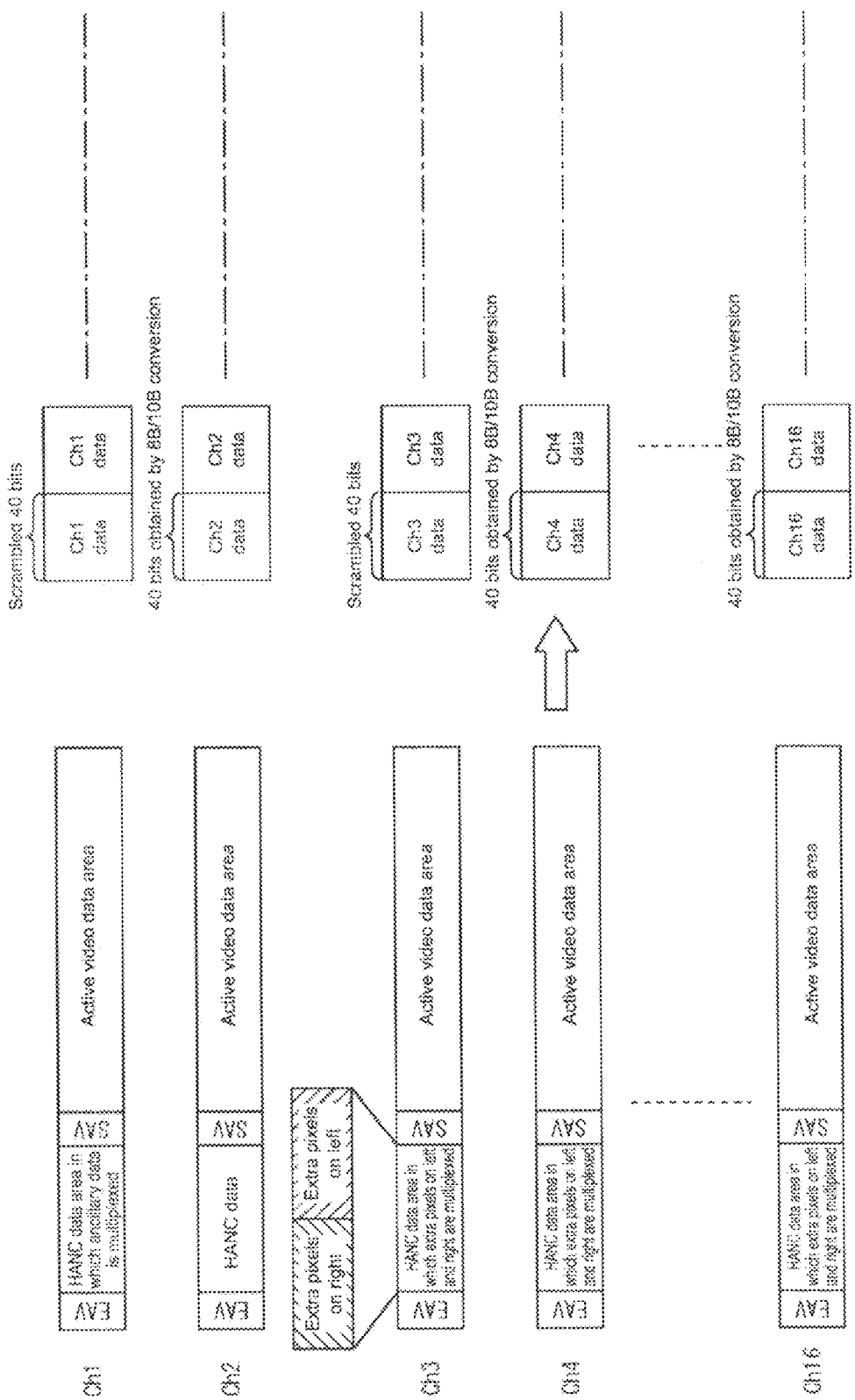
FIG. 17 is an explanatory diagram of a second example of the multiplexing method for ancillary data and extra pixels and the method of generating data blocks in the video signal transmission process according to the first embodiment.

Here, with reference to FIGS. 16 and 17, description is made of specific examples of a multiplexing method for the ancillary data and the extra pixels.

(First Multiplexing Method for Ancillary Data and Extra Pixels)

The left part of FIG. 16 shows a first multiplexing method for ancillary data and extra pixels. Note that, FIG. 16 shows only the HD-SDIs on the channels 1 to 16, which are supplied from the mapping unit 111 to the multiplexing unit 112-1. However, ancillary data and extra pixels are similarly multiplexed into HD-SDIs on the other channels 17 to 64.

Specifically, each in a C-channel area and a Y-channel area in the horizontal ancillary data area of the HD-SDI on each of the channels, a predetermined-size area for multiplexing ancillary data (hereinafter, referred to as ancillary data multiplexing area) is secured. More specifically, an ancillary data area having a capacity equal to or more than 31 bytes is secured in the C-channel area (hereinafter, referred to as ancillary data multiplexing area C). Further, another ancillary data area having a capacity larger than the number of bytes of an audio control signal and a time code is secured in the Y-channel area (hereinafter, referred to as ancillary data multiplexing area Y).

In the ancillary data multiplexing areas C of HD-SDIs on odd-numbered channels, audio data packets conforming to the specifications of SMPTE 299-1 are multiplexed. Further, in the ancillary data multiplexing areas Y in predetermined lines of the HD-SDIs on the odd-numbered channels (for example, in the 9th line and the 571st line in FIG. 12 of SMPTE 299-1), audio control packets conforming to the specifications of SMPTE 299-1 are multiplexed. Still further, in the ancillary data multiplexing areas Y in the predetermined lines of the HD-SDIs on the odd-numbered channels, ancillary data items such as a time code are multiplexed.

Note that, as described below, at the time of generating transmission data streams, some bits of each word of HD-SDIs on even-numbered channels are extracted, and 8B/10B conversion is performed thereon. Thus, in a case where the ancillary data is multiplexed in the HD-SDIs on the even-numbered channels, the ancillary data cannot be reproduced at the time of reproduction. As a result, the ancillary data multiplexing areas of the HD-SDIs on the even-numbered channels are reserved and unused.

In this way, up to 32 audio data packets can be multiplexed into the HD-SDIs on 64 channels.

In this context, for example, 48-kHz sampled audio signals are sampled approximately 1.71 (=48 kHz÷(50 Hz÷2)÷1,125 lines) times on average per line of a 1920× 1125/50I HD-SDI. Further, for example, the 48-kHz sampled audio signals are sampled approximately 1.42 (=48 kHz÷(60 Hz÷2)÷1,125 lines) times on average per line of a 1920×1125/60I HD-SDI. In other words, the 48-kHz sampled audio signals are sampled once or twice per line of the 1920×1125/50I or 60I HD-SDI.

Thus, in a case where the 48-kHz sampled audio signals are multiplexed in the 1920×1125/50I or 60I HD-SDI prior to transmission, audio signals on respective channels need to be multiplexed into up to two samples per line. In this context, as described above, thirty-two audio data packets can be multiplexed, and hence the 48-kHz sampled audio signals on up to 64 channels (=4 channels×32 audio data packets 2) can be multiplexed and transmitted.

Note that, the 32-kHz or 44.1-kHz sampled audio signals on up to 64 channels can be transmitted as well. Meanwhile, the 96-kHz sampled audio signals on up to 32 channels, which is half of the 64 channels, can be transmitted.

Further, in an area except the ancillary data multiplexing areas in the horizontal ancillary data area of the HD-SDI on each channel (hereinafter, referred to as extra pixel multiplexing area), data items of pixel samples in left and right extra pixel areas of the 8K signal are multiplexed.

For example, in a case where the ancillary data multiplexing areas are each set to have 31 bytes, values of a proportion of the extra pixel multiplexing area in an active video data area (hereinafter, referred to as extra pixel multiplexing area relative proportion) are obtained using the following equations (1) to (5). Note that, the equation (1) represents a proportion in a case where a 7680×4320/60P video signal is transmitted, and the equation (2) represents a proportion in a case where a 7680×4320/50P video signal is transmitted. The equation (3) represents a proportion in a case where an 8192×4320/60P video signal is transmitted, and the equation (4) represents a proportion in a case where an 8192×4320/50P video signal is transmitted. The equation (5) represents a proportion in a case where an 8192×4320/48P video signal is transmitted.

$$(2200-1920-12-31)\div1920=0.123=12.3\% \quad (1)$$

$$(2640-1920-12-31)\div1920=0.353=35.3\% \quad (2)$$

$$(2200-2048-12-31)\div2048=0.053=5.3\% \quad (3)$$

$$(2640-2048-12-31)\div2048=0.268=26.8\% \quad (4)$$

$$(2750-2048-12-31)\div2048=0.322=32.2\% \quad (5)$$

For example, in the case where the 7680×4320/60P video signal is transmitted, the C-channel (or Y-channel) area of an HD-SDI occupies 2,200 samples, and the active video data area occupies 1,920 samples of the 2,200 samples. Further, areas of the SAV and the EAV (including a line number LN and an error correction code CRC) occupy 12 samples. Thus, the extra pixel multiplexing area occupies 237 (=2200−1920−12−31) samples. When the number of samples 237 is divided by the number of samples 1,920 of the active video data area, the extra pixel multiplexing area relative proportion of 12.3% is obtained.

In this way, the extra pixel multiplexing area can be sufficiently secured in the active video data area. As a result, all the data items of the pixel samples in the left and right extra pixel areas of the 8K signal can be multiplexed and transmitted.

Note that, as described above, data items of the pixel samples in upper and lower (vertical) extra pixel areas of the 8K signal are multiplexed into the vertical blanking areas of each of the sub-images. The vertical blanking areas occupy 45 lines, which secure a capacity sufficient to multiplex the data items of the pixel samples in the upper and lower extra pixel areas of the 8K signal. Thus, all the data items of the pixel samples in the upper and lower extra pixel areas of the 8K signal can be multiplexed and transmitted.

(Second Multiplexing Method for Ancillary Data and Extra Pixels)

The left part of FIG. 17 shows a second multiplexing method for ancillary data and extra pixels. The second multiplexing method is used, for example, in a case where audio signals are preferentially multiplexed, or a case where the data items of the pixel samples in the left and right extra pixel areas need not be multiplexed.

Note that, FIG. 17 shows only the HD-SDIs on the channels 1 to 16, which are supplied from the mapping unit 111 to the multiplexing unit 112-1. However, ancillary data and extra pixels are similarly multiplexed into the HD-SDIs on the other channels 17 to 64.

Specifically, ancillary data items such as the audio data packet, the audio control packet, and the time code are multiplexed into horizontal ancillary data areas of HD-SDIs on channels 1, 17, 33, and 49.

In this case, in accordance with the specifications of SMPTE 299-1, up to four audio data packets are multiplexed twice into the horizontal ancillary data area of the HD-SDI on each of the channels 1, 17, 33, and 49. With this, up to 32 audio data packets can be multiplexed into the HD-SDIs on 64 channels.

Thus, as well as the first multiplexing method, the 32-kHz, the 44.1-kHz, or the 48-kHz sampled audio signals on up to 64 channels can be multiplexed and transmitted. Further, the 96-kHz sampled audio signals on up to 32 channels can be multiplexed and transmitted.

Note that, in a case where the active video data area of each of the HD-SDIs occupies 2,048 samples, four audio data packets (=four packets×one time), which are half of that in the case where the active video data area occupies 1,920 samples, can be multiplexed into the horizontal ancillary data area. Thus, in the case where the active video data area of each of the HD-SDIs occupies 2,048 samples, the 32-kHz, the 44.1-kHz, or the 48-kHz sampled audio signals on up to 64 channels can be multiplexed and transmitted. Further, the 96-kHz sampled audio signals on up to 16 channels can be multiplexed and transmitted.

Further, each on 56 channels except the channels 1, 17, 33, and 49 into which ancillary data items are multiplexed and channels 2, 18, 34, and 50 to be paired with those channels, the entire of the horizontal ancillary data area is allocated to the extra pixel multiplexing area. Note that, the pair of HD-SDIs refers, for example, to rightmost pairs of the HD-SDIs on the link A and the link B in FIG. 14.

Values of the extra pixel multiplexing area relative proportion are obtained using the following equations (6) to (10). Note that, the equation (6) represents a proportion in a case where a 7680×4320/60P video signal is transmitted, and the equation (7) represents a proportion in a case where a 7680×4320/50P video signal is transmitted. The equation (8) represents a proportion in a case where an 8192×4320/60P video signal is transmitted, and the equation (9) represents a proportion in a case where an 8192×4320/50P video signal is transmitted. The equation (10) represents a proportion in a case where an 8192×4320/48P video signal is transmitted.

$$(2200-1920-12)\times56\div64\div1920=0.122=12.2\% \quad (6)$$

$$(2640-1920-12)\times56\div64\div1920=0.323=32.3\% \quad (7)$$

$$(2200-2048-12)\times56\div64\div2048=0.059=5.9\% \quad (8)$$

$$(2640-2048-12)\times56\div64\div2048=0.248=24.8\% \quad (9)$$

$$(2750-2048-12)\times56\div64\div2048=0.295=29.5\% \quad (10)$$

For example, in the case where the 7680×4320/60P video signal is transmitted, the C-channel (or Y-channel) area of an HD-SDI occupies 2,200 samples, and the active video data area occupies 1,920 samples of the 2,200 samples. Further, areas of the SAV and the EAV (including the line number LN and the error correction code CRC) occupy 12 samples. Thus, the extra pixel multiplexing area occupies 268 (=2200−1920−12) samples per channel. The extra pixel multiplexing area is provided on each of the 56 channels of the 64 channels, and hence the 268 samples are multiplied by 56/64. When the number of samples 268 is divided by the number of samples 1,920 of the active video data area, the extra pixel multiplexing area relative proportion of 12.2% is obtained.

In this way, also by the second multiplexing method, the extra pixel multiplexing area can be sufficiently secured in the active video data area. As a result, all the data items of the pixel samples in the left and right extra pixel areas of the 8K signal can be multiplexed and transmitted.

Note that, as in the case of the first multiplexing method, all the data items in the upper and lower extra pixel areas of the 8K signal can be transmitted by being multiplexed into the vertical blanking areas of each of the sub-images.

In this way, the 8K signal is mapped into HD-SDIs on 64 channels. Note that, the method of mapping the 8K signal described above is merely an example, and the 8K signal may be mapped into HD-SDIs on 64 channels by using other methods.

Then, the mapping unit 111 supplies the HD-SDIs on the channels 1 to 16 to the multiplexing unit 112-1, and supplies the HD-SDIs on the channels 17 to 32 to the multiplexing unit 112-2. Further, the mapping unit 111 supplies the HD-SDIs on the channels 33 to 48 to the multiplexing unit 112-3, and supplies the HD-SDIs on the channels 49 to 64 to the multiplexing unit 112-4.

Referring back to FIG. 10, in Step S2, the multiplexing units 112 perform scrambling or 8B/10B conversion of data streams of the HD-SDIs in block units.

Specifically, the HD-SDI on the channel 1 is input to the receiving unit 141-1 of the scrambling unit 131-1 of the multiplexing unit 112-1. The receiving unit 141-1 performs the S/P conversion and the descrambling of the HD-SDI input thereto, and extracts data in units of 1 word (10 bits) in synchronization with the clock signal of 148.5 MHz. Then, the receiving unit 141-1 supplies the data to the TRS detection unit 142-1.

The TRS detection unit 142-1 detects the SAV and the EAV included in the HD-SDI so as to synchronize the words in the HD-SDI. Then, the TRS detection unit 142-1 extracts data in units of 40 bits sequentially from the head of the SAV of the HD-SDI in four clocks (10 bits×4 clocks) of the clock signal of 148.5 MHz, and stores the data to the RAM 143-1.

The scrambler 144-1 reads blocks of the data in the units of 40 bits from the RAM 143-1 in each set of four clocks of the clock signal of 148.5 MHz, and scrambles the read data blocks. Then, the scrambler 144-1 supplies the scrambled 40-bit data blocks to the data stream generating unit 133.

Note that, as shown in the right parts of FIGS. 16 and 17, also in HD-SDIs on the other odd-numbered channels, which are also input to the multiplexing unit 112-1, scrambling in the units of blocks of 40 bits is performed sequentially from the head of an SAV. Then, the scrambled 40-bit data blocks are supplied to the data stream generating unit 133.

Further, the HD-SDI on the channel 2 is input to the receiving unit 151-1 of the 8B/10B conversion unit 132-1 of the multiplexing unit 112-1. The receiving unit 151-1 performs the S/P conversion and the descrambling of the HD-SDI, and extracts data in units of 1 word (10 bits) in synchronization with the clock signal of 148.5 MHz. Then, the receiving unit 151-1 supplies the data to the TRS detection unit 152-1.

The TRS detection unit 152-1 detects the SAV and the EAV included in the HD-SDI so as to synchronize the words in the HD-SDI. Then, the TRS detection unit 152-1 extracts data in units of 40 bits (10 bits×4 clocks) sequentially from the head of the SAV of the HD-SDI in each of the sets of four clocks of the clock signal of 148.5 MHz, and stores the data to the RAM 153-1.

In each of the sets of four clocks of the clock signal of 148.5 MHz, the 8B/10B encoder 154-1 extracts and reads predetermined 32 bits from the data blocks of 40 bits stored in the RAM 143-1.

Figure 18:
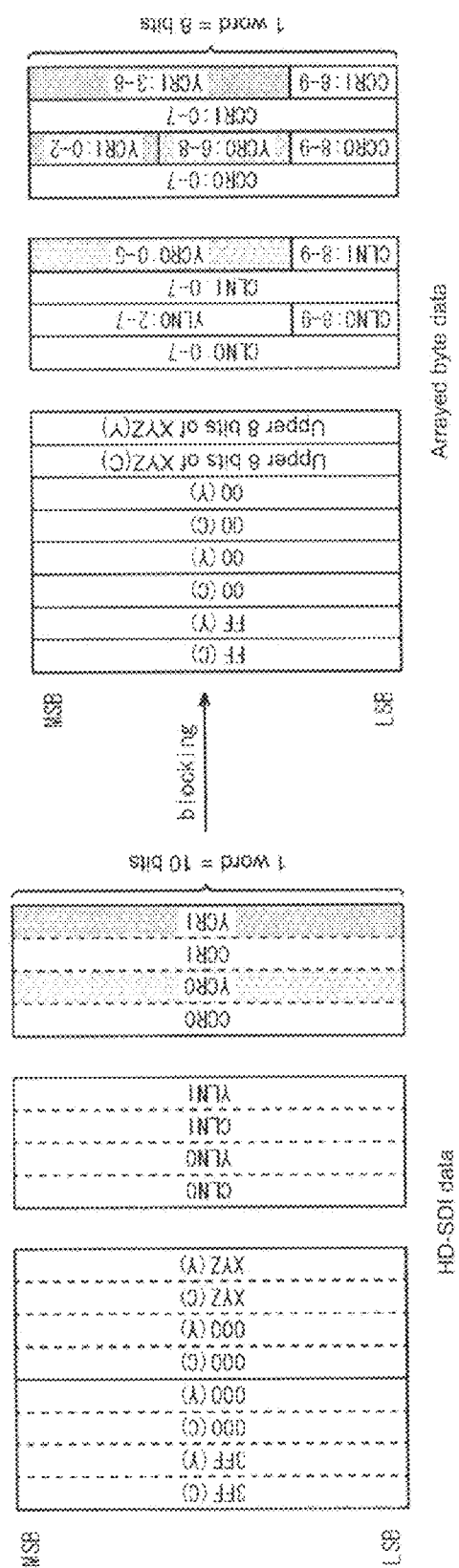
FIG. 18 is an explanatory diagram of a method of extracting data from an SAV and an EAV.

Specifically, as shown in FIG. 18, lower two bits of 3FFh, 000h, 000h, and XYZ of each of the SAV and the EAV are each a reserved bit of 0 or 1. Thus, data items of upper eight bits of ten bits are extracted.

As shown in FIG. 18, data items of the LN and the CRC subsequent to the EAV are extracted and arrayed by the following procedure so that data items in 10-bit/word units are converted to data items in 8-bit/byte units. Note that, CLM represents an LN of the C-channel, YLN represents an LN of the Y-channel, CCR represents a CRC of the C-channel, and YCR represents a CRC of the Y-channel.

CLN0:0-7 (representing a 0th bit to a 7th bit, hereinafter the same) that are lower eight bits of CLN0
CLN0:8-9, YLN0:2-7
CLN1:0-7
CLN0:8-9, YCR0:0-5
CCR:0-7
CCR:8-9, YCR0:6-8, YCR1:0-2
CCR1:0-7
CCR1:8-9, YCR1:3-8

Note that, the CLN and the YLN are the same data, and hence the YLN is basically deleted without being multiplexed. Thus, YLN0:2-7 is obtained from CLN0:2-7, and hence data items such as all 1's may be embedded instead of YLN0:2-7. Further, a 9th bit of the CRC corresponds to an inverted bit of an 8th bit of the same, and hence is deleted without being multiplexed. Further, the CCR and YCR are obtained as data items to be calculated after the 8K signal is multiplexed into HD-SDIs.

Further, 10-bit data items are each fully extracted from the C-channel area in each of the active video data area and the horizontal ancillary data area of the HD-SDI. Six bits of the ten bits, which correspond to bit numbers 2 to 7 shown in FIG. 15B, are extracted from the Y-channel area in the active video data area and the horizontal ancillary data area of the HD-SDI.

In this way, 32-bit data items of the 40-bit data blocks are extracted sequentially from the head of the SAV of the HD-SDI.

Then, the 8B/10B encoder 154-1 performs 8B/10B conversion of the read 32-bit data blocks, and supplies 40-bit data blocks obtained by the 8B/10B conversion to the data stream generating unit 133.

Note that, as shown in the right parts of FIGS. 16 and 17, also in HD-SDIs on the other even-numbered channels, which are also input to the multiplexing unit 112-1, 32-bit data items of the 40-bit data blocks are extracted sequentially from the head of the SAV of the HD-SDI, and subjected to the 8B/10B conversion. Then, the 40-bit data blocks obtained by the 8B/10B conversion are supplied to the data stream generating unit 133.

In this way, as shown schematically in FIG. 19, the 40-bit data block generated from each of the HD-SDIs on the channels 1 to 16 is supplied to the data stream generating unit 133 in each of the sets of four clocks. With this, as modeled in FIG. 20, substantially, a process of supplying a 160-bit/sample data item to the data stream generating unit 133 in each clock is repeated in cycles of four clocks. Thus, data streams of substantially 160 bits×148.5 MHz are supplied to the data stream generating unit 133.

Note that, the same process is executed also in the multiplexing units 112-2 to 112-4. Specifically, of the HD-SDIs on 16 channels, which are input to each of the multiplexing units 112, the scrambling in the units of blocks of 40 bits is performed sequentially from the head of an SAV of each of the HD-SDIs on odd-numbered channels. Then, the scrambled 40-bit data blocks are supplied to the data stream generating unit 133. Further, 32-bit data items of 40-bit data blocks are extracted sequentially from the head of an SAV of each of the HD-SDIs on even-numbered channels, and subjected to the 8B/10B conversion. Then, 40-bit data blocks obtained by the 8B/10B conversion are supplied to the data stream generating unit 133.

Referring back to FIG. 10, in Step S3, the multiplexing units 112 generate the transmission data streams.

For example, as described below, correspondingly to each single line of the HD-SDIs on the channels 1 to 16, the data stream generating unit 133 of the multiplexing unit 112-1 generates a transmission data stream shown in FIG. 21.

Specifically, first, the word synchronization signal output unit 173 of the data stream generating unit 133 outputs a 160-bit word synchronization signal.

Figure 22:
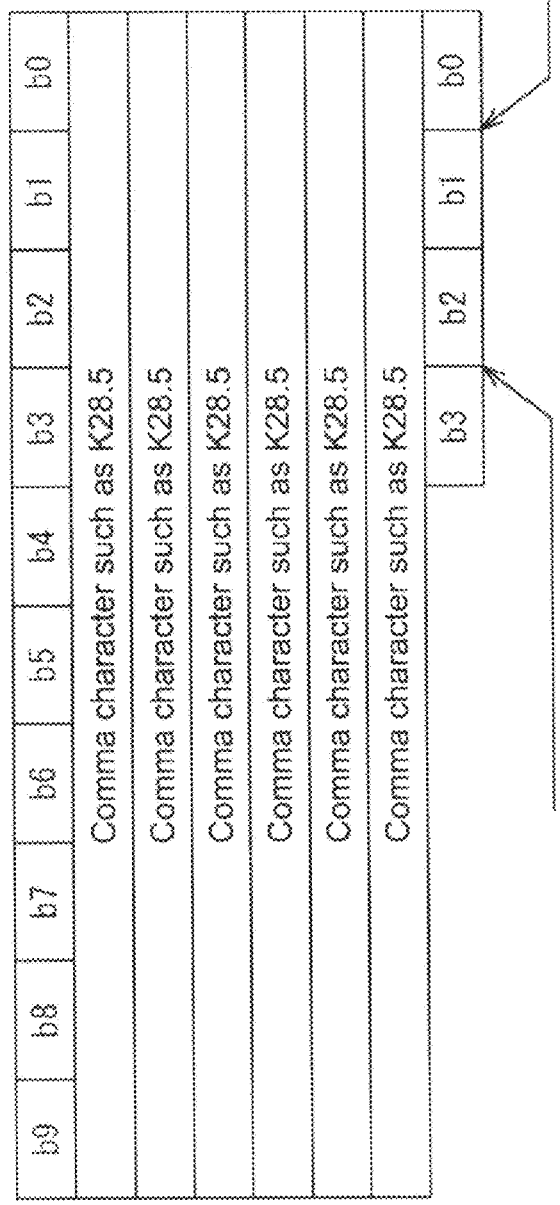
FIG. 22 shows an example of a data structure of a word synchronization signal.

FIG. 22 shows an example of a data structure of a word synchronization signal. Comma characters for 8B/10B codes, such as K28.5, are arranged in first 60 bits of the word synchronization signal. Then, a 2-bit data item indicating whether an active video data area of an HD-SDI to be multiplexed into the transmission data stream occupies 1,920 samples or 2,048 samples is arranged. Further, another 2-bit data item indicating whether a clock frequency that defines operations of the scrambling units 131 and the 8B/10B conversion units 132 is in a 148.5 MHz system or a 148.5/1.001 MHz system is arranged. In this way, a 64-bit word synchronization signal is generated. Next, in order that a 160-bit word length is secured, a 96-bit stuffing data item is added.

Figure 21:
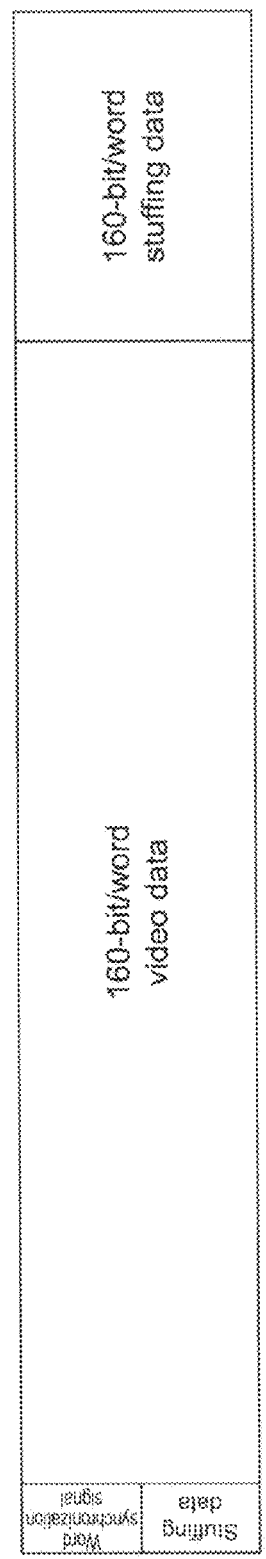
FIG. 21 shows an example of a data structure of a transmission data stream.

With this, as shown in FIG. 21, the word synchronization signal and the stuffing data item are arranged at the head of the transmission data stream.

Next, in synchronization with the clock signal of 167.0625 MHz, the buffer 171 of the data stream generating unit 133 arrays, in a predetermined order, the data blocks supplied from the scramblers 144 and the 8B/10B encoders 154, and extracts data in 160-bit units. Then, the buffer 171 generates parallel data having a 160-bit word length from the extracted data, and outputs the parallel data to the P/S conversion unit 134.

Subsequently, the same process is repeated from the head of the SAV of each of the HD-SDIs on the channels 1 to 16 to an end of the horizontal ancillary data area. In other words, a process of arraying, in a predetermined order, the data blocks supplied from the scramblers 144 and the 8B/10B encoders 154, extracting data in 160-bit units, and generating and outputting the parallel data having the 160-bit word length is repeated.

With this, as shown in FIG. 21, a data item of each of the single lines of the HD-SDIs on the channels 1 to 16 is multiplexed subsequently to the word synchronization signal. This data item corresponds to a data item of each single line of each of the first to fourth sub-images generated from the first 4K signal.

Lastly, in synchronization with the clock signal of 167.0625 MHz, the stuffing data output unit 172 of the data stream generating unit 133 outputs a 160-bit/word parallel stuffing data item having a predetermined number of samples. With this, as shown in FIG. 21, the stuffing data item is multiplexed into the end of the transmission data stream.

In this way, a transmission data stream is generated by multiplexing each of the single lines of the HD-SDIs on the channels 1 to 16 in accordance with the format shown in FIG. 21. A data item of pixel samples in each single line of each of the first to fourth sub-images generated from the first 4K signal as described above with reference to FIG. 13 is multiplexed into this transmission data stream corresponding to each single line.

Subsequently, in the same way, correspondingly to each line of the first to fourth sub-images generated from the first 4K signal, the data stream generating unit 133 of the multiplexing unit 112-1 generates the transmission data stream shown in FIG. 21, and supplies the transmission data stream to the P/S conversion unit 134.

Further, the data stream generating unit 133 of each of the multiplexing units 112-2 to 112-4 generates and supplies the transmission data stream to the P/S conversion unit 134 by executing the same process as that by the data stream generating unit 133 of the multiplexing unit 112-1. Specifically, the HD-SDIs on the channels 17 to 32 are multiplexed to generate a transmission data stream correspondingly to each line of first to fourth sub-images generated from the second 4K signal, and this transmission data stream is supplied to the P/S conversion unit 134. The HD-SDIs on the channels 33 to 48 are multiplexed to generate a transmission data stream correspondingly to each line of first to fourth sub-images generated from the third 4K signal, and this transmission data stream is supplied to the P/S conversion unit 134. The HD-SDIs on the channels 49 to 64 are multiplexed to generate a transmission data stream correspondingly to each line of first to fourth sub-images generated from the fourth 4K signal, and this transmission data stream is supplied to the P/S conversion unit 134.

In this way, transmission data streams in first to four lanes are generated from the 8K signal. Note that, the transmission data streams in the lanes each have a bit rate of 26.73 Gbps (=160 bits×167.0625 MHz).

Note that, the data block to be multiplexed into the transmission data streams are scrambled or subjected to 8B/10B conversion, and hence the transmission data streams each have a mark rate of substantially 1/2. In other words, the transmission data streams each sufficiently rise and fall, and hence serve as a signal suited to transmission.

Referring back to FIG. 10, in Step S4, the broadcasting camera 11a sends the transmission data streams.

Specifically, the P/S conversion unit 134 of the multiplexing unit 112-1 performs P/S conversion of the transmission data stream in the first lane, and supplies the transmission data stream to the transmission control unit 103. The P/S conversion unit 134 of the multiplexing unit 112-2 performs P/S conversion of the transmission data stream in the second lane, and supplies the transmission data stream to the transmission control unit 103. The P/S conversion unit 134 of the multiplexing unit 112-3 performs P/S conversion of the transmission data stream in the third lane, and supplies the transmission data stream to the transmission control unit 103. The P/S conversion unit 134 of the multiplexing unit 112-4 performs P/S conversion of the transmission data stream in the fourth lane, and supplies the transmission data stream to the transmission control unit 103.

The optical module 251S-1 of the transmission control unit 103 performs, for example, wavelength multiplexing of the data streams in the first to fourth lanes, and sends the data streams to the CCU 12 via the optical circulator 261S, the optical fiber 271-1, and the optical circulator 261R.

Note that, the data streams in the first to fourth lanes may be sent to the CCU 12 with both the optical modules 251S-1 and 251S-2, or only with the optical module 251S-2.

Note that, a bit rate of each of the transmission data streams may be set to any value that is an integral multiple of 148.5 MHz within a range of from 25 Gbps to 28.3 Gbps. Specifically, the bit rate of each of the transmission data streams can be set within a range of from 25.0965 Gbps (=148.5 MHz×169) to 28.215 Gbps (=148.5 MHz×190). Signal rates (bit rates) of the integral multiple of 148.5 MHz are suited to signal processes and clock system circuits.

In this context, description is made of an example of a data amount of stuffing data to be multiplexed into transmission data streams in a case where an 8K signal at 60P is transmitted as transmission data streams in four lanes at 26.73 Gbps.

In this case, a data amount of an HD-SDI to be multiplexed into a transmission data stream is 44,000 bits (2,200 samples×20 bits) per channel. Thus, a data amount of a video data item to be multiplexed into the transmission data stream is 704,000 bits (=44,000 bits×16 channels). In this context, the transmission data streams each have the bit rate of 26.73 Gbps, and hence a data amount per line is 792,000 bits (=26.73 Gbps÷(60 Hz÷2)=1,125 lines). Therefore, the data amount of the stuffing data (including the word synchronization signal) to be multiplexed into the transmission data streams is 88,000 bits (=792,000 bits−704,000 bits).

(Video Signal Reception Process According to First Embodiment)

Figure 23:
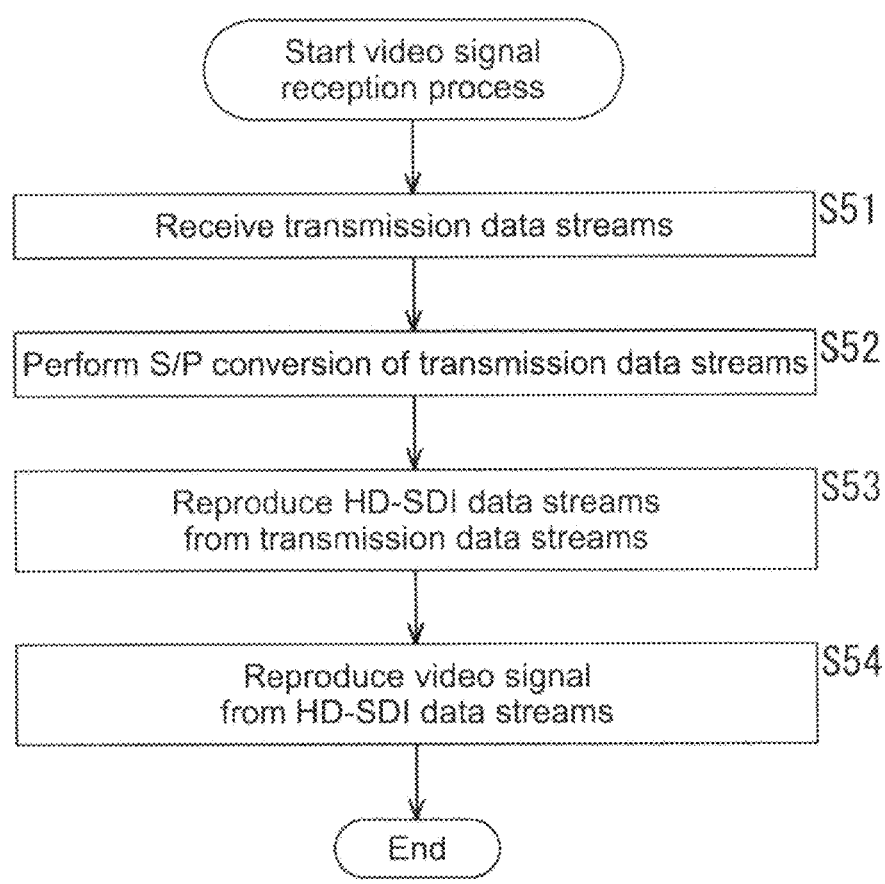
FIG. 23 is an explanatory flowchart of a video signal reception process according to the first embodiment.

Next, with reference to the flowchart of FIG. 23, description is made of a video signal reception process to be executed by the CCU 12a correspondingly to the video signal transmission process of FIG. 10.

In Step S51, the reception control unit 201 receives transmission data streams. Specifically, in the process of Step S4 in FIG. 10, the optical module 251R-1 of the reception control unit 201 receives four-lane transmission data streams sent from the broadcasting camera 11a. The optical module 251R-1 supplies the received four-lane transmission data streams to the S/P conversion-clock reproducing unit 211 of the signal processing unit 202.

In Step S52, the S/P conversion-clock reproducing unit 211 performs S/P conversion of the transmission data streams. Specifically, the S/P conversion-clock reproducing unit 211 performs S/P conversion of the four-lane transmission data streams, and supplies the four-lane transmission data streams to the word synchronization detection-data stream reproducing unit 212.

In Step S53, the word synchronization detection-data stream reproducing unit 212 reproduces HD-SDI data streams from the transmission data streams. Specifically, the word synchronization detection-data stream reproducing unit 212 detects word synchronization signals that are multiplexed in the four-lane transmission data streams so as to synchronize the words in the transmission data streams. Then, the word synchronization detection-data stream reproducing unit 212 executes processes reverse to those by the multiplexing units 112 of the broadcasting camera 11a so as to reproduce the HD-SDI data streams on 64 channels from the four-lane transmission data streams. Next, the word synchronization detection-data stream reproducing unit 212 supplies the reproduced HD-SDI data streams on 64 channels to the video reproducing unit 213.

In Step S54, the video reproducing unit 213 reproduces a video signal from the HD-SDI data streams. Specifically, the video reproducing unit 213 executes processes reverse to those by the mapping unit 111 of the broadcasting camera 11a so as to reproduce the original 8K signal from the HD-SDI data streams on 64 channels. Then, the video reproducing unit 213 supplies the reproduced 8K signal to the video processing unit 203.

In this way, the video signal of
7680×4320/50P-60P/4:4:4/10 bits or 12 bits,
7680×4320/50P-60P/4:2:2/12 bits,
8192×4320/48P-60P/4:4:4/10 bits or 12 bits, or
8192×4320/48P-60P/4:2:2/12 bits
can be transmitted in the form of the four-lane transmission data streams via 100 GbE devices.

4. Second Embodiment

Next, with reference to FIGS. 24 to 32, description is made of the second embodiment of the present technology.

In the second embodiment, an 8K signal at 48P-60P is transmitted via a 100 GbE device by a method other than that according to the first embodiment. As in the first embodiment, examples of the 8K signal at 48P-60P include video signals of
7680×4320/50P-60P/4:4:4/10 bits or 12 bits,
7680×4320/50P-60P/4:2:2/12 bits,
8192×4320/48P-60P/4:4:4/10 bits or 12 bits, and
8192×4320/48P-60P/4:2:2/12 bits.

(Configuration Example of Broadcasting Camera 11b)

Figure 24:
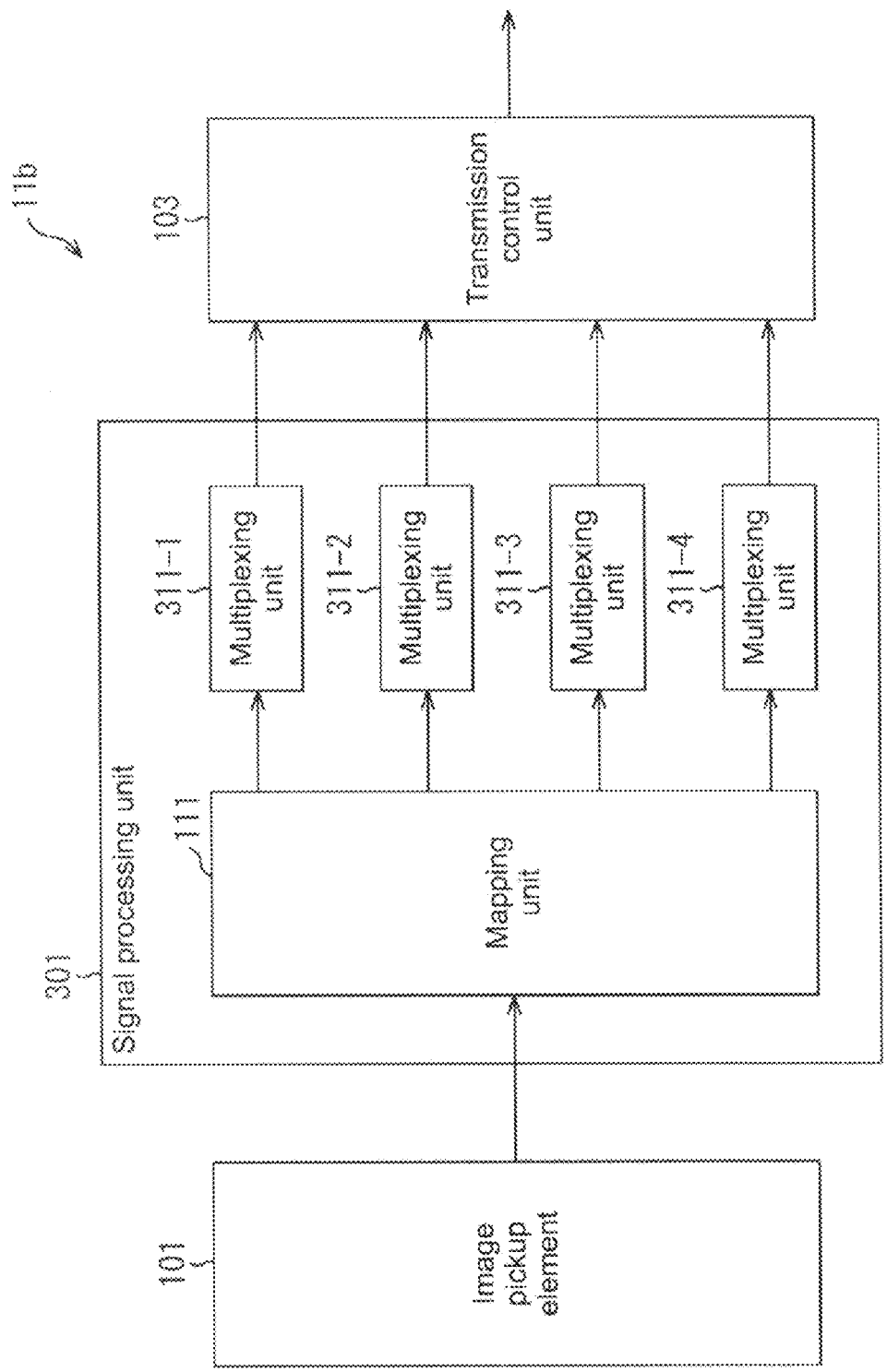
FIG. 24 is a block diagram showing a configuration example of functions of a broadcasting camera according to a second embodiment.

FIG. 24 is a block diagram showing a configuration example of functions of a broadcasting camera 11b as an embodiment of the broadcasting cameras 11 according to the second embodiment. Note that, in the figure, the parts equivalent to those of the broadcasting camera 11a of FIG. 5 are denoted by the same reference symbols, and redundant descriptions of parts to execute the same processes are omitted as appropriate.

The broadcasting camera 11b is different from the broadcasting camera 11a in that a signal processing unit 301 is provided instead of the signal processing unit 102. The signal processing unit 301 is different from the signal processing unit 102 in that multiplexing units 311-1 to 311-4 are provided instead of the multiplexing units 112-1 to 112-4.

As described below, the multiplexing units 311-1 to 311-4 each perform multiplexing by channel coding of the HD-SDIs on 16 channels supplied from the mapping unit 111. With this, transmission data streams are generated. Then, the multiplexing units 311-1 to 311-4 supply the generated transmission data streams to the transmission control unit 103.

Note that, in the following, unless the multiplexing units 311-1 to 311-4 need to be distinguished from each other, those units are simply referred to as multiplexing units 311.

(Configuration Example of Multiplexing Unit 311)

Figure 25:
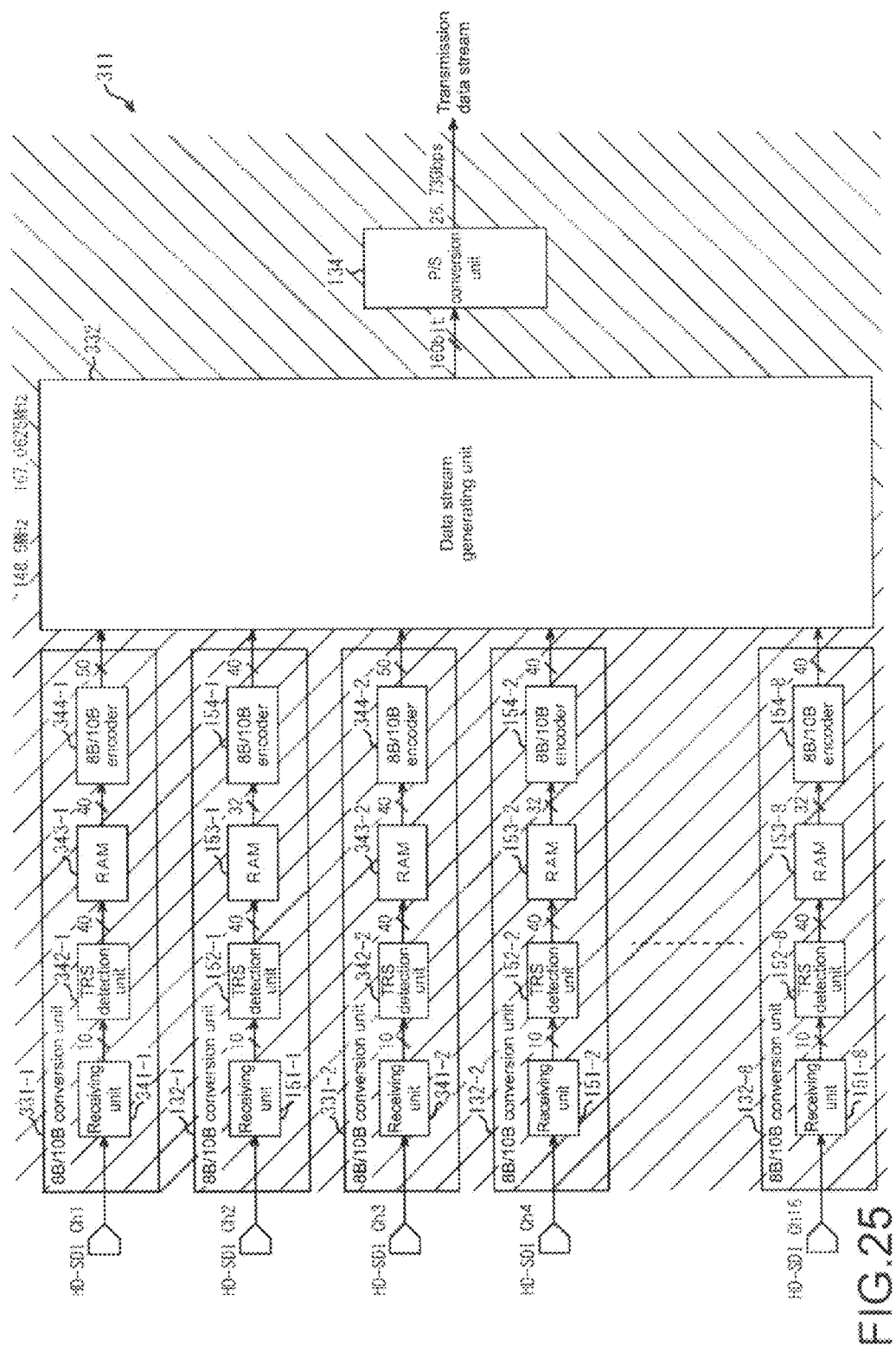
FIG. 25 is a block diagram showing a configuration example of functions of a multiplexing unit of the broadcasting camera according to the second embodiment.

FIG. 25 is a block diagram showing a configuration example of functions of the multiplexing unit 311. Note that, in the figure, the parts equivalent to those of the multiplexing unit 112 of FIG. 6 are denoted by the same reference symbols, and descriptions of parts to execute the same processes are omitted as appropriate.

The multiplexing unit 311 is different from the multiplexing unit 112 in that 8B/10B conversion units 331-1 to 331-8 are provided instead of the scrambling units 131-1 to 131-8 and in that data stream generating unit 332 is provided instead of the data stream generating unit 133. Further, the 8B/10B conversion units 331-i (i=1 to 8) respectively include receiving units 341-i, TRS detection units 342-i, RAMs 343-i, and 8B/10B conversion units 344-i.

HD-SDIs on odd-numbered channels are input respectively to the 8B/10B conversion units 331-1 to 331-8.

The receiving unit 341-1 of the 8B/10B conversion unit 331-1 performs S/P conversion and descrambling of the HD-SDI input thereto, and supplies the HD-SDI to the TRS detection unit 342-1. Further, the receiving unit 341-1 reproduces a clock signal that is superimposed on the HD-SDI, and supplies the clock signal to each of the units in the 8B/10B conversion unit 331-1.

The TRS detection unit 342-1 detects an SAV and an EAV included in the HD-SDI so as to synchronize words in the HD-SDI. Further, the TRS detection unit 342-1 extracts data in units of a predetermined bit (for example, 40 bits) sequentially from the head of the SAV of the HD-SDI, and stores the data to the RAM 343-1.

The 8B/10B encoder 344-1 reads the data from the RAM 343-1 in units of blocks of a predetermined bit (for example, 40 bits), and performs 8B/10B conversion of the read data. The 8B/10B encoder 344-1 supplies the data blocks obtained by the 8B/10B conversion to the data stream generating unit 332.

Note that, in the following, unless the 8B/10B conversion units 331-1 to 331-8 need to be distinguished from each other, those units are simply referred to as 8B/10B conversion units 331. Further, in the following, unless the receiving units 341-1 to 341-8, the TRS detection units 342-1 to 342-8, the RAMs 343-1 to 343-8, and the 8B/10B encoders 344-1 to 344-8 need to be distinguished from each other, those units are simply referred to respectively as receiving units 341, TRS detection units 342, RAMs 343, and 8B/10B encoders 344.

The data stream generating unit 332 generates a parallel transmission data stream having a predetermined word length by multiplexing the data blocks supplied from the 8B/10B encoders 154 and the 8B/10B encoders 344. The data stream generating unit 332 supplies the generated transmission data stream to the P/S conversion unit 134.

(Configuration Example of CCU 12b)

Figure 26:
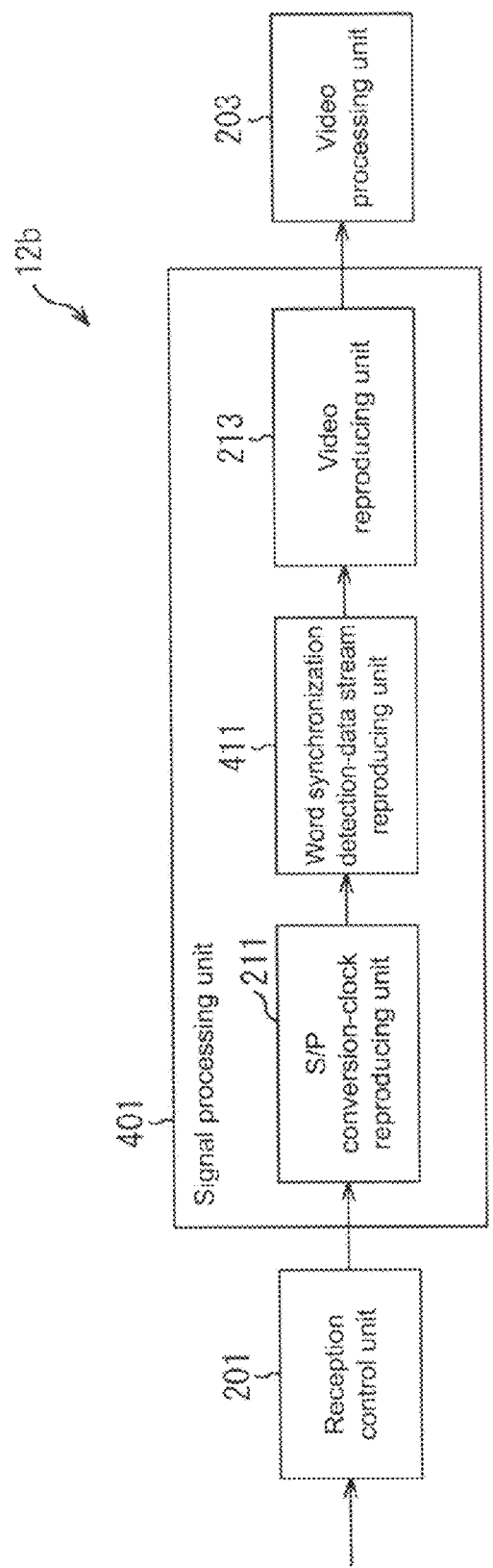
FIG. 26 is a block diagram showing a configuration example of functions of a CCU according to the second embodiment.

FIG. 26 is a block diagram showing a configuration example of functions of a CCU 12b as an embodiment of the CCU 12 according to the second embodiment. Note that, in the figure, the parts equivalent to those of the CCU 12a of FIG. 8 are denoted by the same reference symbols, and redundant descriptions of parts to execute the same processes are omitted as appropriate.

The CCU 12b is different from the CCU 12a in that a signal processing unit 401 is provided instead of the signal processing unit 202. The signal processing unit 401 is different from the signal processing unit 202 in that a word synchronization detection-data stream reproducing unit 411 is provided instead of the word synchronization detection-data stream reproducing unit 212.

The transmission data streams subjected to the S/P conversion are supplied from the S/P conversion-clock reproducing unit 211 to the word synchronization detection-data stream reproducing unit 411. Then, the word synchronization detection-data stream reproducing unit 411 detects word synchronization signals from the transmission data streams so as to synchronize words in the transmission data streams. Further, the word synchronization detection-data stream reproducing unit 411 executes processes reverse to those by the multiplexing units 311 of the broadcasting camera 11b so as to reproduce the HD-SDI data streams on 64 channels from the transmission data streams. Then, the word synchronization detection-data stream reproducing unit 411 supplies the HD-SDI data streams to the video reproducing unit 213.

(Video Signal Transmission Process According to Second Embodiment)

Figure 27:
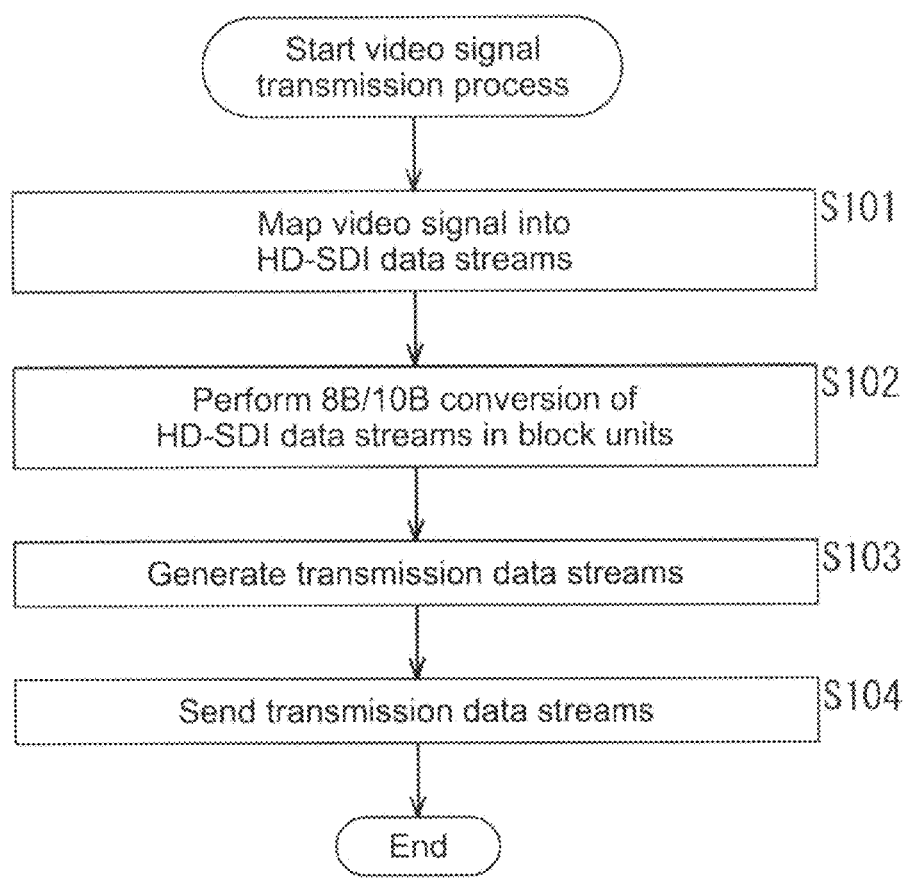
FIG. 27 is an explanatory flowchart of a video signal transmission process according to the second embodiment.

Next, with reference to the flowchart of FIG. 27, description is made of a video signal transmission process to be executed by the broadcasting camera 11b according to the second embodiment.

In Step S101, as well as the process of Step S1 in FIG. 10, a video signal (8K signal) is mapped into HD-SDIs on 64 channels. At this time, by the first multiplexing method described above with reference to FIG. 16 or the second multiplexing method described above with reference to FIG. 17, ancillary data and extra pixels are multiplexed into a horizontal ancillary data area of each of the HD-SDIs on 64 channels.

In Step S102, the multiplexing units 311-1 to 311-4 each perform 8B/10B conversion of the HD-SDIs in block units.

Specifically, the HD-SDI on the channel 1 is input to the receiving unit 341-1 of the 8B/10B conversion unit 331-1 of the multiplexing unit 311-1. The receiving unit 341-1 performs the S/P conversion and the descrambling of the HD-SDI input thereto, and extracts data in units of 1 word (10 bits) in synchronization with the clock signal of 148.5 MHz. Then, the receiving unit 341-1 supplies the data to the TRS detection unit 342-1.

The TRS detection unit 342-1 detects the SAV and the EAV included in the HD-SDI so as to synchronize the words in the HD-SDI. Then, the TRS detection unit 342-1 extracts data in units of 40 bits sequentially from the head of the SAV of the HD-SDI in four clocks (10 bits×4 clocks) of the clock signal of 148.5 MHz, and stores the data to the RAM 343-1.

The 8B/10B encoder 344-1 reads blocks of the data in the units of 40 bits from the RAM 343-1 in each set of four clocks of the clock signal of 148.5 MHz, and performs 8B/10B conversion of the read data blocks. Then, the 8B/10B encoder 344-1 supplies 50-bit data blocks obtained by the 8B/10B conversion to the data stream generating unit 332.

Figure 28:
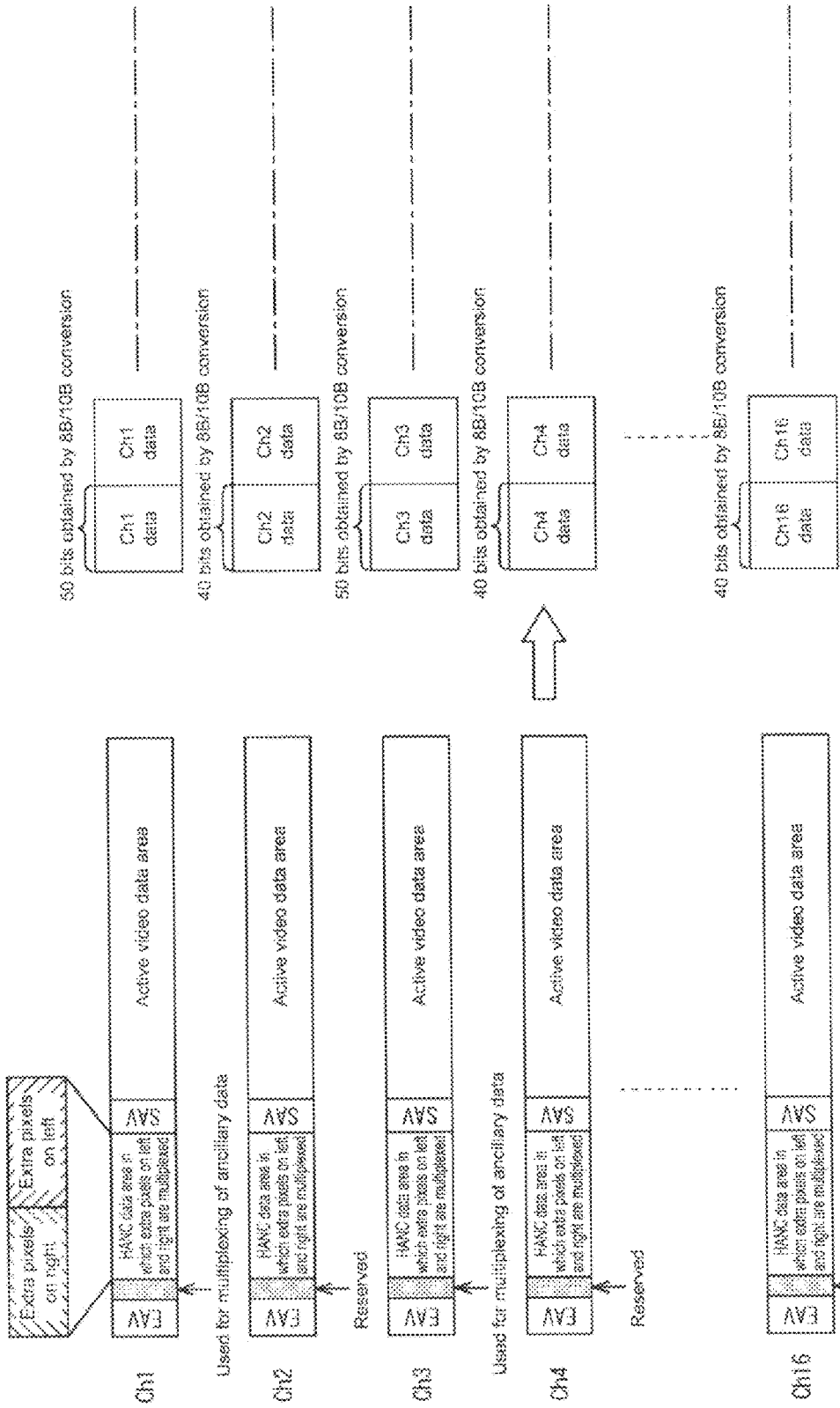
FIG. 28 is an explanatory diagram of a first example of a multiplexing method for ancillary data and extra pixels and a method of generating data blocks in the video signal transmission process according to the second embodiment.
Figure 29:
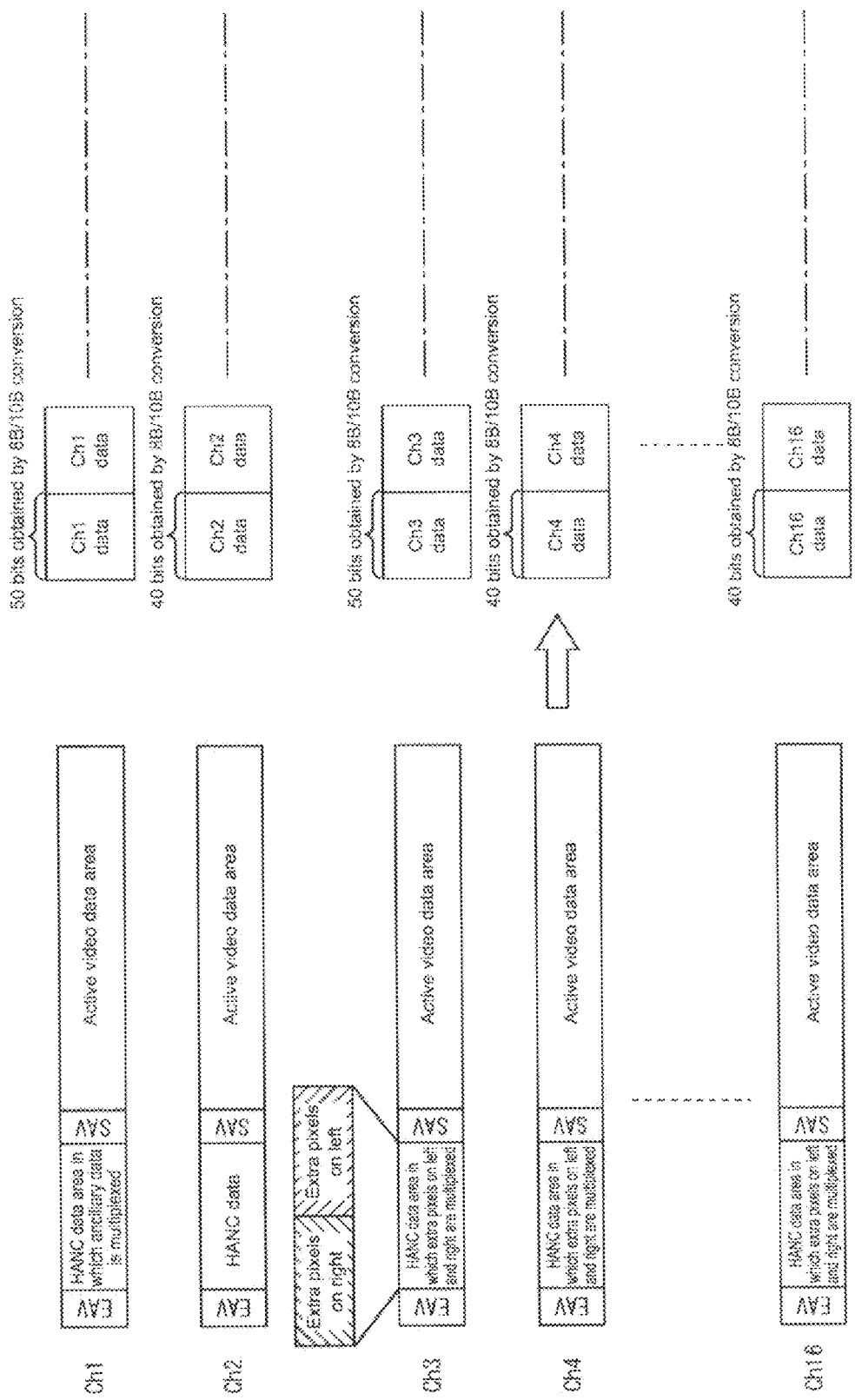
FIG. 29 is an explanatory diagram of a second example of the multiplexing method for ancillary data and extra pixels and the method of generating data blocks in the video signal transmission process according to the second embodiment.

Note that, as shown in the right parts of FIGS. 28 and 29, also in HD-SDIs on the other odd-numbered channels, which are also input to the multiplexing unit 311-1, 8B/10B conversion in the units of blocks of 40 bits is performed sequentially from the head of an SAV. Then, the 50-bit data blocks obtained by the 8B/10B conversion are supplied to the data stream generating unit 332.

Note that, HD-SDIs on even-numbered channels are subjected to the same process as that according to the first embodiment. Specifically, 32-bit data items of 40-bit data blocks are extracted sequentially from the head of an SAV of each of the HD-SDIs on the even-numbered channels, and subjected to 8B/10B conversion. Then, 40-bit data blocks obtained by the 8B/10B conversion are supplied to the data stream generating unit 332.

Figure 30:
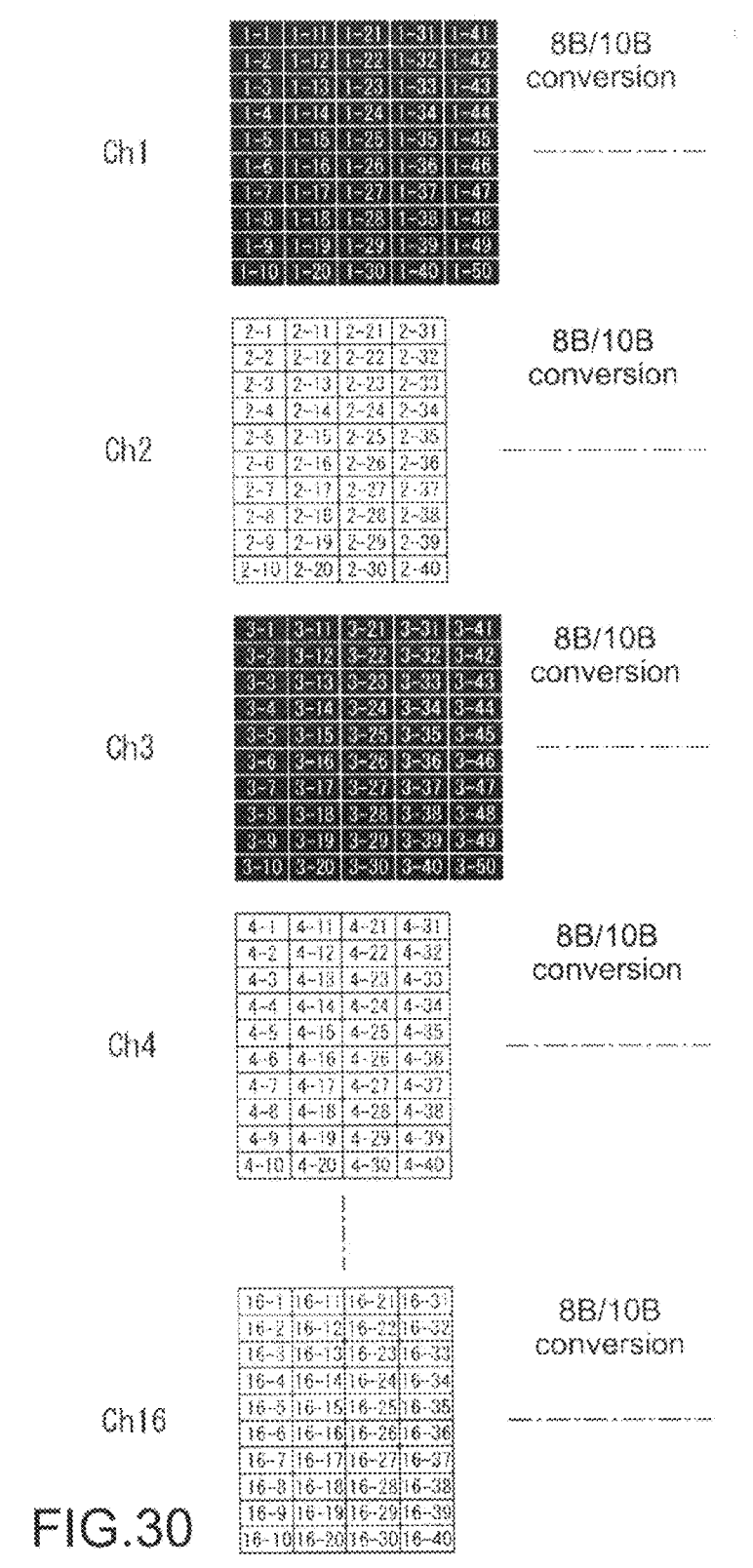
Figure 31:
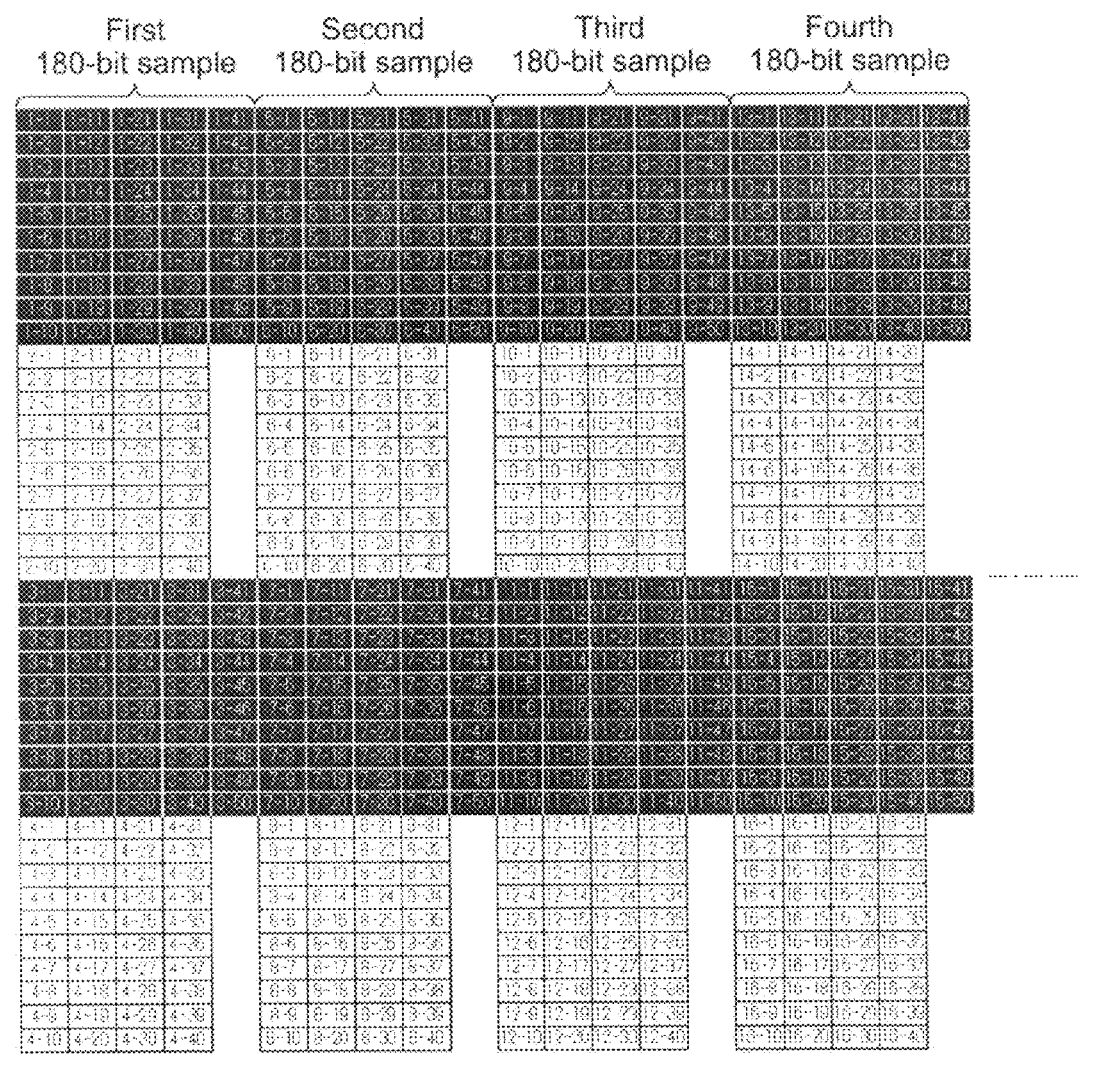

In this way, as shown schematically in FIG. 30, the 50-bit or 40-bit data blocks generated from HD-SDIs on channels 1 to 16 are supplied to the data stream generating unit 332 in each of the sets of four clocks. With this, as modeled in FIG. 31, substantially, a process of supplying a 180-bit/sample data item to the data stream generating unit 332 in each clock is repeated in cycles of four clocks. Thus, data streams of substantially 180 bits×148.5 MHz are supplied to the data stream generating unit 332.

Note that, the same process is executed also in the multiplexing units 311-2 to 311-4. Specifically, of the HD-SDIs on 16 channels, which are input to each of the multiplexing units 311, the 8B/10B conversion in the units of blocks of 40 bits is performed sequentially from the head of an SAV of each of the HD-SDIs on odd-numbered channels. Then, the 50-bit data blocks obtained by the 8B/10B conversion are supplied to the data stream generating unit 332. Further, 32-bit data items of 40-bit data blocks are extracted sequentially from the head of an SAV of each of the HD-SDIs on even-numbered channels, and subjected to the 8B/10B conversion. Then, 40-bit data blocks obtained by the 8B/10B conversion are supplied to the data stream generating unit 332.

Referring back to FIG. 27, in Step S103, the multiplexing units 311 generate the transmission data streams.

Specifically, in synchronization with the clock signal of 167.0625 MHz, the data stream generating unit 332 of the multiplexing unit 311-1 arrays, in a predetermined order, the data blocks supplied from the 8B/10B encoders 154 and the 8B/10B encoders 344, and extracts data in 160-bit units. Then, the data stream generating unit 332 generates parallel data having a 160-bit word length from the extracted data, and outputs the parallel data to the P/S conversion unit 134.

In this way, a transmission data stream is generated by multiplexing the HD-SDIs on the channels 1 to 16, and supplied to the P/S conversion unit 134. Further, the bit rate of the data stream is converted from 180 bits×148.5 MHz to 160 bits×167.0625 MHz.

Further, at this time, the data stream generating unit 332 overwrites a data item of first two or more words (20 bits or more) from an SAV of each line of the HD-SDI on the channel 1 with the comma character for 8B/10B codes, such as K28.5. The overwritten data item is used as a synchronization signal for the transmission data stream.

Further, the data stream generating unit 332 of each of the multiplexing units 311-2 to 311-4 generates and supplies the transmission data stream to the P/S conversion unit 134 by executing the same process as that by the data stream generating unit 332 of the multiplexing unit 311-1.

Note that, as well as that of the HD-SDIs on the channel 1, a data item of first two or more words from an SAV of each line of each of the HD-SDIs on the channels 17, 33, and 49 is overwritten by the comma character for 8B/10B codes, such as K28.5.

In Step S104, by the same process as that of Step S4 in FIG. 10, those four-lane transmission data streams are sent.

(Video Signal Reception Process According to Second Embodiment)

Figure 32:
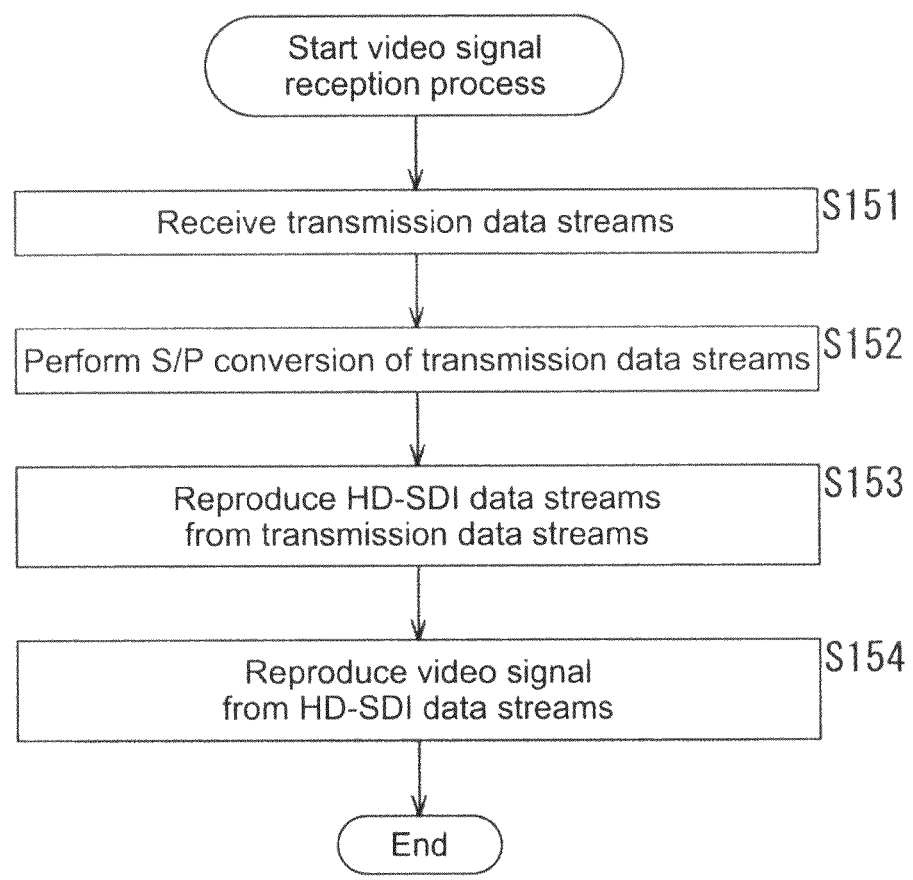
FIG. 32 is an explanatory flowchart of a video signal reception process according to the second embodiment.

Next, with reference to the flowchart of FIG. 32, description is made of a video signal reception process to be executed by the CCU 12b correspondingly to the video signal transmission process of FIG. 27.

In Step S151, by the same process as that of Step S51 in FIG. 23, the four-lane transmission data streams are received.

In Step S152, by the same process as that of Step S52 in FIG. 23, the four-lane transmission data streams are subjected to the S/P conversion.

In Step S153, the word synchronization detection-data stream reproducing unit 411 reproduces HD-SDI data streams from the transmission data streams. Specifically, the word synchronization detection-data stream reproducing unit 411 detects word synchronization signals that are multiplexed in the four-lane transmission data streams so as to synchronize the words in the transmission data streams. Then, the word synchronization detection-data stream reproducing unit 411 executes processes reverse to those by the multiplexing units 311 of the broadcasting camera 11b so as to reproduce the HD-SDI data streams on 64 channels from the four-lane transmission data streams. Next, the word synchronization detection-data stream reproducing unit 411 supplies the reproduced HD-SDI data streams on 64 channels to the video reproducing unit 213.

In Step S154, by the same process as that of Step S54 in FIG. 23, the original 8K signal is reproduced from the HD-SDIs on 64 channels.

In this way, the video signal of
  7680×4320/50P-60P/4:4:4/10 bits or 12 bits,
  7680×4320/50P-60P/4:2:2/12 bits,
  8192×4320/48P-60P/4:4:4/10 bits or 12 bits, or
  8192×4320/48P-60P/4:2:2/12 bits
can be transmitted in the form of the four-lane transmission data streams via 100 GbE devices by the method other than that according to the first embodiment.

5. Third Embodiment

Next, with reference to FIGS. 33 to 41, description is made of the third embodiment of the present technology.

In the third embodiment, an 8K signal at 48P-60P is transmitted via a 100 GbE device. Examples of the 8K signal at 48P-60P include video signals of
  7680×4320/50P-60P/4:2:2/10 bits and
  8192×4320/48P-60P/4:2:2/10 bits.

(Configuration Example of Broadcasting Camera 11c)

Figure 33:
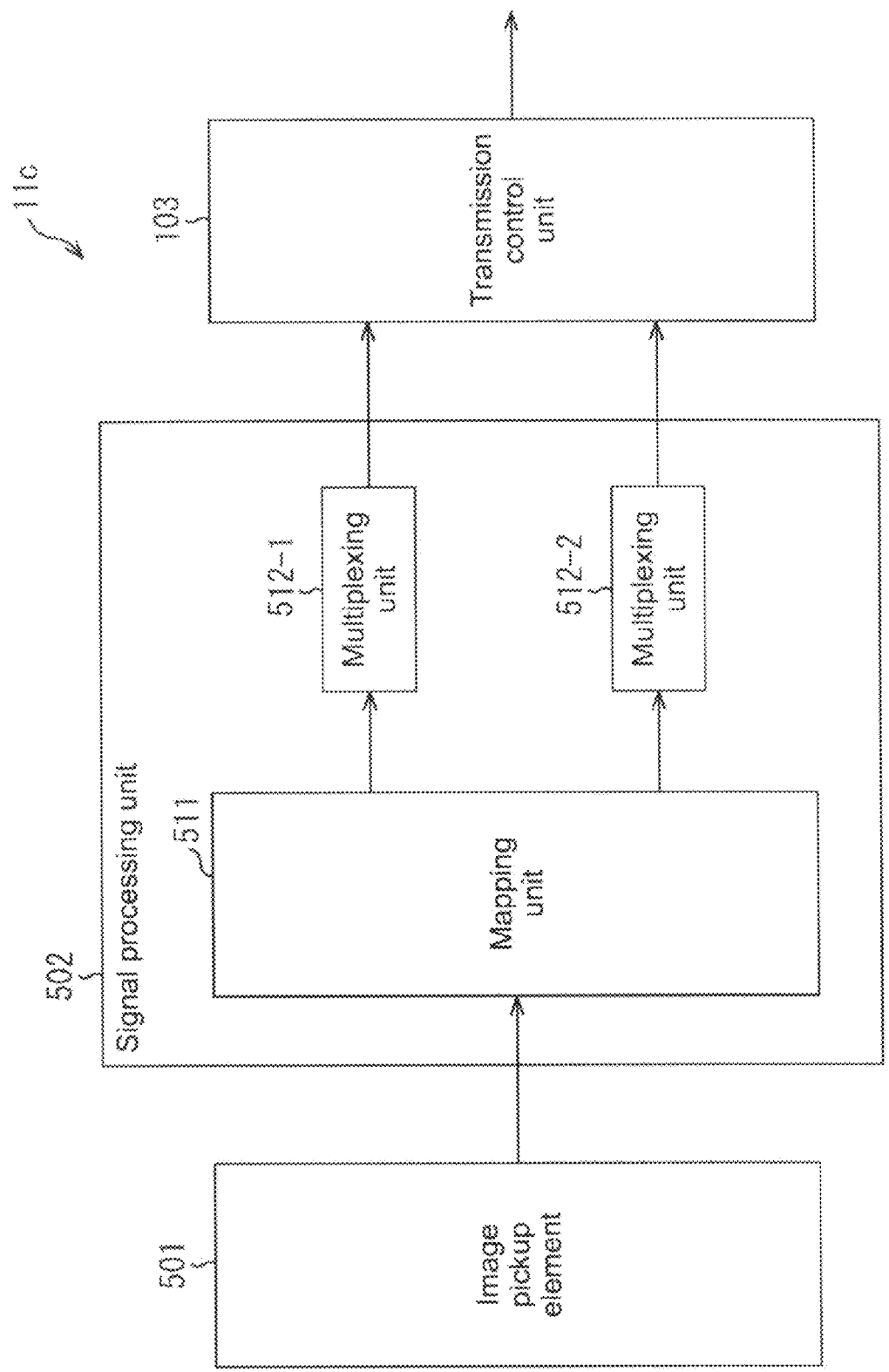
FIG. 33 is a block diagram showing a configuration example of functions of a broadcasting camera according to a third embodiment.

FIG. 33 is a block diagram showing a configuration example of functions of a broadcasting camera 11c as an embodiment of the broadcasting cameras 11 according to the third embodiment. Note that, in the figure, the parts equivalent to those of the broadcasting camera 11b of FIG. 24 are denoted by the same reference symbols, and redundant descriptions of parts to execute the same processes are omitted as appropriate.

The broadcasting camera 11c is different from the broadcasting camera 11b in that an image pickup element 501 and a signal processing unit 502 are provided respectively instead of the image pickup element 101 and the signal processing unit 301. The signal processing unit 502 includes a mapping unit 511 and multiplexing units 512-1 and 512-2.

Examples of the image pickup element 501 include a CMOS image sensor and a CCD image sensor. The image pickup element 501 supplies video signals obtained as a result of imaging to the mapping unit 511 of the signal processing unit 502. Examples of the video signals include video signals of
  7680×4320/50P-60P/4:2:2/10 bits and
  8192×4320/48P-60P/4:2:2/10 bits.

As described below, the mapping unit 511 maps the video signal supplied from the image pickup element 501 so as to generate HD-SDIs on 32 channels. Then, the mapping unit 511 supplies HD-SDIs on channels 1 to 16 to the multiplexing unit 512-1, and supplies HD-SDIs on channels 17 to 32 to the multiplexing unit 512-2.

As described below, the multiplexing units 512-1 and 512-2 each perform multiplexing by channel coding of the HD-SDIs on 16 channels supplied from the mapping unit 511. With this, transmission data streams are generated. Then, the multiplexing units 512-1 and 512-2 supply the generated transmission data streams to the transmission control unit 103.

Note that, in the following, unless the multiplexing units 512-1 and 512-2 need to be distinguished from each other, those units are simply referred to as multiplexing units 512.

(Configuration Example of Multiplexing Unit 512)

Figure 34:
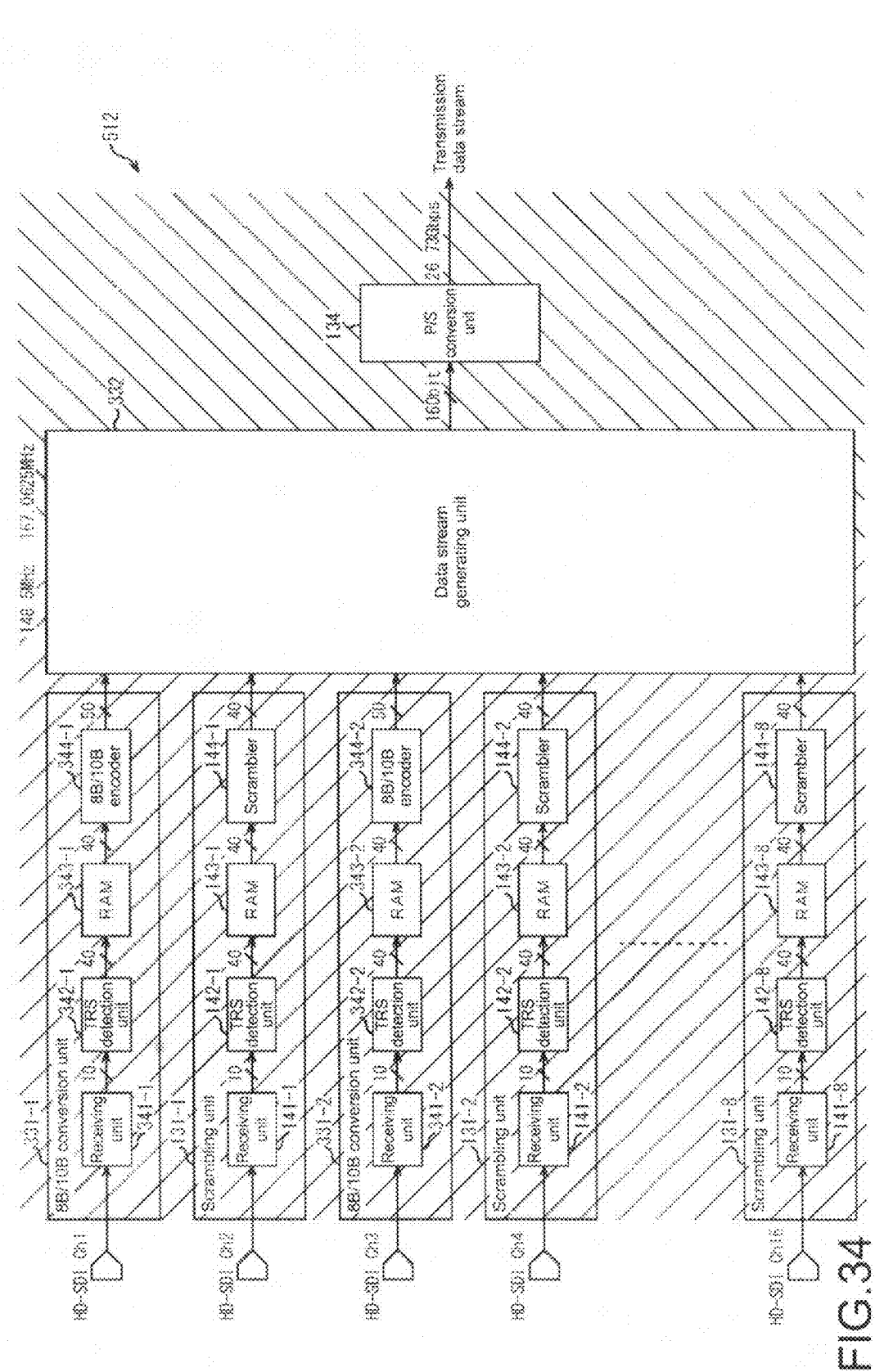
FIG. 34 is a block diagram showing a configuration example of functions of a multiplexing unit of the broadcasting camera according to the third embodiment.

FIG. 34 is a block diagram showing a configuration example of functions of the multiplexing unit 512. Note that, in the figure, the parts equivalent to those of the multiplexing unit 112 of FIG. 6 and the multiplexing unit 311 of FIG. 25 are denoted by the same reference symbols, and descriptions of parts to execute the same processes are omitted as appropriate.

The multiplexing unit 512 is different from the multiplexing unit 311 in that the scrambling units 131-1 to 131-8 are provided instead of the 8B/10B conversion units 132-1 to 132-8.

Thus, in each of the multiplexing units 512, similar to the HD-SDIs on the odd-numbered channels in each of the multiplexing units 311, HD-SDIs on odd-numbered channels are subjected to 8B/10B conversion in unit of 40 bits. Further, in each of the multiplexing units 512, similar to the HD-SDIs on the odd-numbered channels in each of the multiplexing units 112, HD-SDIs on even-numbered channels are scrambled in unit of 40 bits.

(Configuration Example of CCU 12c)

Figure 35:
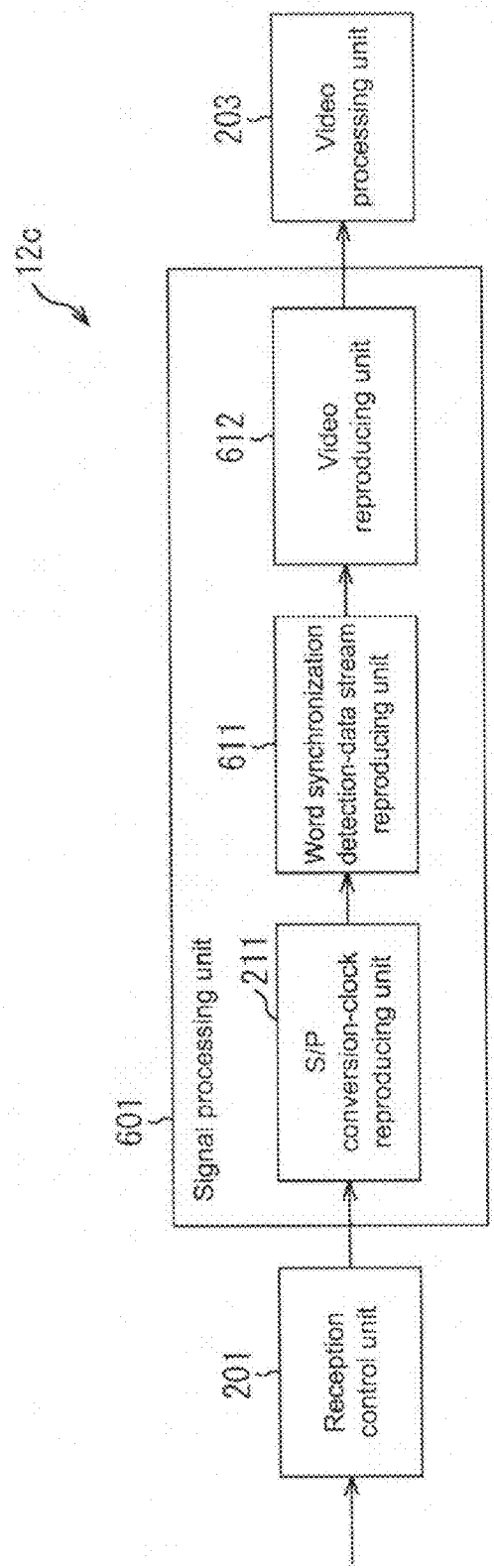
FIG. 35 is a block diagram showing a configuration example of functions of a CCU according to the third embodiment.

FIG. 35 is a block diagram showing a configuration example of functions of a CCU 12c as an embodiment of the CCU 12 according to the third embodiment. Note that, in the figure, the parts equivalent to those of the CCU 12b of FIG. 26 are denoted by the same reference symbols, and redundant descriptions of parts to execute the same processes are omitted as appropriate.

The CCU 12c is different from the CCU 12b in that a signal processing unit 601 is provided instead of the signal processing unit 401. The signal processing unit 601 is different from the signal processing unit 401 in that a word synchronization detection-data stream reproducing unit 611 and a video reproducing unit 612 are provided respectively instead of the word synchronization detection-data stream reproducing unit 411 and the video reproducing unit 213.

The transmission data streams subjected to the S/P conversion are supplied from the S/P conversion-clock reproducing unit 211 to the word synchronization detection-data stream reproducing unit 611. Then, the word synchronization detection-data stream reproducing unit 611 detects word synchronization signals from the transmission data streams so as to synchronize words in the transmission data streams. Further, the word synchronization detection-data stream reproducing unit 611 executes processes reverse to those by the multiplexing units 512 of the broadcasting camera 11c so as to reproduce the HD-SDI data streams on 32 channels from the transmission data streams. Then, the word synchronization detection-data stream reproducing unit 611 supplies the HD-SDI data streams to the video reproducing unit 612.

The video reproducing unit 612 executes processes reverse to those by the mapping unit 511 of the broadcasting camera 11c so as to reproduce the original 8K signal from the HD-SDI data streams on 32 channels. Then, the video reproducing unit 612 supplies the 8K signal to the video processing unit 203.

(Video Signal Transmission Process According to Third Embodiment)

Figure 36:
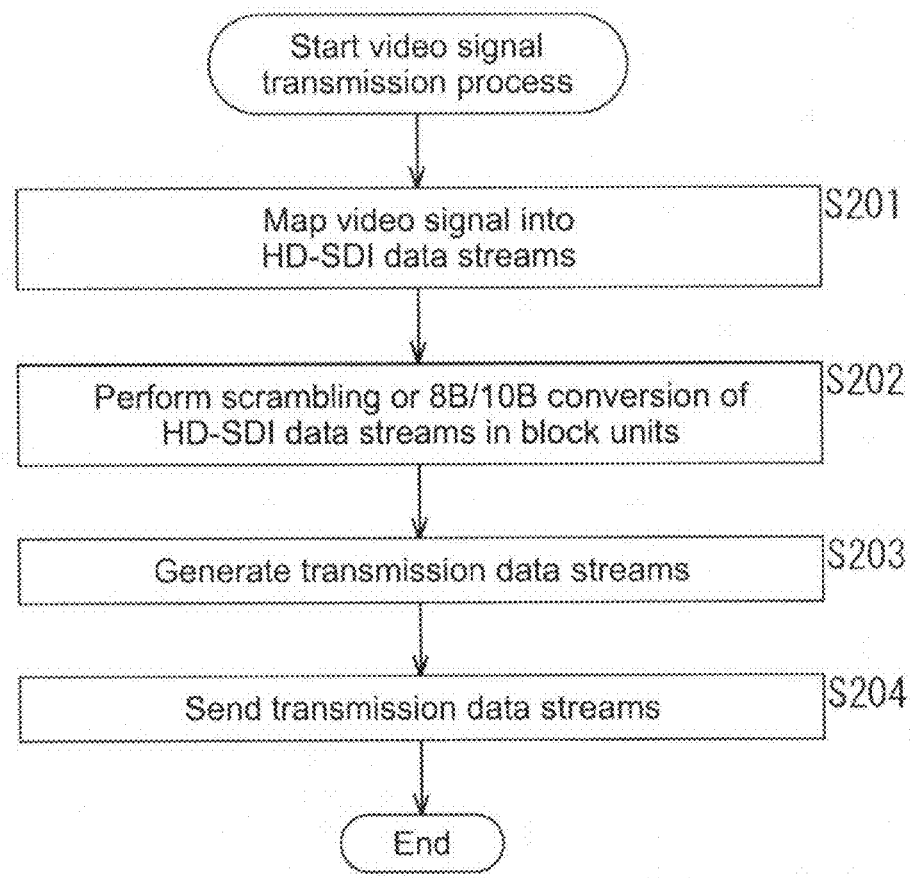
FIG. 36 is an explanatory flowchart of a video signal transmission process according to the third embodiment.

Next, with reference to the flowchart of FIG. 36, description is made of a video signal transmission process to be executed by the broadcasting camera 11c according to the third embodiment.

In Step S201, the mapping unit 511 of the signal processing unit 502 maps a video signal into HD-SDI data streams. Specifically, the mapping unit 511 maps an 8K signal into HD-SDIs on 32 channels. In this context, referring back to FIG. 14, description is made of a specific example of the method of mapping the 8K signal into the HD-SDIs on 32 channels.

The third embodiment is different from the first and second embodiments in that interlaced video signals generated by line thinning-out of sub-images are mapped only into the HD-SDIs on the links A (described as basic stream in FIG. 14) without using the links B. Thus, HD-SDIs on a total of 32 channels are generated from the 8K signal.

Further, multiplexing methods for ancillary data and extra pixels in the third embodiment are different from those in the first and second embodiments.

(First Multiplexing Method for Ancillary Data and Extra Pixels)

Figure 37:
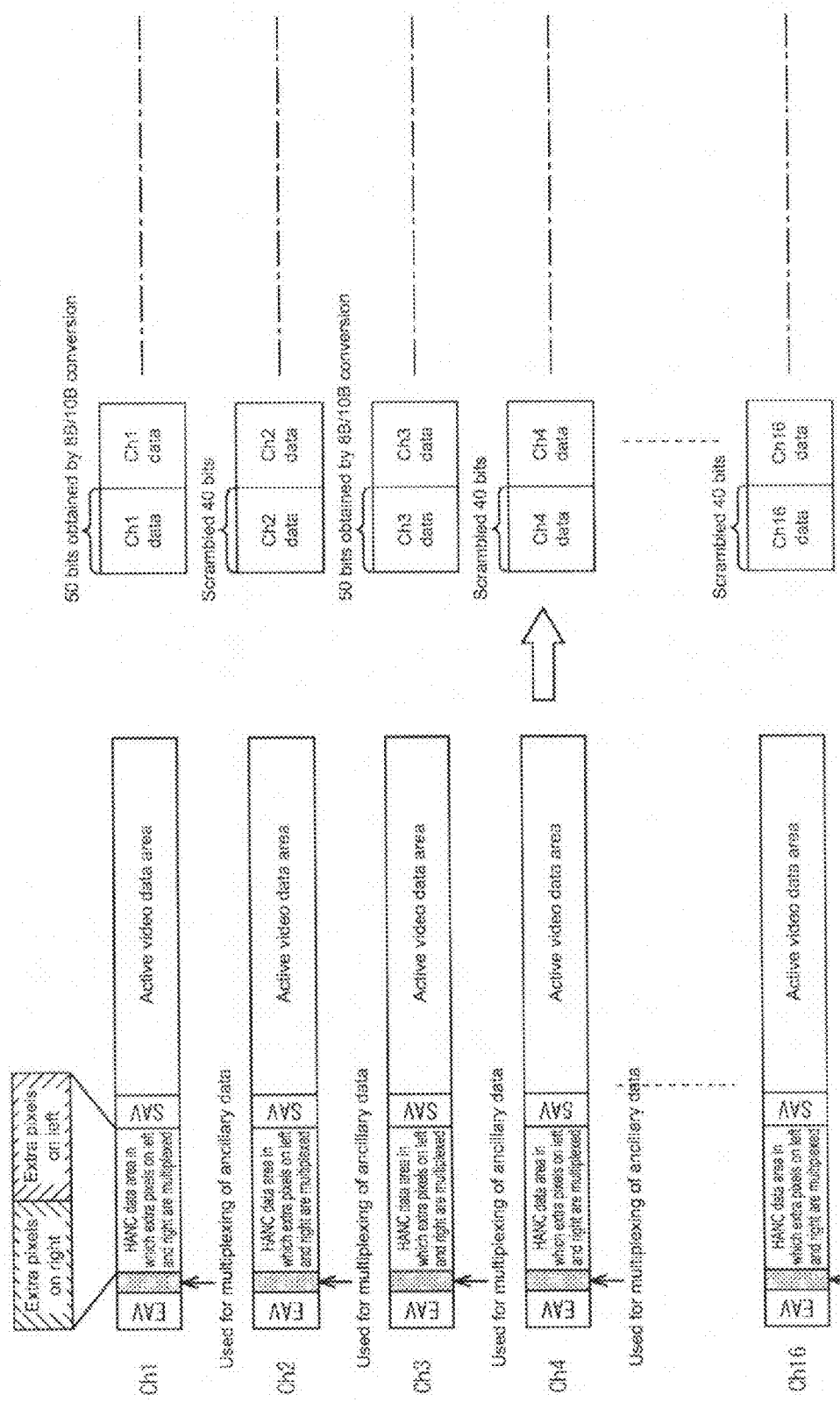
FIG. 37 is an explanatory diagram of a first example of a multiplexing method for ancillary data and extra pixels and a method of generating data blocks in the video signal transmission process according to the third embodiment.

The left part of FIG. 37 shows a first multiplexing method for ancillary data and extra pixels. Note that, FIG. 37 shows only HD-SDIs on channels 1 to 16, which are supplied from the mapping unit 511 to the multiplexing unit 512-1. However, ancillary data and extra pixels are similarly multiplexed into HD-SDIs on the other channels 17 to 32.

In the first multiplexing method according to the third embodiment, the channels of HD-SDIs into which ancillary data is multiplexed are different from those in the first multiplexing method according to the first embodiment.

Specifically, in the first multiplexing method according to the first embodiment, which is shown in FIG. 16, the ancillary data multiplexing areas on odd-numbered channels are used, and the ancillary data multiplexing areas on even-numbered channels are not used. Meanwhile, in the third embodiment, as described below, at the time of generating the transmission data streams, 8B/10B conversion or scrambling is performed by using all the bits in each word of HD-SDIs on both odd-numbered channels and even-numbered channels. Thus, in the third embodiment, the ancillary data multiplexing areas on both the odd-numbered channels and the even-numbered channels can be used.

Thus, in the first multiplexing method according to the third embodiment, ancillary data is multiplexed into all the ancillary data multiplexing areas of all the HD-SDIs on 32 channels. With this, up to 32 audio data packets can be multiplexed into the HD-SDIs on 32 channels.

Thus, as well as the first multiplexing method according to the first embodiment, the 32-kHz, the 44.1-kHz, or the 48-kHz sampled audio signals on up to 64 channels can be multiplexed and transmitted. Further, the 96-kHz sampled audio signals on up to 32 channels can be multiplexed and transmitted.

Note that, values of the extra pixel multiplexing area relative proportion are the same as those in the first multiplexing method according to the first embodiment.

(Second Multiplexing Method for Ancillary Data and Extra Pixels)

Figure 38:
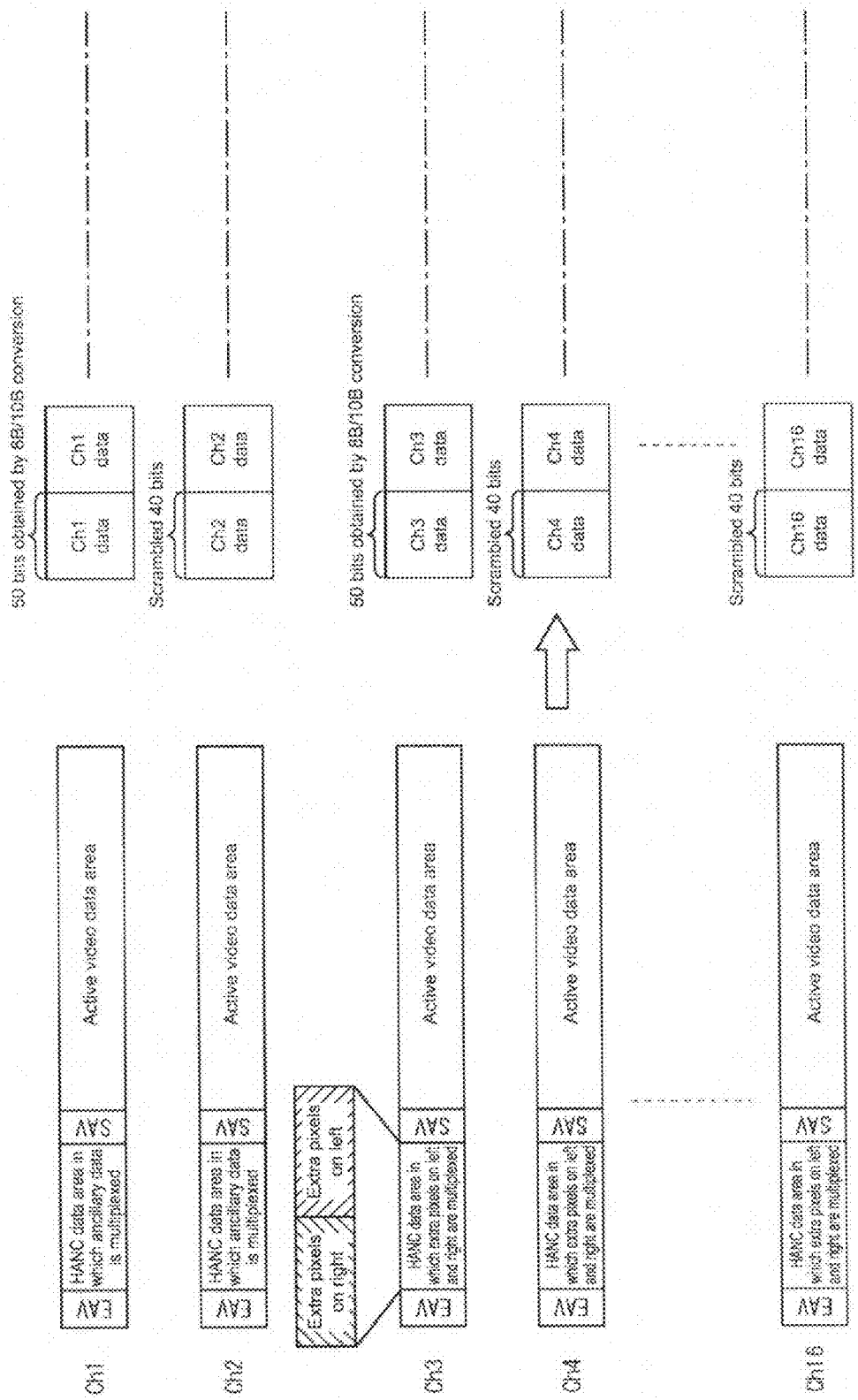
FIG. 38 is an explanatory diagram of a second example of the multiplexing method for ancillary data and extra pixels and the method of generating data blocks in the video signal transmission process according to the third embodiment.

The left part of FIG. 38 shows a second multiplexing method for ancillary data and extra pixels. The second multiplexing method is used, for example, in a case where audio signals are preferentially multiplexed, or a case where data items of pixel samples in left and right extra pixel areas need not be multiplexed.

Note that, FIG. 38 shows only the HD-SDIs on the channels 1 to 16, which are supplied from the mapping unit 511 to the multiplexing unit 512-1. However, ancillary data and extra pixels are similarly multiplexed into the HD-SDIs on the other channels 17 to 32.

In the second multiplexing method according to the third embodiment, the channels of HD-SDIs into which ancillary data is multiplexed are different from those in the second multiplexing method according to the first embodiment.

Specifically, in the second multiplexing method according to the first embodiment, which is shown in FIG. 17, ancillary data items are multiplexed into the horizontal ancillary data areas of the HD-SDIs on the channels 1, 17, 33, and 49. Meanwhile, in the second multiplexing method according to the third embodiment, ancillary data items are multiplexed into HD-SDIs on channels 1, 2, 17, and 18.

In this case, in accordance with the specifications of SMPTE 299-1, up to four audio data packets are multiplexed twice into the horizontal ancillary data area of the HD-SDI on each of the channels 1, 2, 17, and 18. With this, up to 32 audio data packets can be multiplexed into the HD-SDIs on 32 channels.

Thus, as well as the second multiplexing method according to the first embodiment, the 32-kHz, the 44.1-kHz, or the 48-kHz sampled audio signals on up to 64 channels can be multiplexed and transmitted. Further, the 96-kHz sampled audio signals on up to 32 channels can be multiplexed and transmitted.

Note that, in a case where the active video data area of each of the HD-SDIs occupies 2,048 samples, the 32-kHz, the 44.1-kHz, or the 48-kHz sampled audio signals on up to 32 channels can be multiplexed and transmitted. Further, the 96-kHz sampled audio signals on up to 16 channels can be multiplexed and transmitted.

Values of the extra pixel multiplexing area relative proportion are obtained using the following equations (11) to (15). Note that, the equation (11) represents a proportion in a case where a 7680×4320/60P video signal is transmitted, and the equation (12) represents a proportion in a case where a 7680×4320/50P video signal is transmitted. The equation (13) represents a proportion in a case where an 8192×4320/60P video signal is transmitted, and the equation (14) represents a proportion in a case where an 8192×4320/50P video signal is transmitted. The equation (15) represents a proportion in a case where an 8192×4320/24P video signal is transmitted.

$$(2200-1920-12)\times 28\div 32\div 1920=0.122=12.2\% \quad (11)$$

$$(2640-1920-12)\times 28\div 32\div 1920=0.323=32.3\% \quad (12)$$

$$(2200-2048-12)\times 28\div 32\div 2048=0.059=5.9\% \quad (13)$$

$$(2640-2048-12)\times 28\div 32\div 2048=0.248=24.8\% \quad (14)$$

$$(2750-2048-12)\times 28\div 32\div 2048=0.295=29.5\% \quad (15)$$

Consequently, values equal to those obtained by the second multiplexing method according to the first embodiment are obtained.

In this way, the 8K signal is mapped into HD-SDIs on 32 channels. Note that, the method of mapping the 8K signal described above is merely an example, and the 8K signal may be mapped into HD-SDIs on 32 channels by using other methods.

Then, the mapping unit 511 supplies the HD-SDIs on the channels 1 to 16 to the multiplexing unit 112-1, and supplies the HD-SDIs on the channels 17 to 32 to the multiplexing unit 512-2.

Referring back to FIG. 36, in Step S202, the multiplexing units 512 perform scrambling or 8B/10B conversion of the HD-SDIs in block units.

Specifically, HD-SDIs on odd-numbered channels are subjected to the same process as the process on the HD-SDIs on the odd-numbered channels in the second embodiment. More specifically, 8B/10B conversion in the units of blocks of 40 bits is performed sequentially from the head of an SAV of each of the HD-SDIs on the odd-numbered channels. Then, 50-bit data blocks obtained by the 8B/10B conversion are supplied to the data stream generating unit 332.

Further, HD-SDIs on even-numbered channels are subjected to the same process as the process on the HD-SDIs on the even-numbered channels in the first embodiment. Specifically, scrambling in the units of blocks of 40 bits is performed sequentially from the head of an SAV of each of the HD-SDIs on the even-numbered channels. Then, the scrambled 40-bit data blocks are supplied to the data stream generating unit 332.

Figure 39:
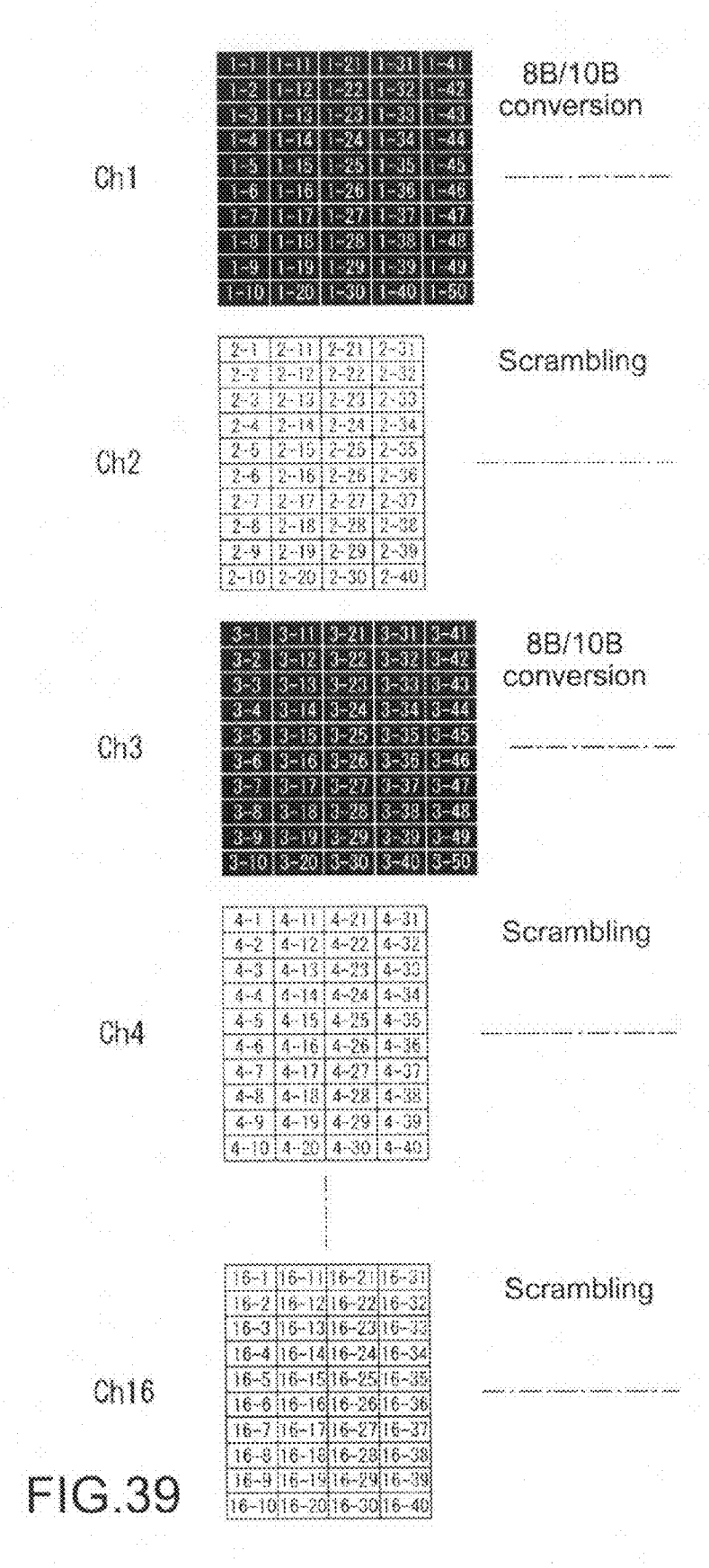
Figure 40:
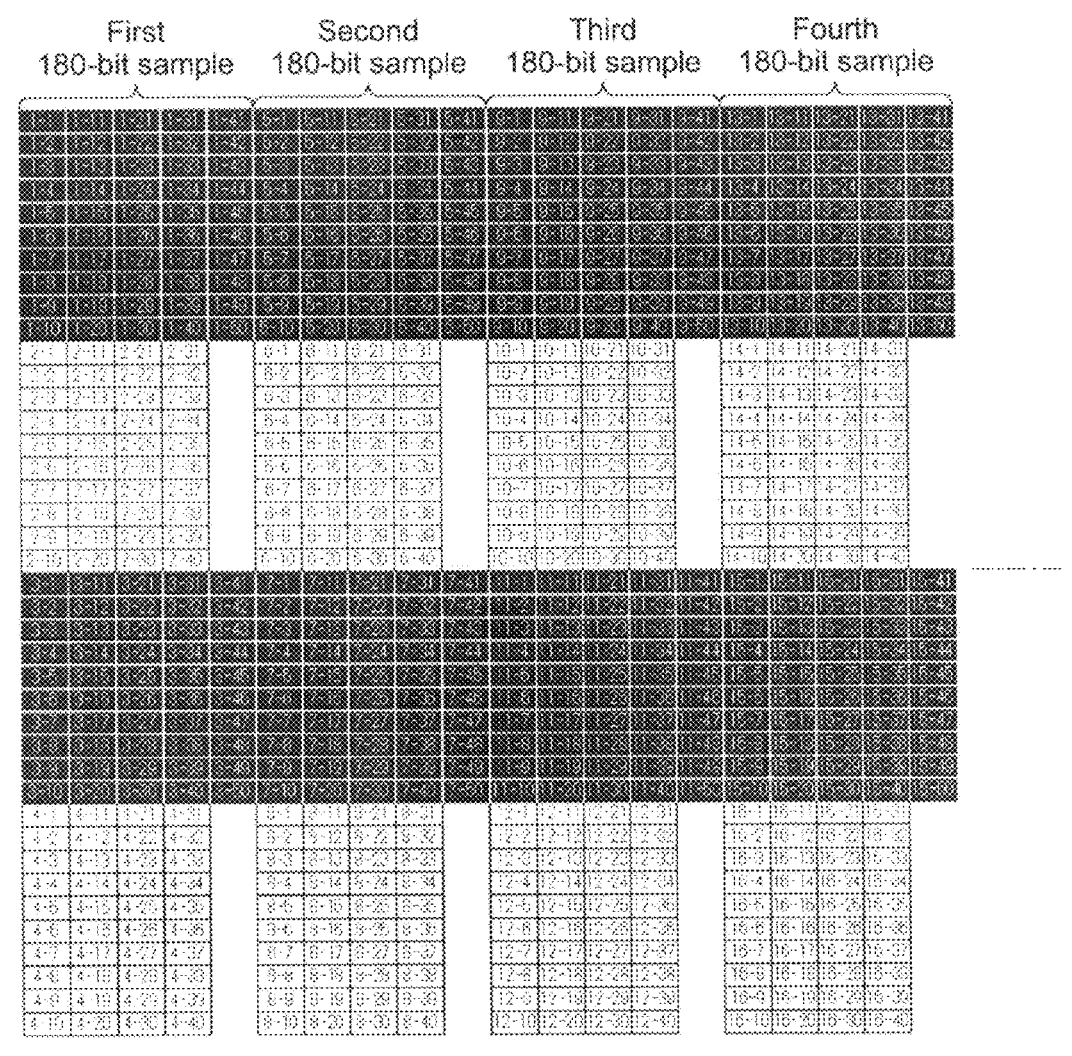

In this way, as shown schematically in FIG. 39, the 50-bit or 40-bit data blocks generated from the HD-SDIs on the channels 1 to 16 are supplied to the data stream generating unit 332 in each of the sets of four clocks. As a result, as modeled in FIG. 40, substantially, a process of supplying a 180-bit/sample data item to the data stream generating unit 332 in each clock is repeated in cycles of four clocks. Thus, data streams of substantially 180 bits×148.5 MHz are supplied to the data stream generating unit 332.

In Step S203, the multiplexing units 512 generate the transmission data streams. At this time, the transmission data streams are generated by the same process as that of Step S103 in FIG. 27. Specifically, a transmission data stream in a first lane is generated from the HD-SDIs on the channels 1 to 16, and supplied to the P/S conversion unit 134. Further, a transmission data stream in a second lane is generated from the HD-SDIs on the channels 17 to 32, and supplied to the P/S conversion unit 134.

In Step S204, by the same process as that of Step S4 in FIG. 10, those two-lane transmission data streams are sent.

(Video Signal Reception Process According to Third Embodiment)

Figure 41:
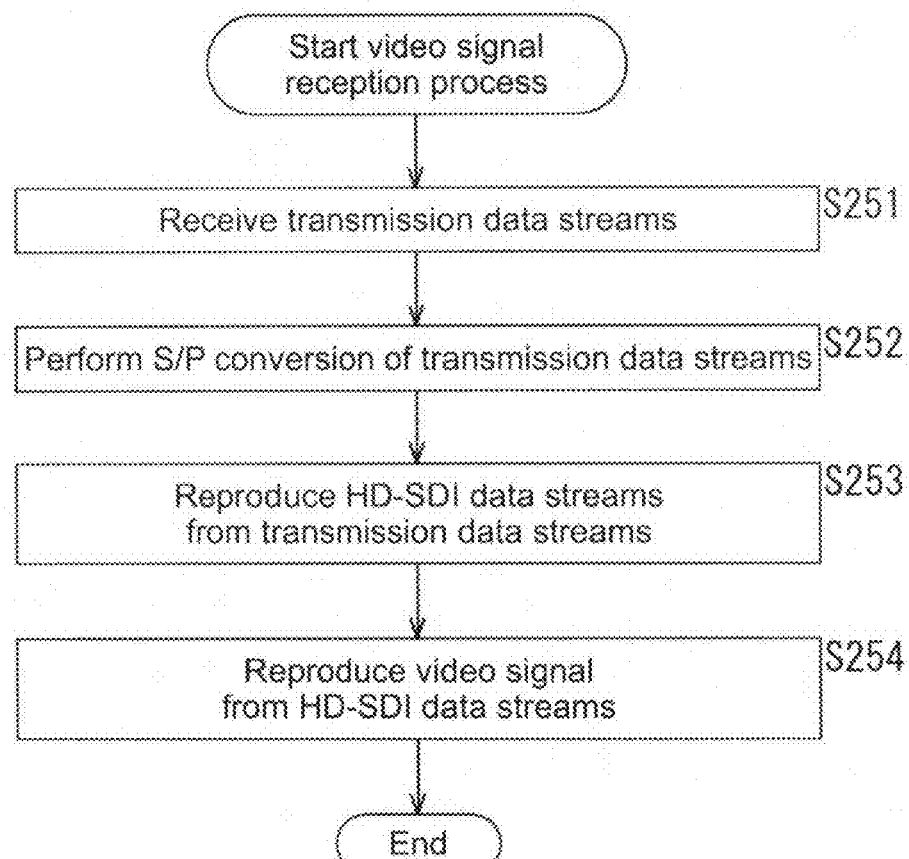
FIG. 41 is an explanatory flowchart of a video signal reception process according to the third embodiment.

Next, with reference to the flowchart of FIG. 41, description is made of a video signal reception process to be executed by the CCU 12c.

In Step S251, by the same process as that of Step S51 in FIG. 23, the two-lane transmission data streams are received.

In Step S252, by the same process as that of Step S52 in FIG. 23, the two-lane transmission data streams are subjected to the S/P conversion.

In Step S253, the word synchronization detection-data stream reproducing unit 611 reproduces HD-SDI data streams from the transmission data streams. Specifically, the word synchronization detection-data stream reproducing unit 611 detects word synchronization signals that are multiplexed in the two-lane transmission data streams so as to synchronize the words in the transmission data streams. Then, the word synchronization detection-data stream reproducing unit 611 executes processes reverse to those by the multiplexing units 511 of the broadcasting camera 11c so as to reproduce the HD-SDI data streams on 32 channels from the two-lane transmission data streams. Next, the word synchronization detection-data stream reproducing unit 611 supplies the reproduced HD-SDI data streams on 32 channels to the video reproducing unit 612.

In Step S254, the video reproducing unit 612 reproduces a video signal from the HD-SDI data streams. Specifically, the video reproducing unit 612 executes processes reverse to those by the mapping unit 511 of the broadcasting camera 11c so as to reproduce the original 8K signal from the HD-SDI data streams on 32 channels. Then, the video reproducing unit 612 supplies the reproduced 8K signal to the video processing unit 203.

In this way, the video signal of
7680×4320/50P-60P/4:2:2/10 bits or
8192×4320/48P-60P/4:2:2/10 bits
can be transmitted in the form of the two-lane transmission data streams via 100 GbE devices.

6. Fourth Embodiment

Figure 42:
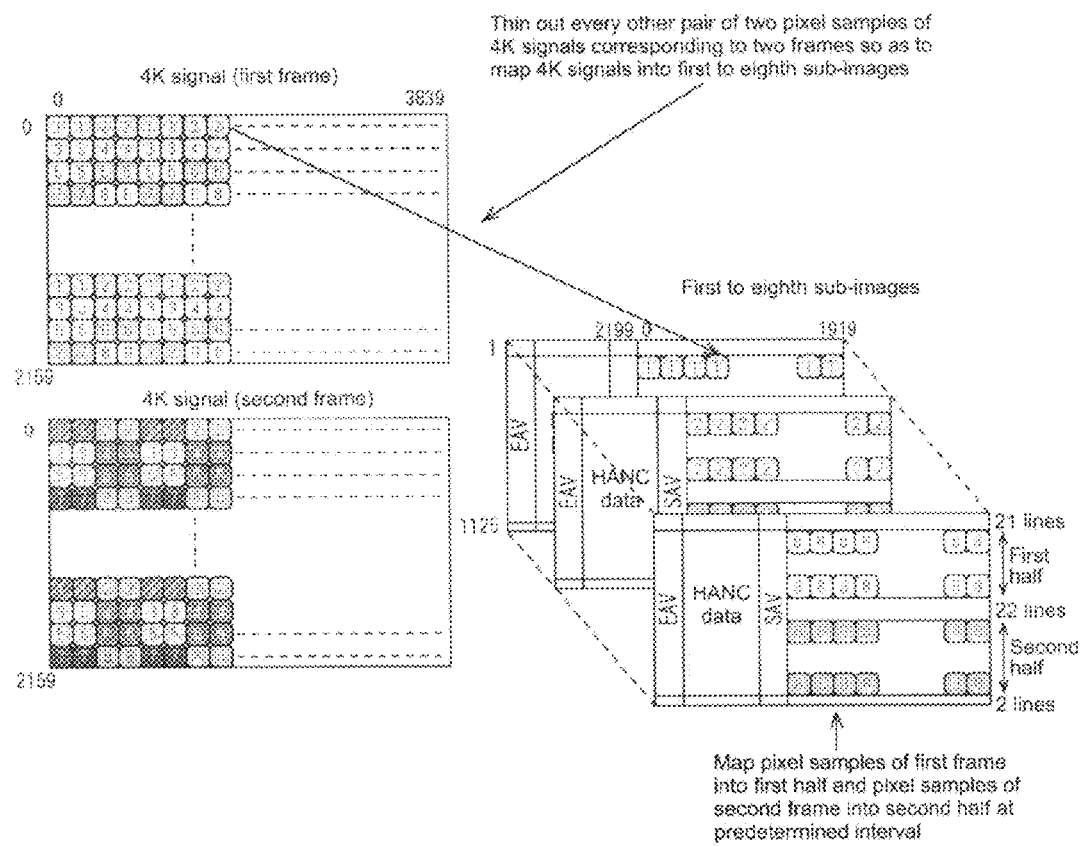
FIG. 42 is an explanatory diagram of a second method of mapping 4K video signals into sub-images.
Figure 43:
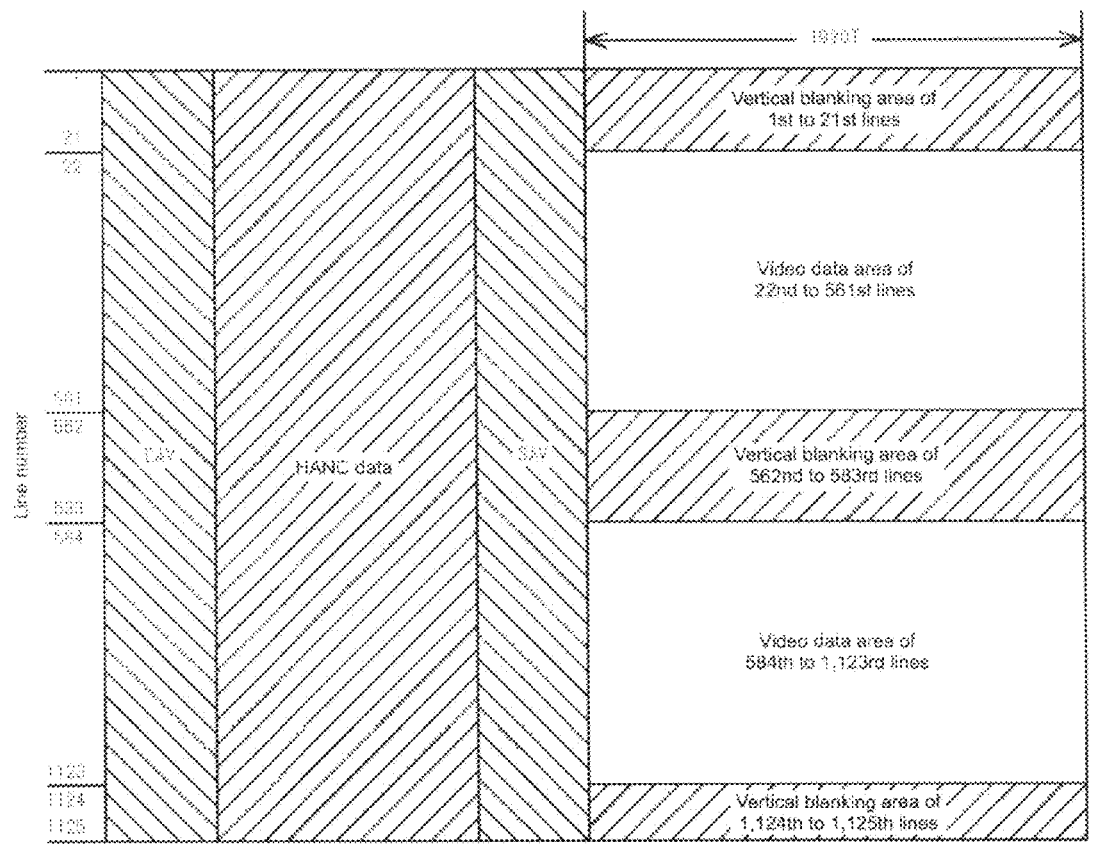
FIG. 43 is an explanatory diagram of a format of the sub-images.

Next, with reference to FIGS. 42 and 43, description is made of the fourth embodiment of the present technology.

In the fourth embodiment, an 8K signal at 96P-120P is transmitted via a 100 GbE device. In other words, the 8K signal to be transmitted in the fourth embodiment has a frame rate twice as high as those in each of the first to third embodiments. Examples of the 8K signal at 96P-120P include video signals of
7680×4320/100P-120P/4:4:4,4:2:2/10 bits or 12 bits and
8192×4320/96P-120P/4:4:4,4:2:2/10 bits or 12 bits.

The fourth embodiment is different from the first to third embodiments in the process of mapping 4K signals into sub-images after the 4K signals are generated from the 8K signal.

Specifically, as shown in FIG. 42, 4K signals corresponding to two successive frames are mapped into first to eight sub-images. More specifically, every other pair of two adjacent pixel samples in every fourth line of first and second 4K signals corresponding to the two successive frames is thinned out (in units of two frames). In this way, the 4K signals corresponding to two successive frames are mapped into the first to eighth sub-images.

Note that, in FIG. 42, for the sake of simplicity of illustration, none of vertical blanking areas and horizontal ancillary data areas is shown. Further, FIG. 42 shows a case where the 4K signals correspond to 3,840 samples.

Note that, the sample number and the line number of each of the 4K signals each start from zero. Thus, the active pixel area of each of the 4K signals occupies a total of 2,160 lines from a 0th line to a 2,159th line, each of the lines occupying a total of 3,840 samples from a 0th sample to a 3,839th sample. Meanwhile, in FIG. 42, the sample number of each of the sub-images starts from zero, and the line number thereof starts from one. Thus, the sub-images each include a total of 1,125 lines from a 1st line to 1,125th line, each of the lines occupying a total of 2,200 samples from a 0th sample to a 2,199th sample. Note that, the number of samples per line of each of the sub-images is merely an example, and may vary in accordance with video signal systems.

In this context, also with reference to FIG. 43, detailed description is made of a method of mapping pixel samples of the first and second 4K signals into the first to eighth sub-images.

FIG. 43 shows an example of a format of each of the sub-images. This format is substantially the same as the format of a 1920×1080/50P-60P signal, which conforms to SMPTE 274M except arrangement of vertical blanking areas and video data areas.

First, a vertical blanking area is provided in an area of 21 lines of from the 1st line to a 21st line of each of the first to eighth sub-images.

Then, 4i+2jth samples and 4i+2j+1st samples (i=0 to 959 and j=0 to 1) in 4g+hth lines (g=0 to 539 and h=0 to 3) of the first 4K signal are mapped into 2ith samples and 2i+1st samples in g+22nd lines of 2h+j+1st sub-images.

Next, another vertical blanking area is provided in an area of 22 lines of from a 562nd line to a 583rd line of each of the first to eight sub-images. Note that, the other vertical blanking area may be omitted.

After that, 4i+2jth samples and 4i+2j+1st samples (i=0 to 959 and j=0 to 1) in 4g+hth lines (g=0 to 539 and h=0 to 3) of the second 4K signal are mapped into 2ith samples and 2i+1st samples in g+584th lines of 2h+j+1st sub-images.

Further, still another vertical blanking area is provided in an area of two lines of from a 1,124th line to a 1,125th line of each of the first to eighth sub-images.

In this way, every other pair of two adjacent pixel samples in every four lines of each of the 4K signals corresponding to the two successive frames is thinned out. With this, the 4K signals corresponding to two successive frames are mapped into the first to eighth sub-images. As a result, 1st to 32nd sub-images are generated from an 8K signal corresponding to two successive frames.

Note that, the vertical blanking area from the 562nd line to the 583rd line of each of the first to eight sub-images may be generated.

Then, the same processes as those according to the first to third embodiments are executed on each of the sub-images. With this, transmission data streams are generated, and can be transmitted via 100 GbE devices.

Specifically, for example, in a case where a video signal of
7680×4320/100P-120P/4:4:4/10 bits or 12 bits,
7680×4320/100P-120P/4:2:2/12 bits,
8192×4320/96P-120P/4:4:4/10 bits or 12 bits, or
8192×4320/96P-120P/4:2:2/12 bits
is transmitted, when the process of FIGS. 42 and 43 is executed, the 1st to 32nd sub-images are generated from the 8K signal corresponding to two successive frames.

Then, the same process as that according to the first or second embodiment is executed on the 1st to 32nd sub-images. With this, HD-SDIs on 128 channels are generated. Further, by the same process as that according to the first or second embodiment, eight-lane transmission data streams are generated from the HD-SDIs on 128 channels. Then, the 8K signal corresponding to two successive frames can be transmitted in the form of the eight-lane transmission data streams via a 100 GbE device.

At this time, the optical fibers 271-1 and 271-2 of FIG. 9 are each capable of transmitting four-lane transmission data streams, and hence the generated eight-lane transmission data streams can be transmitted via a single optical fiber cable 13.

Meanwhile, in a case where a video signal of 7680×4320 or 8192×4320/100P-120P/4:2:2/10 bits is transmitted, when the process of FIGS. 42 and 43 is executed, the 1st to 32nd sub-images are generated from the 8K signal corresponding to two successive frames.

Then, the same process as that according to the third embodiment is executed on the 1st to 32nd sub-images. With this, HD-SDIs on 64 channels are generated. Further, by the same process as that according to the third embodiment, four-lane transmission data streams are generated from the HD-SDIs on 64 channels. Then, the 8K signal corresponding to two successive frames can be transmitted in the form of the four-lane transmission data streams via a 100 GbE device.

7. Fifth Embodiment

Next, with reference to FIGS. 44 to 51, description is made of the fifth embodiment of the present technology.

In the fifth embodiment, a 4K RAW signal at 48P-60P is transmitted via a 100 GbE device. Examples of the 4K RAW signal at 48P-60P include RAW signals of
3840×2160/502-60P/4:4:4/16 bits and
4096×2160/482-60P/4:4:4/16 bits.

(Configuration Example of Broadcasting Camera 11*d*)

Figure 44:
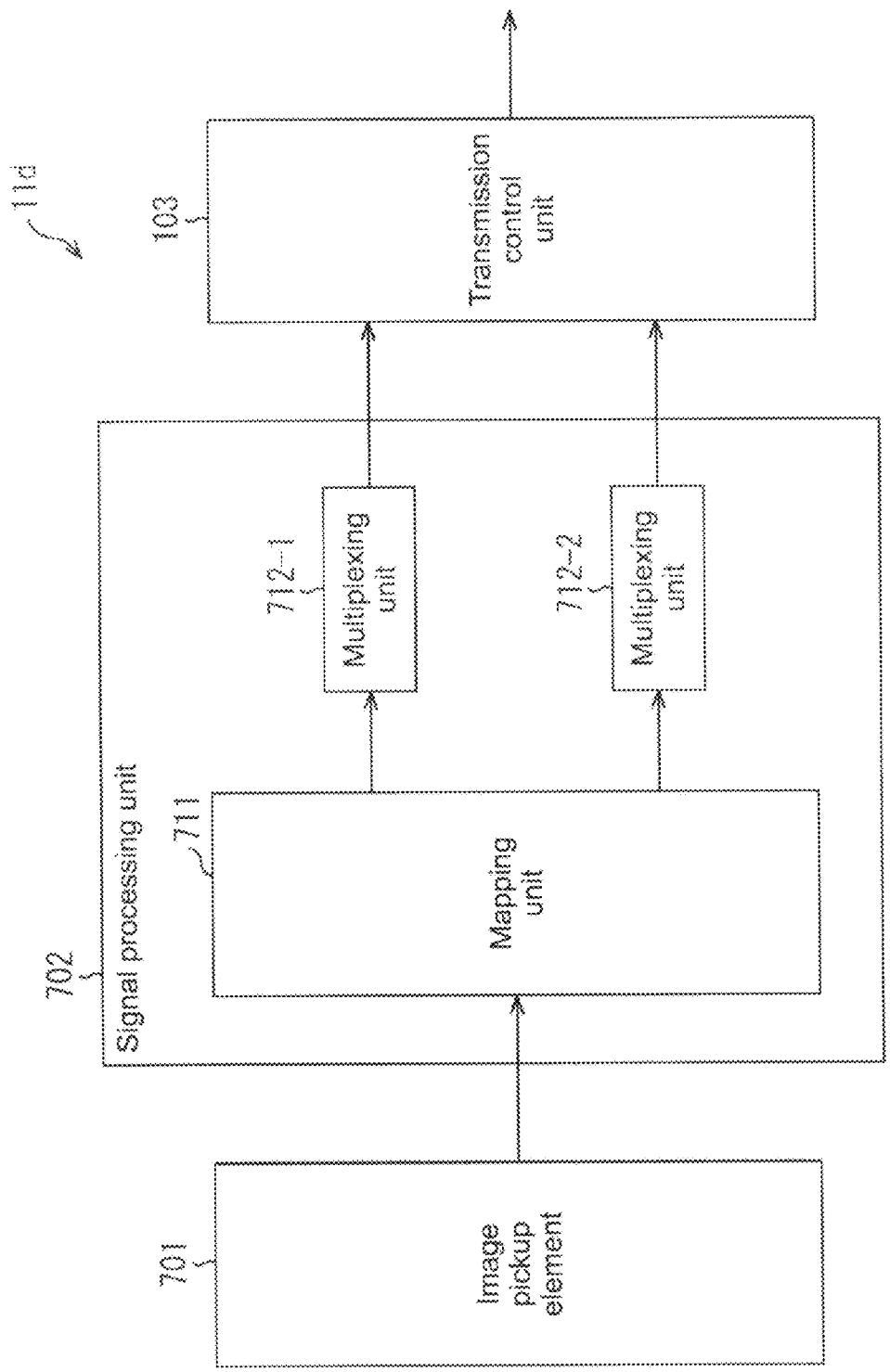
FIG. 44 is a block diagram showing a configuration example of functions of a broadcasting camera according to a fifth embodiment.

FIG. 44 is a block diagram showing a configuration example of functions of a broadcasting camera 11*d* as an embodiment of the broadcasting cameras 11 according to the fifth embodiment. Note that, in the figure, the parts equivalent to those of the broadcasting camera 11*b* of FIG. 24 are denoted by the same reference symbols, and redundant descriptions of parts to execute the same processes are omitted as appropriate.

The broadcasting camera 11*d* is different from the broadcasting camera 11*b* in that an image pickup element 701 and a signal processing unit 702 are provided respectively instead of the image pickup element 101 and the signal processing unit 301. The signal processing unit 702 includes a mapping unit 711 and multiplexing units 712-1 and 712-2.

Examples of the image pickup element 701 include a CMOS image sensor and a CCD image sensor. The image pickup element 701 supplies video signals obtained as a result of imaging to the mapping unit 711 of the signal processing unit 702. Examples of the video signals include RAW signals of
3840×2160/50P-60P/4:4:4/16 bits and
4096×2160/48P-60P/4:4:4/16 bits.

As described below, the mapping unit 711 maps the RAW signal supplied from the image pickup element 701 so as to generate HD-SDIs on 32 channels. Then, the mapping unit 711 supplies HD-SDIs on channels 1 to 16 to the multiplexing unit 712-1, and supplies HD-SDIs on channels 17 to 32 to the multiplexing unit 712-2.

As described below, the multiplexing units 711-1 and 712-2 each perform multiplexing by channel coding of the HD-SDIs on 16 channels supplied from the mapping unit 711. With this, transmission data streams are generated. Then, the multiplexing units 711-1 and 712-2 supply the generated transmission data streams to the transmission control unit 103.

Note that, in the following, unless the multiplexing units 712-1 and 712-2 need to be distinguished from each other, those units are simply referred to as multiplexing units 712.

(Configuration Example of Multiplexing Unit 712)

Figure 45:
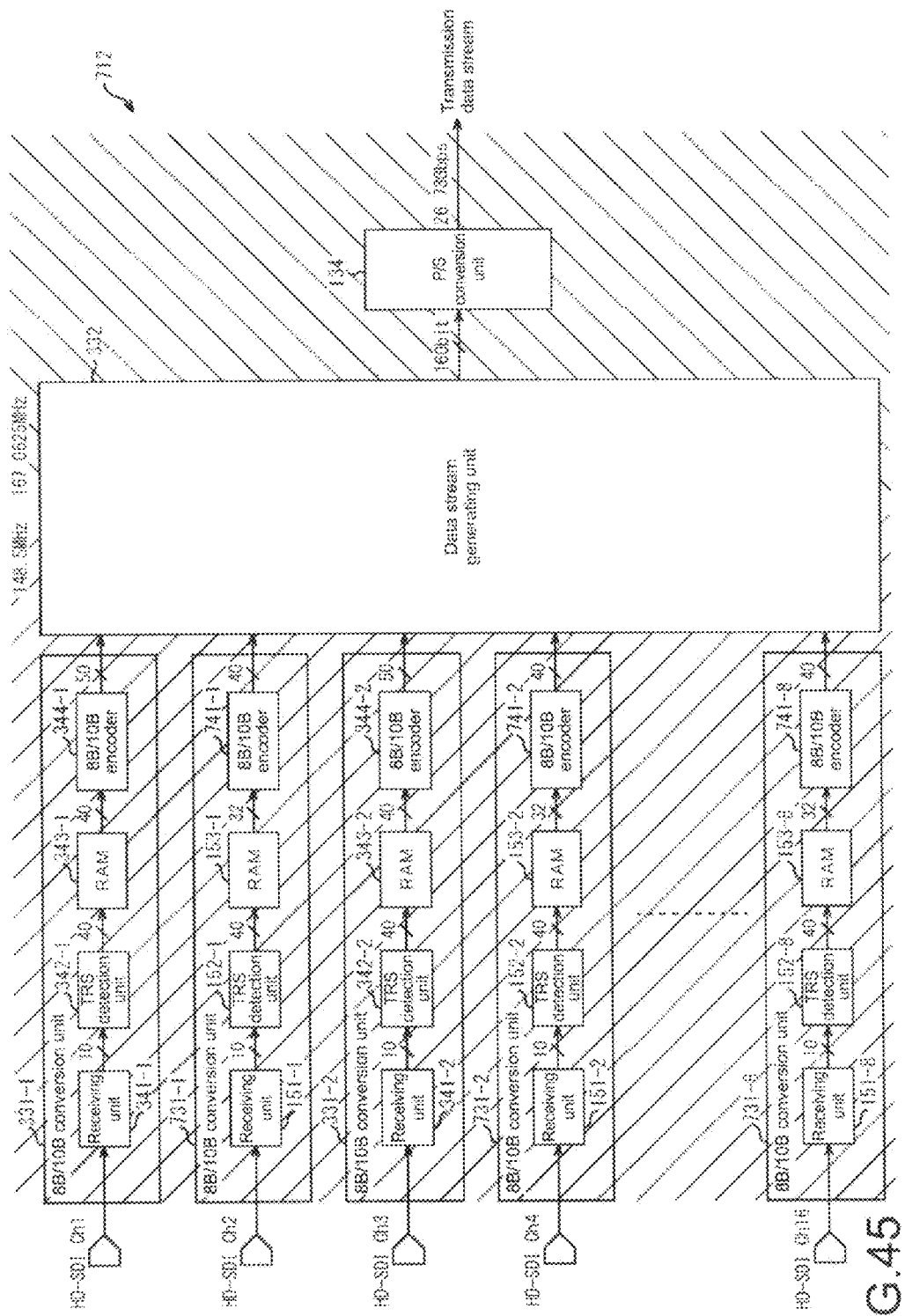
FIG. 45 is a block diagram showing a configuration example of functions of a multiplexing unit of the broadcasting camera according to the fifth embodiment.

FIG. 45 is a block diagram showing a configuration example of functions of the multiplexing unit 712. Note that, in the figure, the parts equivalent to those of the multiplexing unit 311 of FIG. 25 are denoted by the same reference symbols, and descriptions of parts to execute the same processes are omitted as appropriate.

The multiplexing unit 712 is different from the multiplexing unit 311 in that 8B/10B conversion units 731-1 to 731-8 are provided instead of the 8B/10B conversion units 132-1 to 132-8. Further, the 8B/10B conversion units 731-$i$ ($i$=1 to 8) are different from the 8B/10B conversion units 132-$i$ in that 8B/10B encoders 741-$i$ are provided instead of the 8B/10B encoders 154-$i$.

The 8B/10B encoder 741-$i$ reads the data from the RAM 153-$i$ in units of blocks of a predetermined bit (for example, 32 bits), and performs 8B/10B conversion of the read data. The 8B/10B encoder 741-$i$ supplies the data blocks obtained by the 8B/10B conversion to the data stream generating unit 332.

Note that, in the following, unless the 8B/10B conversion units 731-1 to 731-8 need not be distinguished from each other, those units are simply referred to as 8B/10B conversion units 731. Further, in the following, unless the 8B/10B encoders 741-1 to 741-8 need not be distinguished from each other, those units are simply referred to as 8B/10B encoders 741.

(Configuration Example of CCU 12$d$)

Figure 46:
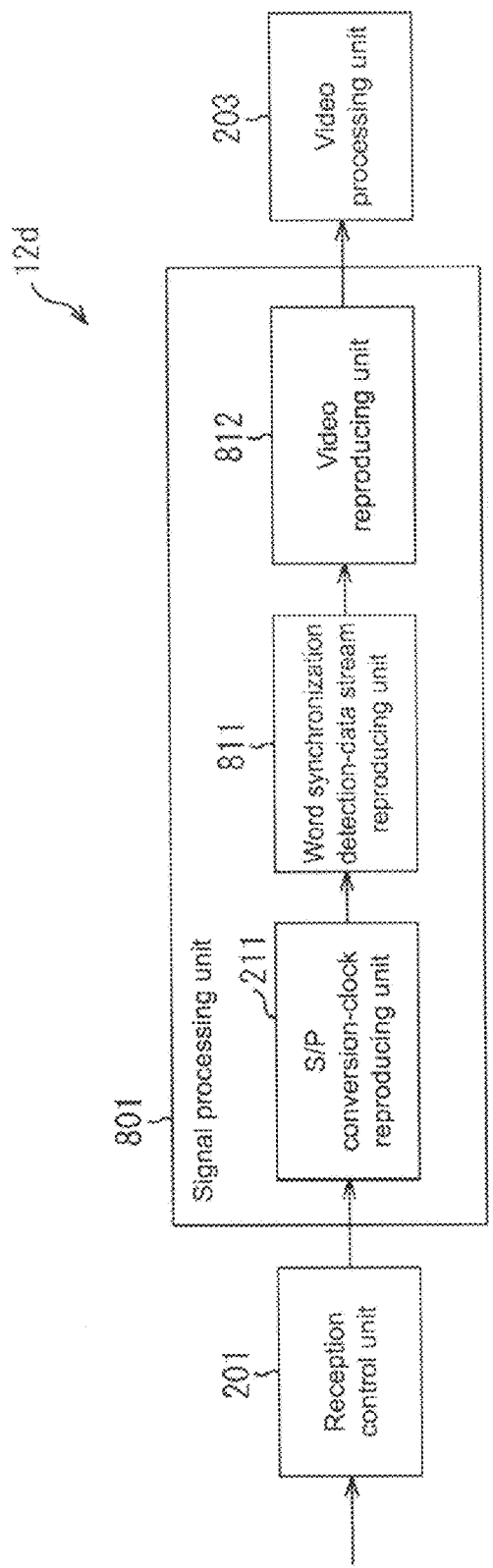
FIG. 46 is a block diagram showing a configuration example of functions of a CCU according to the fifth embodiment.

FIG. 46 is a block diagram showing a configuration example of functions of a CCU 12$d$ as an embodiment of the CCU 12 according to the fifth embodiment. Note that, in the figure, the parts equivalent to those of the CCU 12$b$ of FIG. 26 are denoted by the same reference symbols, and redundant descriptions of parts to execute the same processes are omitted as appropriate.

The CCU 12$d$ is different from the CCU 12$b$ in that a signal processing unit 801 is provided instead of the signal processing unit 401. The signal processing unit 801 is different from the signal processing unit 401 in that a word synchronization detection-data stream reproducing unit 811 and a video reproducing unit 812 are provided respectively instead of the word synchronization detection-data stream reproducing unit 411 and the video reproducing unit 213.

The transmission data streams subjected to the S/P conversion are supplied from the S/P conversion-clock reproducing unit 211 to the word synchronization detection-data stream reproducing unit 811. Then, the word synchronization detection-data stream reproducing unit 811 detects word synchronization signals from the transmission data streams so as to synchronize words in the transmission data streams. Further, the word synchronization detection-data stream reproducing unit 811 executes processes reverse to those by the multiplexing units 712 of the broadcasting camera 11$d$ so as to reproduce the HD-SDI data streams on 32 channels from the transmission data streams. Then, the word synchronization detection-data stream reproducing unit 811 supplies the HD-SDI data streams to the video reproducing unit 812.

The video reproducing unit 812 executes processes reverse to those by the mapping unit 711 of the broadcasting camera 11$d$ so as to reproduce the original 4K signal from the HD-SDIs on 32 channels. Then, the video reproducing unit 812 supplies the 4K signal to the video processing unit 203.

(Video Signal Transmission Process According to Fifth Embodiment)

Figure 47:
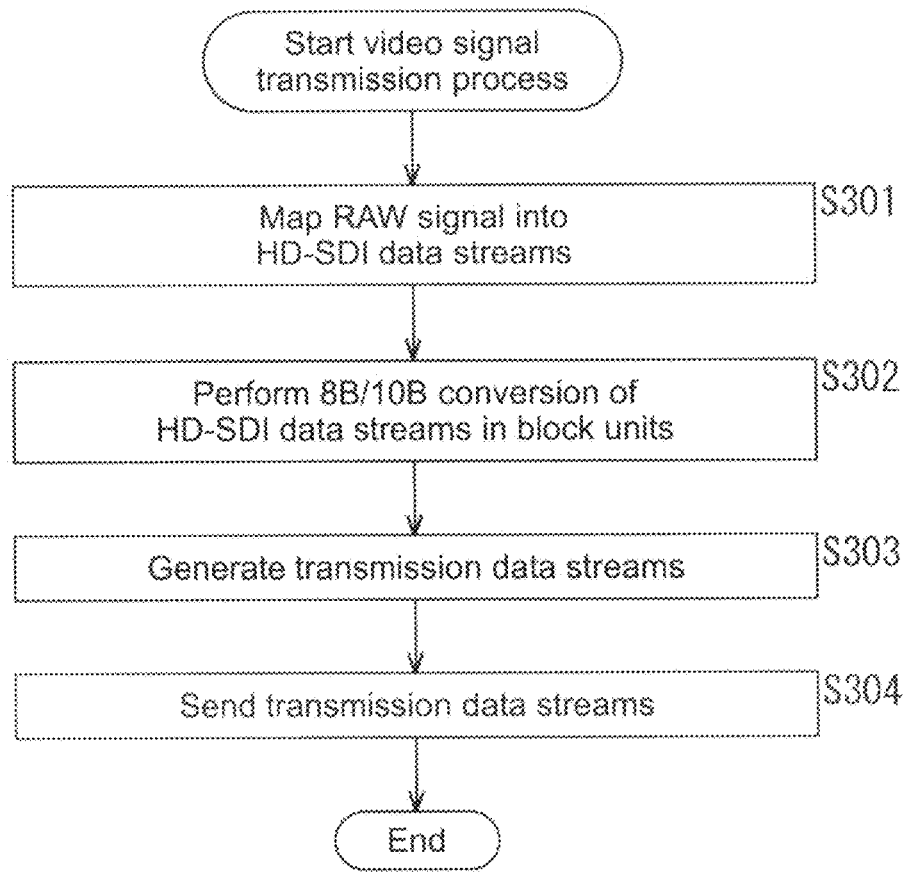
FIG. 47 is an explanatory flowchart of a video signal transmission process according to the fifth embodiment.

Next, with reference to the flowchart of FIG. 47, description is made of a video signal transmission process to be executed by the broadcasting camera 11$d$ according to the fifth embodiment.

In Step S301, the mapping unit 711 of the signal processing unit 702 maps a RAW signal into HD-SDI data streams. Specifically, the mapping unit 711 maps a 4K RAW signal into HD-SDIs on 32 channels. In this context, with reference to FIG. 48, description is made of a specific example of the method of mapping the 4K RAW signal into the HD-SDIs on 32 channels.

First, by the method described above with reference to FIG. 13, the mapping unit 711 maps the 4K RAW signal into first to fourth sub-images. These first to fourth sub-images are each generated from a 2K/48P-60P/4:4:4/16-bit video signal.

Then, by the same method as that according to the first embodiment, the mapping unit 711 performs line thinning-out and word thinning-out of the first to fourth sub-images.

Specifically, first, in accordance with the method specified, for example, in FIG. 2 of SMPTE 372, the mapping unit 711 thins out every second line of the first to fourth sub-images. With this, from the sub-images each generated from a progressive 2K/48P-60P/4:4:4/16-bit video signal, interlaced 2K/48I-60I/4:4:4/16-bit video signals on two channels of channels 1 and 2 are generated.

Next, in accordance with the method specified, for example, in FIG. 3 of SMPTE 372, the mapping unit 711 thins out the generated interlaced video signals in word units. With this, from each of the 2K/48I-60I/4:4:4/16-bit video signals, two 2K/48I-60I/4:2:2/16-bit video signals are reproduced.

Figure 48:
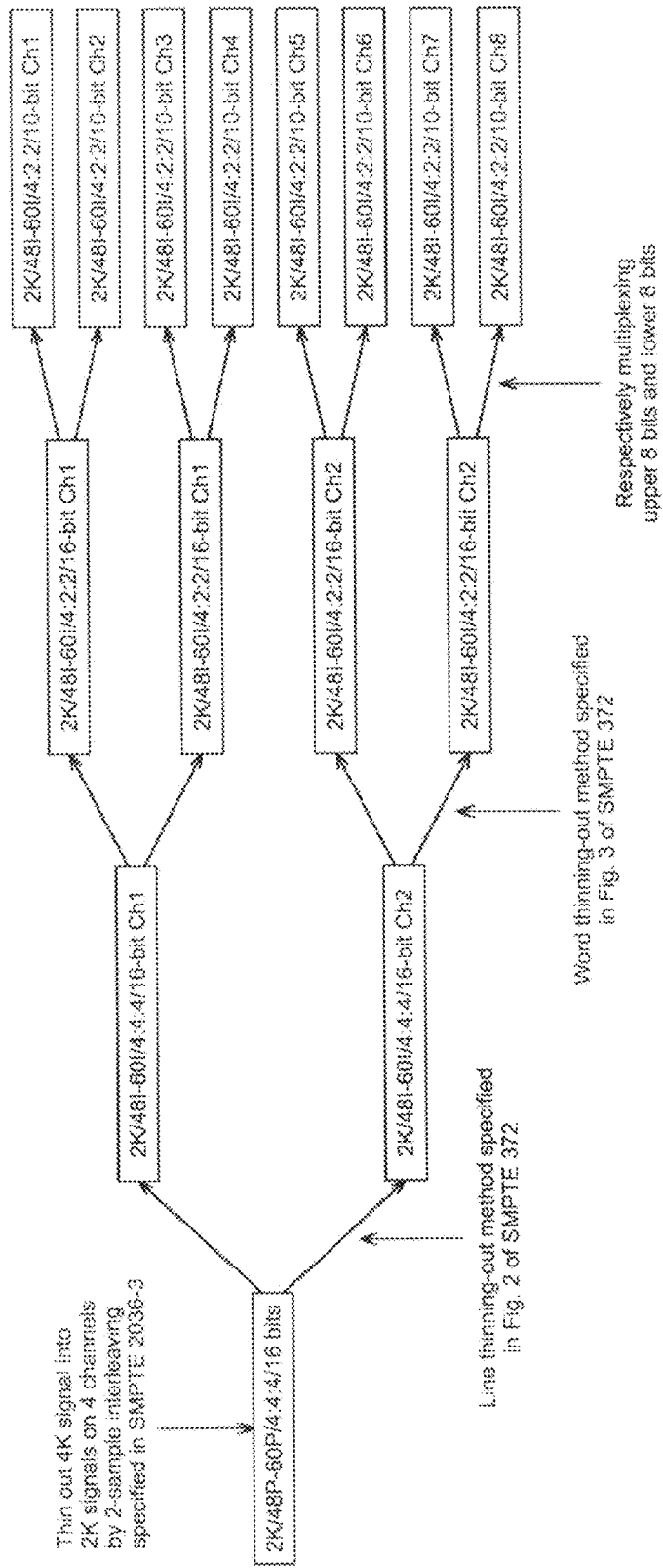
FIG. 48 is an explanatory diagram of a method of mapping a 4K RAW signal into HD-SDIs.

After that, the mapping unit 711 divides 16-bit pixel samples of each of the 2K/48I-60I/4:2:2/16-bit signals into upper eight bits and lower eight bits, and multiplexes the upper eight bits and lower eight bits into HD-SDIs on two channels (described as 2K/48I-60I/4:2:2/10 bits in FIG. 48). In this way, as shown in FIG. 48, HD-SDIs on eight channels are generated from each of the sub-images. As a result, HD-SDIs on a total of 32 channels are generated from the first to fourth sub-images.

Figure 49:
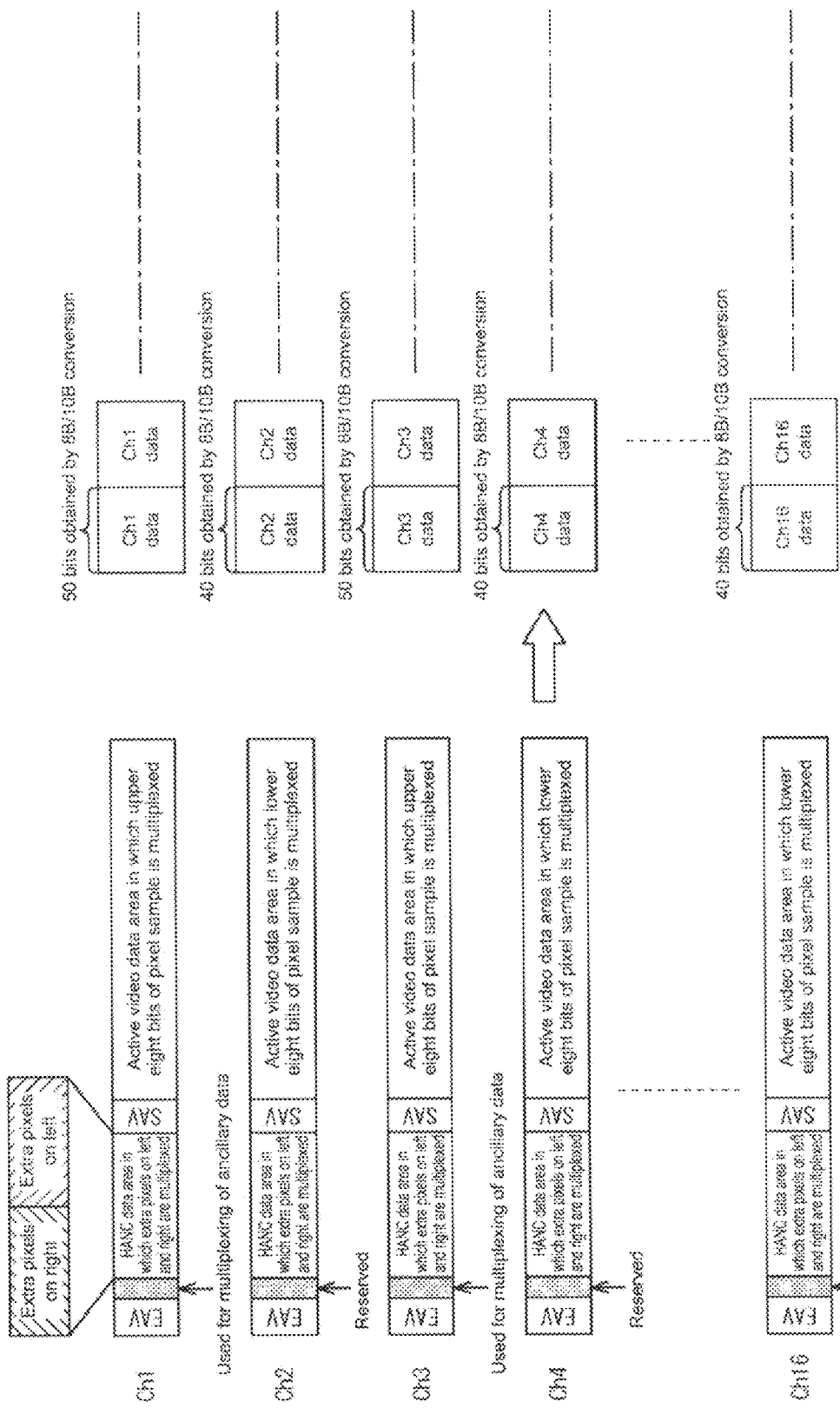
FIG. 49 is an explanatory diagram of a first example of a multiplexing method for ancillary data and extra pixels and a method of generating data blocks in the video signal transmission process according to the fifth embodiment.
Figure 50:
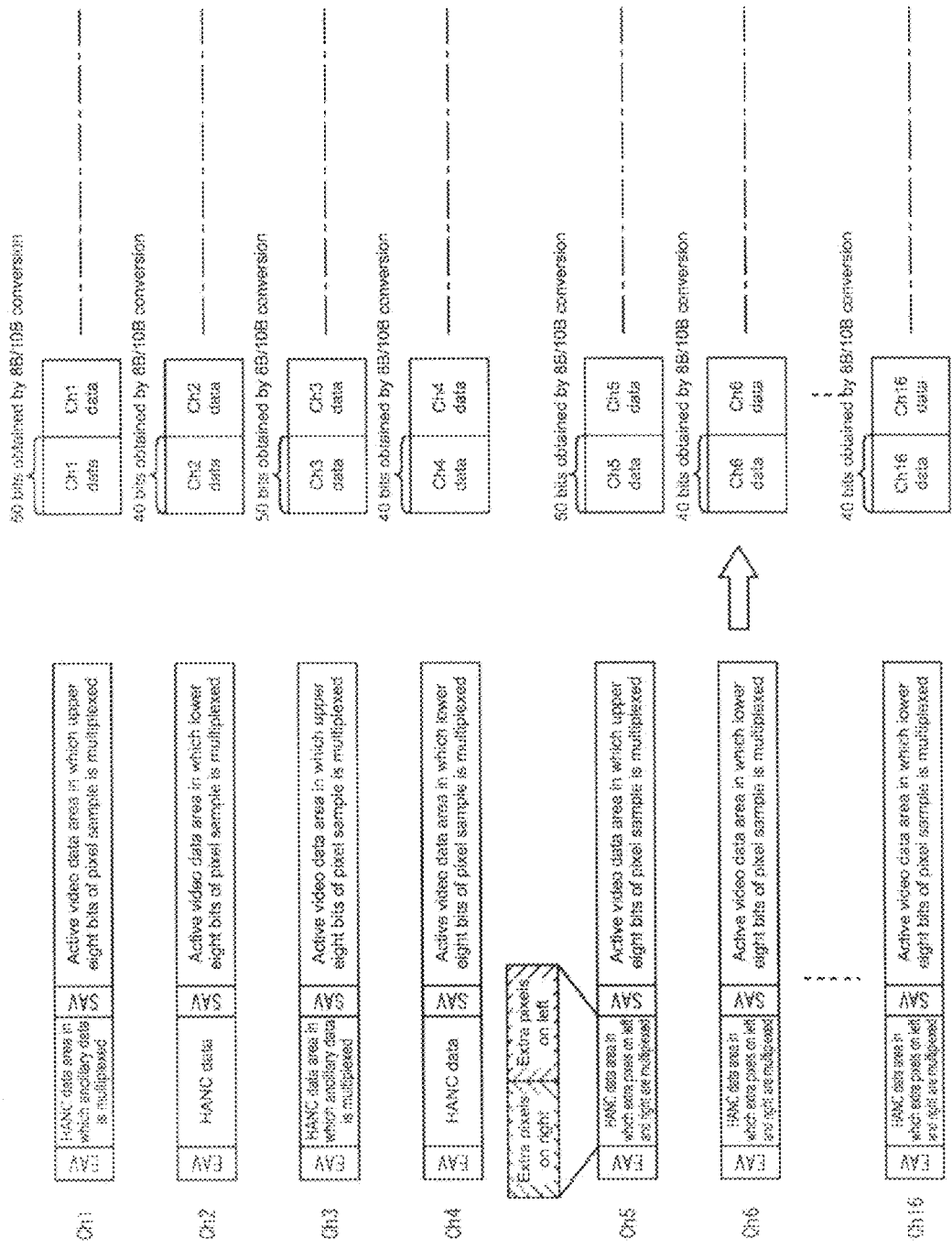
FIG. 50 is an explanatory diagram of a second example of the multiplexing method for ancillary data and extra pixels and the method of generating data blocks in the video signal transmission process according to the fifth embodiment.

Further, as shown in the left parts of FIGS. 49 and 50, data items of the upper eight bits of the pixel samples of RAW data are multiplexed into active video data areas of HD-SDIs on odd-numbered channels of HD-SDIs on channels 1 to 16, which are supplied from the mapping unit 711 to the multiplexing unit 712-1. Similarly, data items of the upper eight bits of the pixel samples of the RAW data are multiplexed into active video data areas of HD-SDIs on odd-numbered channels of HD-SDIs on channels 17 to 32.

Still further, as shown in the left parts of FIGS. 49 and 50, data items of the lower eight bits of the pixel samples of the RAW data are multiplexed into active video data areas of HD-SDIs on even-numbered channels of the HD-SDIs on the channels 1 to 16, which are supplied from the mapping unit 711 to the multiplexing unit 712-1. Similarly, data items of the lower eight bits of the pixel samples of the RAW data are multiplexed into active video data areas of HD-SDIs on even-numbered channels of the HD-SDIs on the channels 17 to 32.

At this time, the mapping unit 711 multiplexes ancillary data and extra pixels on the left and right of the video signal into a horizontal ancillary data area of the HD-SDI on each of the channels.

Here, with reference to FIGS. 49 and 50, description is made of specific examples of a multiplexing method for ancillary data and extra pixels.

(First Multiplexing Method for Ancillary Data and Extra Pixels)

The left part of FIG. 49 shows a first multiplexing method for ancillary data and extra pixels. Note that, FIG. 49 shows only the HD-SDIs on the channels 1 to 16, which are supplied from the mapping unit 711 to the multiplexing unit 712-1. However, ancillary data and extra pixels are similarly multiplexed into the HD-SDIs on the other channels 17 to 32.

As well as the first multiplexing method according to the first embodiment, ancillary data is multiplexed into horizontal ancillary data areas of the HD-SDIs on the odd-numbered channels. With this, up to 16 audio data packets can be multiplexed into the HD-SDIs on 32 channels.

Thus, the 32-kHz, the 44.1-kHz, or the 48-kHz sampled audio signals on up to 32 channels can be multiplexed and transmitted. Further, the 96-kHz sampled audio signals on up to 16 channels can be multiplexed and transmitted.

Further, in an extra pixel multiplexing area in the horizontal ancillary data area of the HD-SDI on each of the channels, data items of pixel samples in left and right extra pixel areas of the RAW signal are multiplexed. More specifically, in an extra pixel multiplexing area of the HD-SDI on each of the odd-numbered channels, data items of upper eight bits of the pixel samples in the left and right extra pixel areas of the RAW signal are multiplexed. In an extra pixel multiplexing area of the HD-SDI on each of the even-numbered channels, data items of lower eight bits of the pixel samples in the left and right extra pixel areas of the RAW signal are multiplexed.

Note that, values of the extra pixel multiplexing area relative proportion are the same as those in the first multiplexing method according to the first embodiment.

Further, all the data items in upper and lower extra pixel areas of the RAW signal can be transmitted by being multiplexed into vertical blanking areas of each of the sub-images.

(Second Multiplexing Method for Ancillary Data and Extra Pixels)

The left part of FIG. 50 shows a second multiplexing method for ancillary data and extra pixels. Note that, FIG. 50 shows only the HD-SDIs on the channels 1 to 16, which are supplied from the mapping unit 711 to the multiplexing unit 712-1. However, ancillary data and extra pixels are similarly multiplexed into the HD-SDIs on the other channels 17 to 32.

In the second multiplexing method according to the fifth embodiment, the channels of HD-SDIs into which ancillary data is multiplexed are different from those in the second multiplexing method according to the first embodiment.

Specifically, in the second multiplexing method according to the first embodiment, which is shown in FIG. 17, ancillary data items are multiplexed into the horizontal ancillary data areas of the HD-SDIs on the channels 1, 17, 33, and 49. Meanwhile, in the second multiplexing method according to the fifth embodiment, as shown in the left part of FIG. 50, ancillary data items are multiplexed into HD-SDIs on channels 1, 3, 17, and 19.

In this case, in accordance with the specifications of SMPTE 299-1, up to four audio data packets are multiplexed twice into the horizontal ancillary data area of the HD-SDI on each of the channels 1, 3, 17, and 19. With this, up to 32 audio data packets can be multiplexed into the HD-SDIs on 32 channels.

Thus, as well as the second multiplexing method according to the first embodiment, the 32-kHz, the 44.1-kHz, or the 48-kHz sampled audio signals on up to 64 channels can be multiplexed and transmitted. Further, the 96-kHz sampled audio signals on up to 32 channels can be multiplexed and transmitted.

Note that, in a case where the active video data area of each of the HD-SDIs occupies 2,048 samples, the 32-kHz, the 44.1-kHz, or the 48-kHz sampled audio signals on up to 32 channels can be multiplexed and transmitted. Further, the 96-kHz sampled audio signals on up to 16 channels can be multiplexed and transmitted.

Further, each on 24 channels except the channels 1, 3, 17, and 19 into which ancillary data items are multiplexed and channels 2, 4, 18, and 20 to be paired with those channels, the entire of the horizontal ancillary data area is allocated to the extra pixel multiplexing area. Note that, the pair of HD-SDIs refers, for example, to a pair of the HD-SDIs into which upper eight bits and lower eight bits of a single pixel sample of the RAW signal are multiplexed.

Values of the extra pixel multiplexing area relative proportion are obtained using the following equations (16) to (20). Note that, the equation (16) represents a proportion in a case where a 3840×2160/60P RAW signal is transmitted, and the equation (17) represents a proportion in a case where a 3840×2160/50P RAW signal is transmitted. The equation (18) represents a proportion in a case where a 4096×2160/60P RAW signal is transmitted, and the equation (19) represents a proportion in a case where a 4096×2160/50P RAW signal is transmitted. The equation (20) represents a proportion in a case where a 4096×2160/48P RAW signal is transmitted.

$$(2200-1920-12)\times24\div32\div1920=0.105=10.5\% \quad (16)$$

$$(2640-1920-12)\times24\div32\div1920-0.277=27.7\% \quad (17)$$

$$(2200-2048-12)\times24\div32\div2048=0.051=5.1\% \quad (18)$$

$$(2640-2048-12)\times24\div32\div2048=0.212=21.2\% \quad (19)$$

$$(2750-2048-12)\times24\div32\div2048=0.253=25.3\% \quad (20)$$

In this way, the extra pixel multiplexing area can be sufficiently secured in the active video data area. As a result, all the data items of the pixel samples in the left and right extra pixel areas of the RAW signal can be multiplexed and transmitted.

Note that, as in the case of the first multiplexing method, all the data items in upper and lower extra pixel areas of the RAW signal can be transmitted by being multiplexed into the vertical blanking areas of each of the sub-images.

In this way, the 4K RAW signal is mapped into HD-SDIs on 32 channels. Note that, the method of mapping the RAW signal described above is merely an example, and the RAW signal may be mapped into HD-SDIs on 32 channels by using other methods.

Then, the mapping unit 711 supplies the HD-SDIs on the channels 1 to 16 to the multiplexing unit 712-1, and supplies the HD-SDIs on the channels 17 to 32 to the multiplexing unit 712-2.

Referring back to FIG. 47, in Step S302, the multiplexing units 712-1 and 712-2 perform 8B/10B conversion of the HD-SDI data streams in block units. The process of Step S302 is the same as that of Step S102 according to the second embodiment in FIG. 7 except the process by the 8B/10B encoders 741.

Specifically, the 8B/10B encoders 741 are different from the 8B/10B encoders 154 of the broadcasting camera 11b according to the second embodiment only in that data items of lower eight bits of the pixel samples of the RAW data are extracted from data items of 1 word (10 bits) in the active video data area and the horizontal ancillary data area of each of the HD-SDIs.

In Step S303, by the same process as that of Step S103 in FIG. 27, the transmission data streams are generated. Specifically, a transmission data stream into which the HD-SDIs on the channels 1 to 16 and a transmission data stream into which the HD-SDIs on the channels 17 to 32 are multiplexed are generated.

In Step S304, by the same process as that of Step S4 in FIG. 10, those two-lane transmission data streams are sent.

(Video Signal Reception Process According to Fifth Embodiment)

Figure 51:
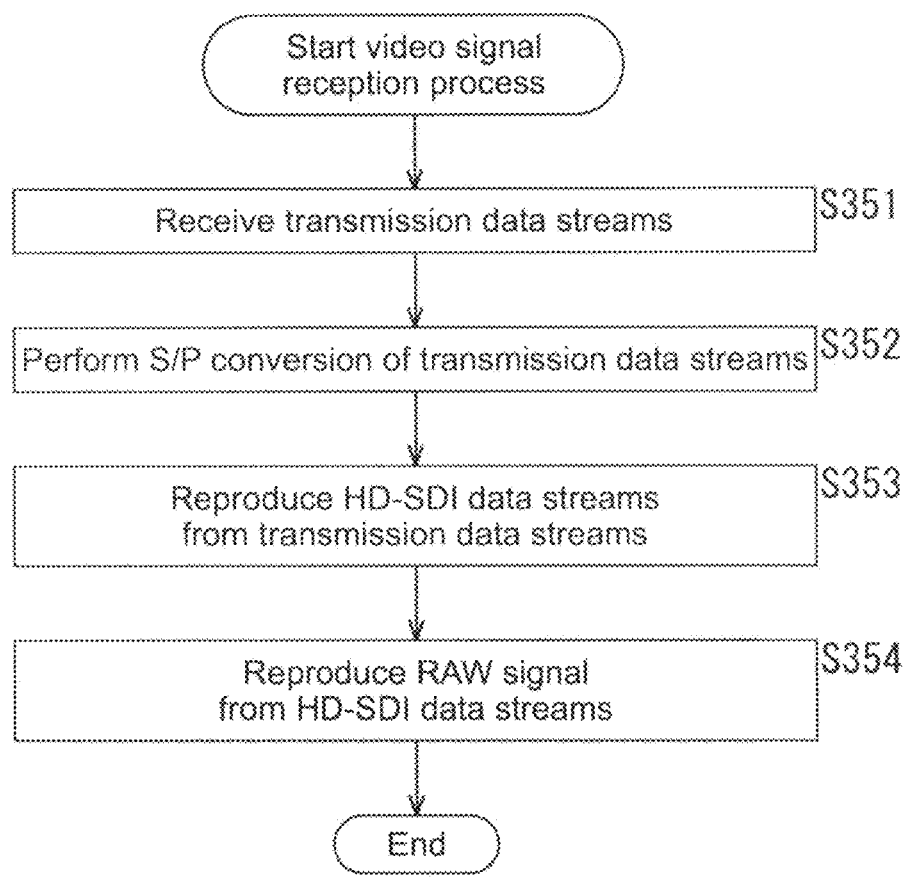
FIG. 51 is an explanatory flowchart of a video signal reception process according to the fifth embodiment.

Next, with reference to the flowchart of FIG. 51, description is made of a video signal reception process to be executed by the CCU 12d correspondingly to the video signal transmission process of FIG. 47.

In Step S351, by the same process as that of Step S51 in FIG. 23, the two-lane transmission data streams are received.

In Step S352, by the same process as that of Step S52 in FIG. 23, the two-lane transmission data streams are subjected to the S/P conversion.

In Step S353, the word synchronization detection-data stream reproducing unit 811 reproduces HD-SDI data streams from the transmission data streams. Specifically, the word synchronization detection-data stream reproducing unit 812 detects word synchronization signals that are multiplexed in the two-lane transmission data streams so as to synchronize the words in the transmission data streams. Then, the word synchronization detection-data stream reproducing unit 811 executes processes reverse to those by the multiplexing units 712 of the broadcasting camera 11d so as to reproduce the HD-SDI data streams on 32 channels from the two-lane transmission data streams. Next, the word synchronization detection-data stream reproducing unit 812 supplies the reproduced HD-SDI data streams on 32 channels to the video reproducing unit 812.

In Step S354, the video reproducing unit 812 reproduces a video signal from the HD-SDI data streams. Specifically, the video reproducing unit 812 executes processes reverse to those by the mapping unit 711 of the broadcasting camera 11d so as to reproduce the original 4K RAW signal from the HD-SDI data streams on 32 channels. Then, the video reproducing unit 812 supplies the reproduced RAW signal to the video processing unit 203.

In this way, the RAW signals of

3840×2160/50P-60P/4:4:4/16 bits and

4096×2160/48P-60P/4:4:4/16 bits can be transmitted in the form of the two-lane transmission data streams via 100 GbE devices.

8. Sixth Embodiment

Next, description is made of the sixth embodiment of the present technology.

In the sixth embodiment, a 4K RAW signal at 96P-120P is transmitted via a 100 Gb device. Examples of the 4K RAW signal at 96P-120P include RAW signals of 3840×2160/100P-120P/4:4:4/16 bits and 4096×2160/96P-120P/4:4:4/16 bits.

In the sixth embodiment, by the same method as that described above with reference to FIGS. 42 and 43, first and second 4K signals corresponding to two successive frames are mapped into first to eighth sub-images.

Then, by the same process as that according to the fifth embodiment, the first to eight sub-images are mapped into HD-SDIs on 64 channels, and four-lane transmission data streams are generated from the HD-SDIs on 64 channels. Then, the 4K raw signal is transmitted in units of two successive frames in the form of the four-lane transmission data streams via 100 GbE devices.

9. Seventh Embodiment

Next, with reference to FIGS. 52 to 60, description is made of the seventh embodiment of the present technology.

In the seventh embodiment, an 8K signal at 50P-60P is transmitted via a 100 GbE device. Examples of the 8K signal at 50P-60P include video signals of 7680×4320/50P-60P/4:4:4,4:2:2/10 bits or 12 bits.

(Configuration Example of Broadcasting Camera 11e)

Figure 52:
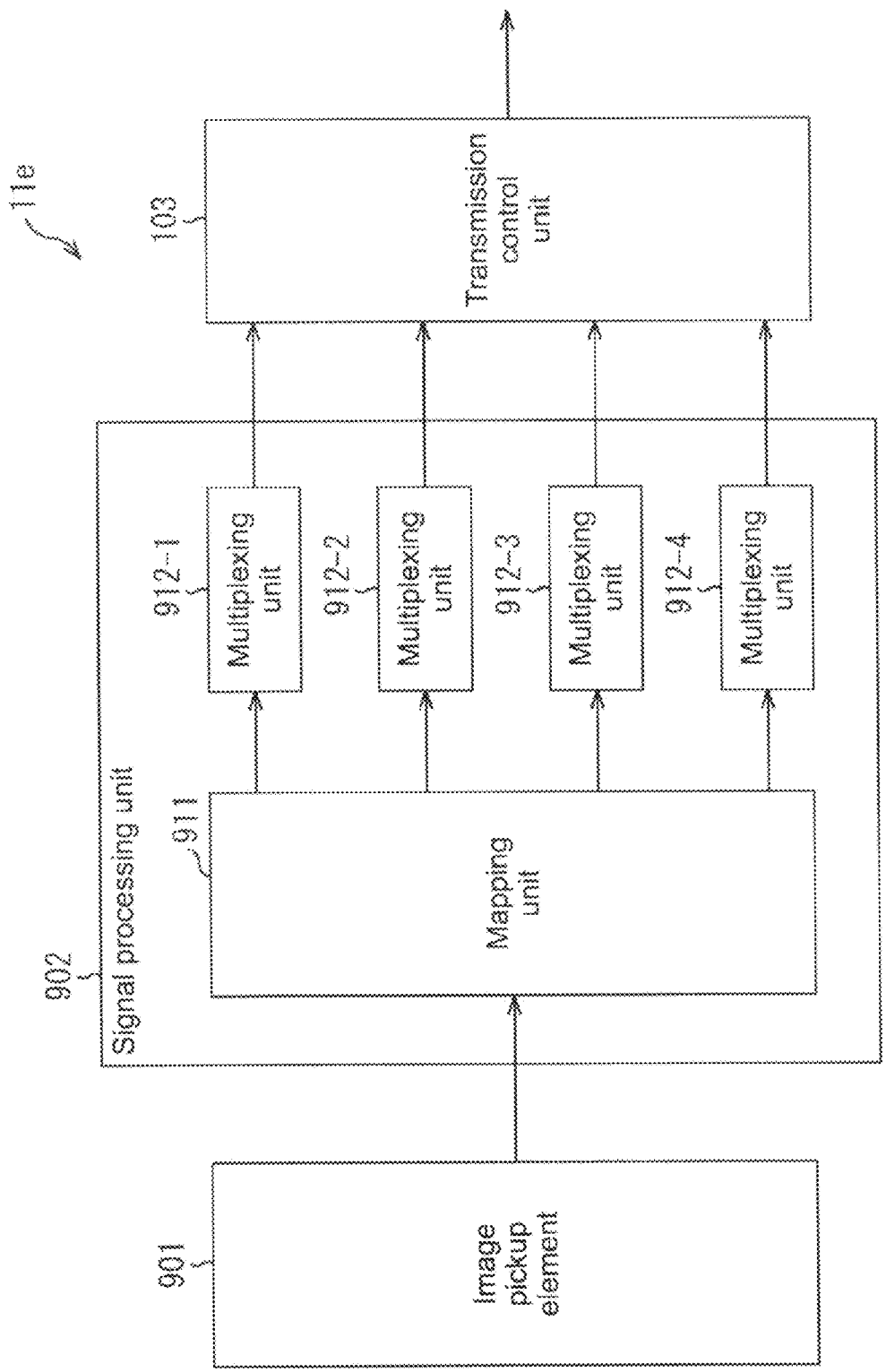
FIG. 52 is a block diagram showing a configuration example of functions of a broadcasting camera according to a seventh embodiment.

FIG. 52 is a block diagram showing a configuration example of functions of a broadcasting camera 11e as an embodiment of the broadcasting cameras 11 according to the seventh embodiment. Note that, in the figure, the parts equivalent to those of the broadcasting camera 11a of FIG. 5 are denoted by the same reference symbols, and redundant descriptions of parts to execute the same processes are omitted as appropriate.

The broadcasting camera 11e is different from the broadcasting camera 11a in that an image pickup element 901 and a signal processing unit 902 are provided respectively instead of the image pickup element 101 and the signal processing unit 102.

Examples of the image pickup element 901 include a CMOS image sensor and a CCD image sensor. The image pickup element 901 supplies video signals obtained as a result of imaging to a mapping unit 911 of the signal processing unit 902. Examples of the video signals include video signals of 7680×4320/50P-60P/4:4:4,4:2:2/10 bits or 12 bits.

The signal processing unit 902 multiplexes the video signals supplied from the image pickup element 901 into data streams of a type that can be transmitted via 100 GbE devices, and generates and supplies the data streams to the transmission control unit 103. The signal processing unit 902 includes the mapping unit 911 and multiplexing units 912-1 to 912-4.

As described below, the mapping unit 911 maps the video signals supplied from the image pickup element 901 so as to generate serial data streams on 48 channels (hereinafter, referred to as basic streams). Then, the mapping unit 911 supplies basic streams on channels 1 to 12 to the multiplexing unit 912-1, and supplies basic streams on channels 13 to 24 to the multiplexing unit 912-2. Further, the mapping unit 911 supplies basic streams on channels 25 to 36 to the multiplexing unit 912-3, and supplies basic streams on channels 37 to 48 to the multiplexing unit 912-4.

Note that, the basic streams are substantially the same in data structure as the HD-SDI data streams except having a 12-bit word length. Specifically, similar to the HD-SDIs, the basic streams each include an SAV, an EAV, an active video data area, and a horizontal ancillary data area.

As described below, the multiplexing units 912-1 to 912-4 each perform multiplexing by channel coding of the basic streams on 12 channels supplied from the mapping unit 911. With this, transmission data streams are generated. Then, the multiplexing units multiplexing units 912-1 to 912-4 supply the generated transmission data streams to the transmission control unit 103.

Note that, in the following, unless the multiplexing units 912-1 to 912-4 need to be distinguished from each other, those units are simply referred to as multiplexing units 912.

(Configuration Example of Multiplexing Unit 912)

Figure 53:
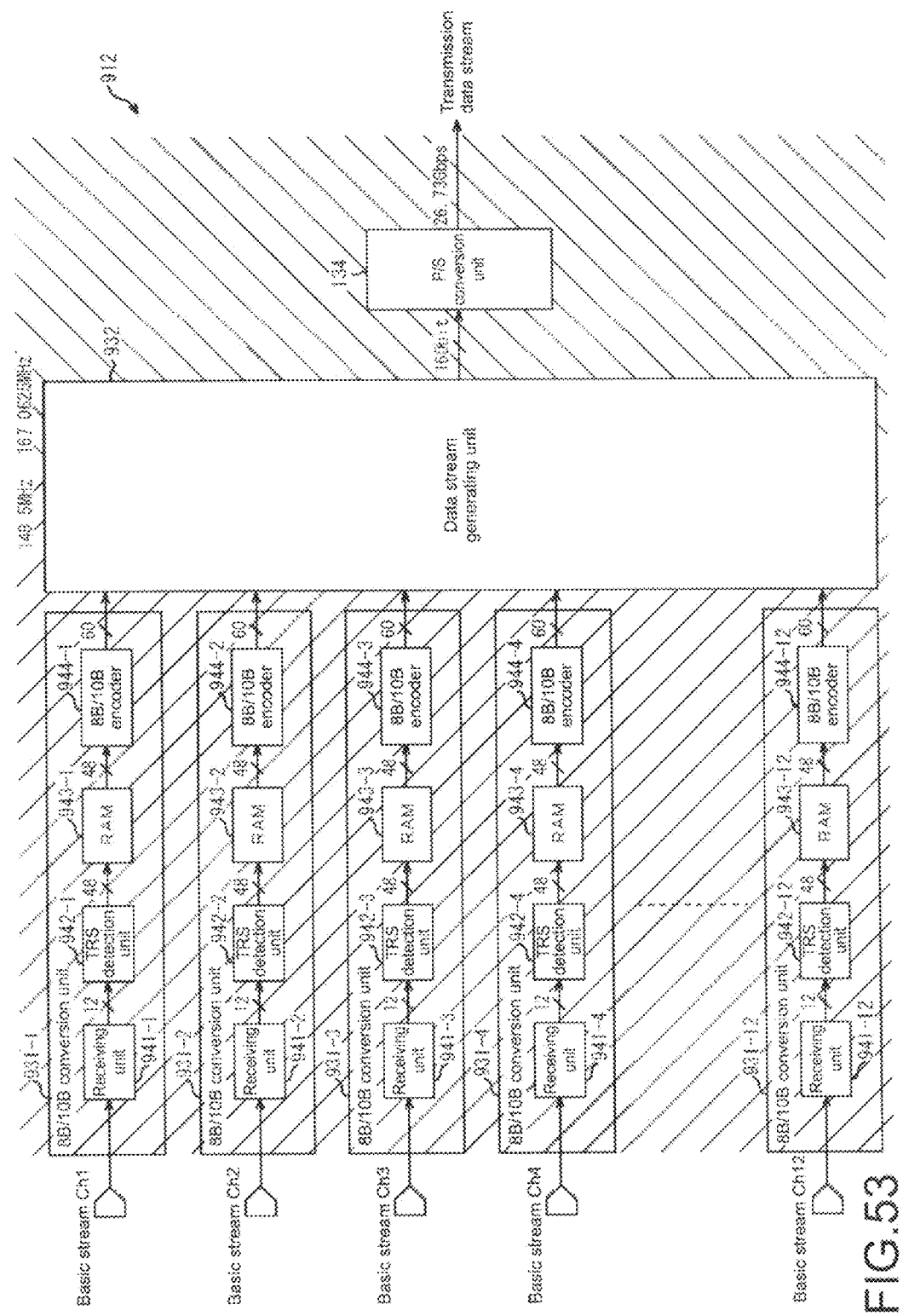
FIG. 53 is a block diagram showing a configuration example of functions of a multiplexing unit of the broadcasting camera according to the seventh embodiment.

FIG. 53 is a block diagram showing a configuration example of functions of the multiplexing unit 912. Note that, in the figure, the parts equivalent to those of the multiplexing unit 112 of FIG. 6 are denoted by the same reference symbols, and redundant descriptions of parts to execute the same processes are omitted.

The multiplexing units 912 each include 8B/10B conversion units 931-1 to 931-12, a data steam generating unit 932, and the P/S conversion unit 134. The 8B/10B conversion units 931-*i* (i=1 to 8) respectively include receiving units 941-*i*, TRS detection units 942-*i*, RAMs 943-*i*, and 8B/10B encoders 944-*i*.

The basic streams on 12 channels, which are input to each of the multiplexing units 912, are input respectively to the receiving units 941-1 to 941-12 of the 8B/10B conversion units 931-1 to 931-12.

Then, the receiving unit 941-1 performs S/P conversion and descrambling of the basic stream input thereto, and supplies the basic stream to the TRS detection unit 942-1. Further, the receiving unit 941-1 reproduces a clock signal that is superimposed on the basic stream, and supplies the clock signal to each of the units in the 8B/10B conversion unit 931-1.

The TRS detection unit 942-1 detects the SAV and the EAV included in the basic stream so as to synchronize words in the basic stream. Then, the TRS detection unit 942-1 extracts data in units of a predetermined bit (for example, 48 bits) sequentially from the head of the SAV of the basic stream, and stores the data to the RAM 943-1.

The 8B/10B encoder 944-1 reads the data from the RAM 943-1 in units of blocks of a predetermined bit (for example, 48 bits), and performs 8B/10B conversion of the read data. The 8B/10B encoder 944-1 supplies the data blocks obtained by the 8B/10B conversion to the data steam generating unit 932.

The 8B/10B conversion units 931-2 to 931-12 each execute the same process as that by the 8B/10B conversion unit 931-1 on the basic stream input thereto.

Note that, in the following, unless the 8B/10B conversion units 931-1 to 931-12 need to be distinguished from each other, those units are simply referred to as 8B/10B conversion units 931. Further, in the following, unless the receiving units 941-1 to 941-12, the TRS detection units 942-1 to 942-12, the RAMs 943-1 to 943-12, and the 8B/10B encoders 944-1 to 944-12 need to be distinguished from each other, those units are simply referred to respectively as receiving units 941, TRS detection units 942, RAMs 943, and 8B/10B encoders 944.

The data stream generating unit 932 generates a parallel transmission data stream having a predetermined word length by multiplexing, by a predetermined procedure, the data blocks supplied from the 8B/10B encoders 944. The data stream generating unit 932 supplies the generated transmission data stream to the P/S conversion unit 134.

(Configuration Example of CCU 12*e*)

Figure 54:
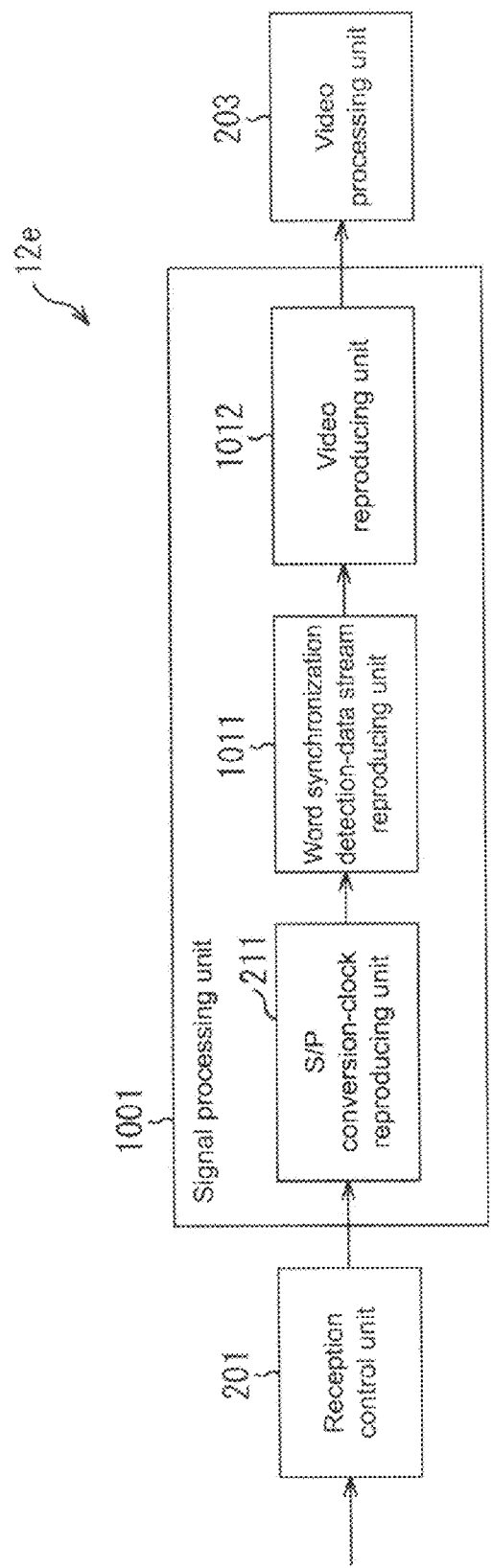
FIG. 54 is a block diagram showing a configuration example of functions of a CCU according to the seventh embodiment.

FIG. 54 is a block diagram showing a configuration example of functions of a CCU 12*e* as an embodiment of the CCU 12 according to the seventh embodiment. Note that, in the figure, the parts equivalent to those of the CCU 12*a* of FIG. 8 are denoted by the same reference symbols, and redundant descriptions of parts to execute the same processes are omitted as appropriate.

The CCU 12*e* is different from the CCU 12*a* in that a signal processing unit 1001 is provided instead of the signal processing unit 202. The signal processing unit 1001 is different from the signal processing unit 202 in that a word synchronization detection-data stream reproducing unit 1011 and a video reproducing unit 1012 are provided respectively instead of the word synchronization detection-data stream reproducing unit 212 and the video reproducing unit 213.

The word synchronization detection-data stream reproducing unit 1011 detects word synchronization signals from the transmission data streams subjected to the S/P conversion so as to synchronize words in the transmission data streams. Further, the word synchronization detection-data stream reproducing unit 1011 executes processes reverse to those by the multiplexing units 912 of the broadcasting camera 11*e* so as to reproduce the basic streams on 48 channels from the transmission data streams. Then, the word synchronization detection-data stream reproducing unit 1011 supplies the basic data streams to the video reproducing unit 1012.

The video reproducing unit 1012 executes processes reverse to those by the mapping unit 911 of the broadcasting camera 11*e* so as to reproduce the original 8K signal from the basic streams on 48 channels. Then, the video reproducing unit 1012 supplies the 8K signal to the video processing unit 203.

(Video Signal Transmission Process According to Seventh Embodiment)

Figure 55:
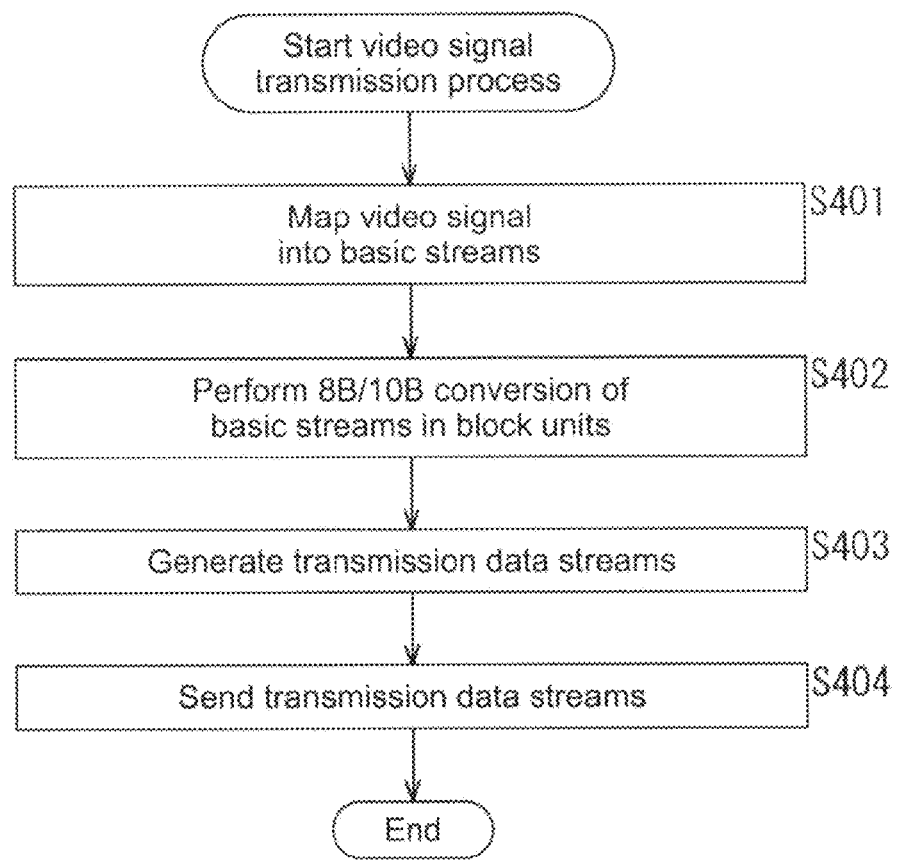
FIG. 55 is an explanatory flowchart of a video signal transmission process according to the seventh embodiment.

Next, with reference to the flowchart of FIG. 55, description is made of a video signal transmission process to be executed by the broadcasting camera 11*e* according to the seventh embodiment.

In Step S401, the mapping unit 911 of the signal processing unit 902 maps a video signal into basic streams. Specifically, the mapping unit 911 maps an 8K signal into basic streams on 48 channels. In this context, description is made of a specific example of the method of mapping the 8K signal into the basic streams on 48 channels.

For example, the mapping unit 911 divides the 8K signal into four in accordance with color signal components so as to generate a total of 12 sub-images. Specifically, color signal components of R, G, and B or Y, Cb, and Cr of the 8K signal are each divided into four by a process such as 1-bit interleaving and 2-bit interleaving. With this, a total of 12 sub-images of 4K signals are generated.

Then, the mapping unit 911 further divides each of the 12 sub-images into four by the process such as 1-bit interleaving and 2-bit interleaving. With this, a total of 48 basic images of 2K signals are generated.

Next, the mapping unit 911 multiplexes the 48 basic images respectively into the basic streams on 48 channels. Note that, as described above, the basic streams each have the 12-bit word length, and hence 12-bit data items of pixel samples of each of the basic images can be multiplexed as they are into the basic streams.

At this time, the mapping unit 911 multiplexes ancillary data and extra pixels on the left and right of the video signal into the horizontal ancillary data area of the basic stream.

Figure 56:
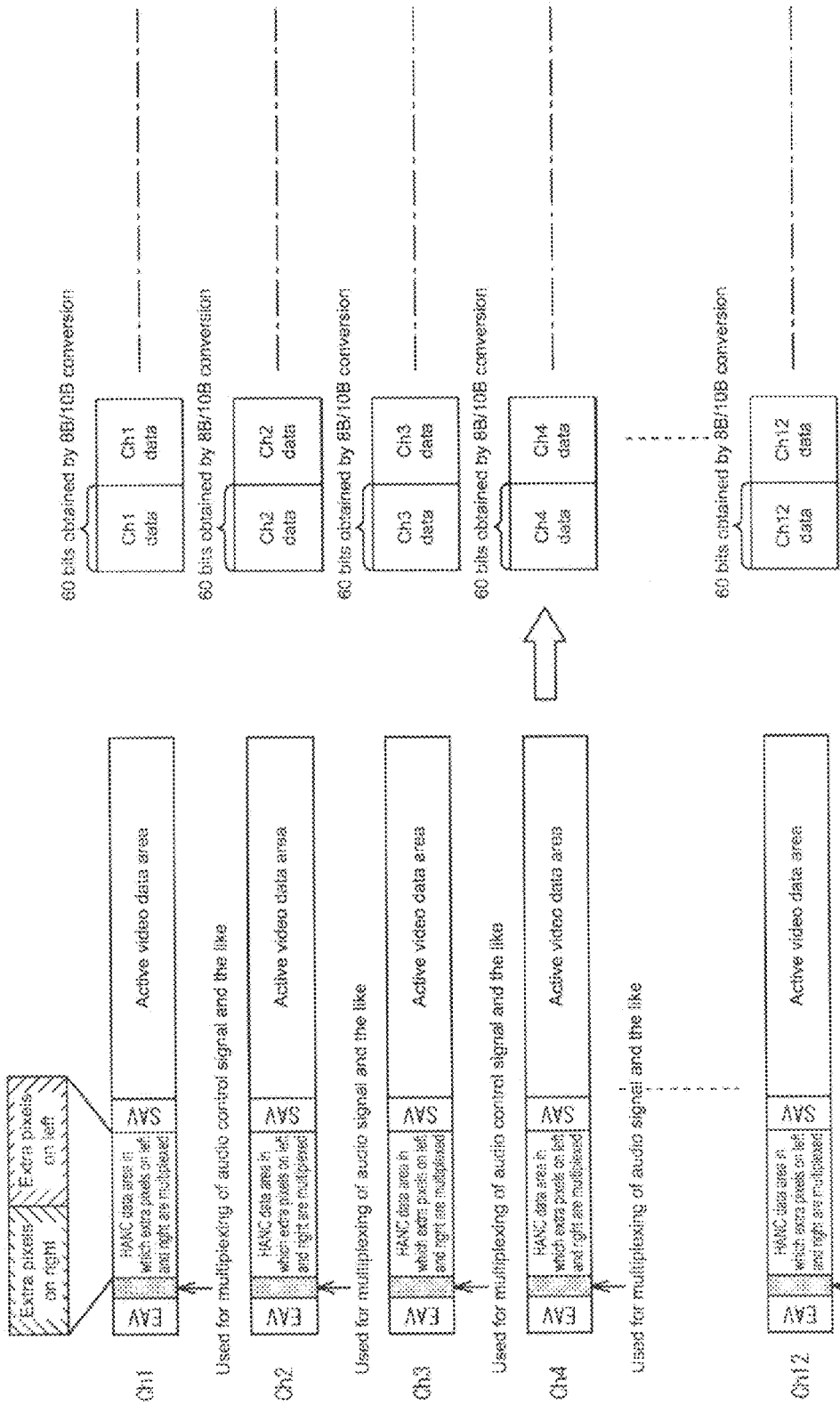
FIG. 56 is an explanatory diagram of a first example of a multiplexing method for ancillary data and extra pixels and a method of generating data blocks in the video signal transmission process according to the seventh embodiment.
Figure 57:
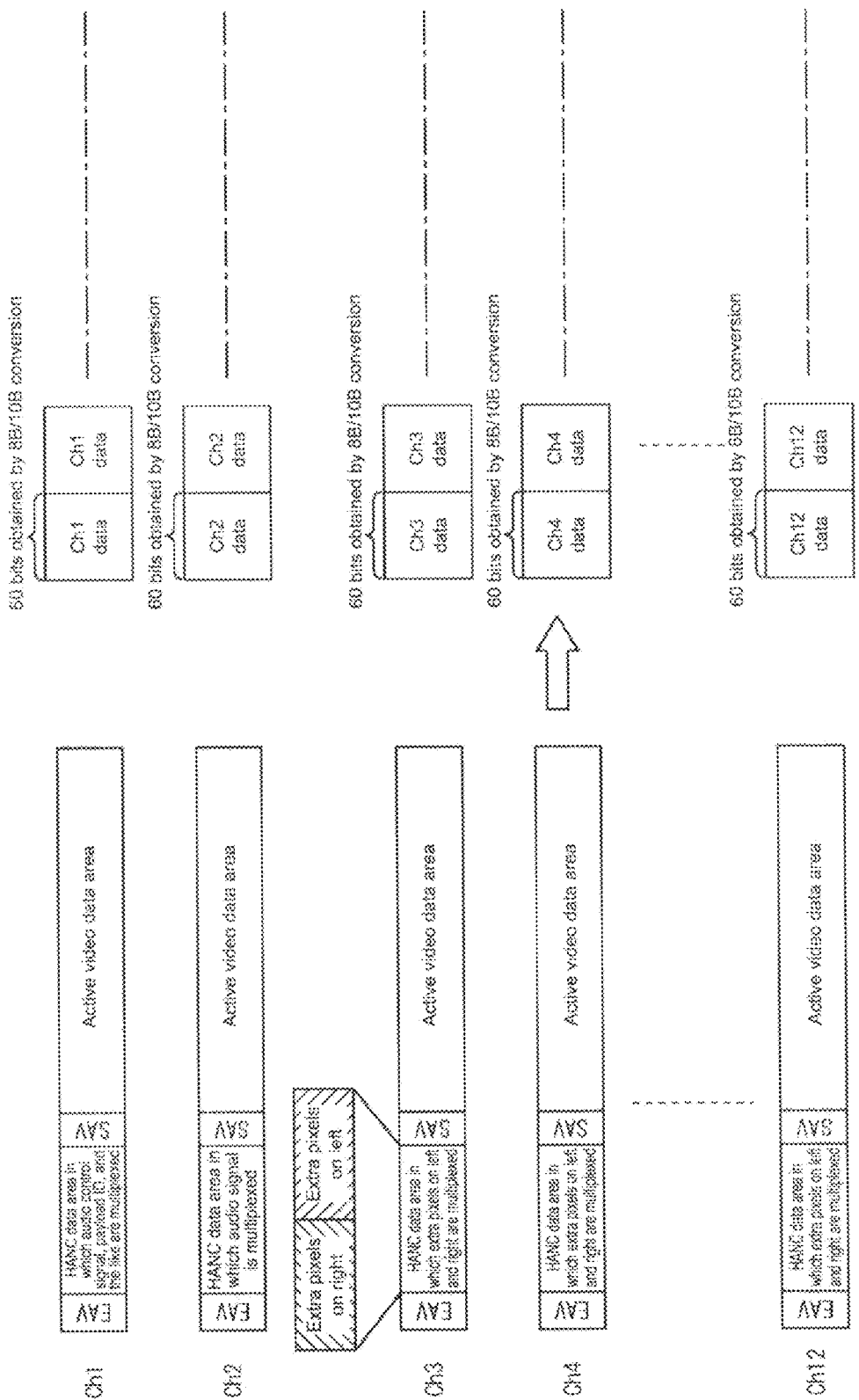
FIG. 57 is an explanatory diagram of a second example of the multiplexing method for ancillary data and extra pixels and the method of generating data blocks in the video signal transmission process according to the seventh embodiment.

Here, with reference to FIGS. 56 and 57, description is made of specific examples of a multiplexing method for the ancillary data and the extra pixels.

(First Multiplexing Method for Ancillary Data and Extra Pixels)

The left part of FIG. 56 shows a first multiplexing method for ancillary data and extra pixels. Note that, FIG. 56 shows only the basic streams on the channels 1 to 12, which are supplied from the mapping unit 911 to the multiplexing unit 912-1. However, ancillary data and extra pixels are similarly multiplexed into the basic streams on the other channels 13 to 48.

Specifically, ancillary data multiplexing areas are secured in the horizontal ancillary data area of each of the basic streams. The ancillary data multiplexing areas on each odd-numbered channel are set to have a size larger than at least the number of bytes of an audio control signal and a time code, and the ancillary data multiplexing areas on each even-numbered channel are set to have a size equal to or more than 31 bytes that is a data length of an audio data packet.

Then, the audio data packets conforming to the specification of SMPTE 299-1 are multiplexed into the ancillary data multiplexing areas of the basic streams on the even-numbered channels. Further, an audio control packet, a time code, a payload ID, and the like are multiplexed into the ancillary data multiplexing areas of the basic stream on the odd-numbered channels.

In this way, up to 24 audio data packets can be multiplexed into the basic streams on 48 channels.

In this context, for example, 48-kHz sampled audio signals are sampled approximately 0.853 (=48 kHz÷50 Hz÷1,125 lines) times on average per line of a 1920×1125/50P basic stream. Further, for example, the 48-kHz sampled audio signals are sampled approximately 0.711 (=48 kHz÷60 Hz÷1,125 lines) times on average per line of a 1920×1125/60P basic stream. In other words, the 48-kHz sampled audio signals are sampled once in a line or each set of two lines of the 1920×1125/50P or 60P basic stream.

Thus, in a case where the 48-kHz sampled audio signals are multiplexed in the 1920×1125/50P or 60P basic stream prior to transmission, audio signals on respective channels need to be multiplexed into up to one sample per line. In this context, as described above, twenty-four audio data packets can be multiplexed, and hence the 48-kHz sampled audio signals on up to 96 channels (=4 channels×24 audio data packets) can be multiplexed prior to transmission.

Note that, the 32-kHz or 44.1-kHz sampled audio signals on up to 96 channels can be transmitted as well. Meanwhile, the 96-kHz sampled audio signals on up to 48 channels, which is half of the 64 channels, can be transmitted.

Further, in the extra pixel multiplexing area except the ancillary data multiplexing areas in the horizontal ancillary data area of the basic stream on each channel, data items of pixel samples in left and right extra pixel areas of the 8K signal are multiplexed.

For example, in a case where the ancillary data multiplexing areas are each set to have 31 bytes, values of the extra pixel multiplexing area relative proportion are obtained using the following equations (21) and (22). Note that, the equation (21) represents a proportion in a case where a 7680×4320/60P video signal is transmitted, and the equation (22) represents a proportion in a case where a 7680×4320/50P video signal is transmitted.

$$(2200-1920-12-31)\div1920=0.123=12.3\% \quad (21)$$

$$(2640-1920-12-31)\div1920=0.353=35.3\% \quad (22)$$

In this way, the extra pixel multiplexing area can be sufficiently secured in the active video data area. As a result, all the data items of the pixel samples in the left and right extra pixel areas of the 8K signal can be multiplexed and transmitted.

Note that, all the data items in upper and lower extra pixel areas of the 8K signal can be transmitted by being multiplexed into vertical blanking areas of each of the basic images.

(Second Multiplexing Method for Ancillary Data and Extra Pixels)

The left part of FIG. 57 shows a second multiplexing method for ancillary data and extra pixels. Note that, FIG. 57 shows only the basic streams on the channels 1 to 12, which are supplied from the mapping unit 911 to the multiplexing unit 912-1. However, ancillary data and extra pixels are similarly multiplexed into the basic streams on the other channels 13 to 48.

Specifically, up to four audio data packets are multiplexed twice into the horizontal ancillary data area of the basic stream on each of the channels 2, 14, 26, and 38. Further, an audio control packet, a time code, a payload ID, and the like are multiplexed into the ancillary data multiplexing areas of the basic stream on each of the channels 1, 13, 25, and 37.

Thus, up to 32 audio data packets can be multiplexed into the basic streams on 48 channels. With this, the 32-kHz, the 44.1-kHz, or the 48-kHz sampled audio signals on up to 128 channels can be multiplexed and transmitted. Further, the 96-kHz sampled audio signals on up to 64 channels can be multiplexed and transmitted.

Note that, in a case where the active video data area of each of the basic streams occupies 2,048 samples, as in the case of the HD-SDIs, the number of audio data packets that can be multiplexed into the horizontal ancillary data area is reduced to half of that in the case where the active video data area occupies 1,920 samples. Thus, in the case where the active video data area of each of the basic streams occupies 2,048 samples, the 32-kHz, the 44.1-kHz, or the 48-kHz sampled audio signals on up to 64 channels can be multiplexed and transmitted. Further, the 96-kHz sampled audio signals on up to 32 channels can be multiplexed and transmitted.

Further, each on 40 channels except the channels 1, 2, 13, 14, 25, 26, 37, and 38 into which ancillary data items are multiplexed, the entire of the horizontal ancillary data area is allocated to the extra pixel multiplexing area.

In this case, values of the extra pixel multiplexing area relative proportion are obtained using the following equations (23) and (24). Note that, the equation (23) represents a proportion in a case where a 7680×4320/60P video signal is transmitted, and the equation (24) represents a proportion in a case where a 7680×4320/50P video signal is transmitted.

$$(2200-1920-12)\times40\div48\div1920=0.116=11.6\% \quad (23)$$

$$(2640-1920-12)\times40\div48\div1920=0.307=30.7\% \quad (24)$$

In this way, the extra pixel multiplexing area can be sufficiently secured in the active video data area. As a result, all the data items of the pixel samples in the left and right extra pixel areas of the 8K signal can be multiplexed and transmitted.

Note that, all the data items in the upper and lower extra pixel areas of the 8K signal can be transmitted by being multiplexed into the vertical blanking areas of each of the basic images.

In this way, the 8K signal is mapped into basic streams on 48 channels. Note that, the method of mapping the 8K signal described above is merely an example, and the 8K signal may be mapped into basic streams on 48 channels by using other methods.

Then, the mapping unit 911 supplies the basic streams on the channels 1 to 12 to the multiplexing unit 912-1, and supplies the basic streams on the channels 13 to 24 to the multiplexing unit 912-2. Further, the mapping unit 911 supplies the basic streams on the channels 25 to 36 to the multiplexing unit 912-3, and supplies the basic streams on the channels 37 to 48 to the multiplexing unit 912-4.

Referring back to FIG. 55, in Step S402, the multiplexing units 912 perform 8B/10B conversion of the basic streams in block units.

Specifically, the basic stream on the channel 1 is input to the receiving unit 941-1 of the 8B/10B conversion unit 931-1 of the multiplexing unit 912-1. The receiving unit 941-1 performs the S/P conversion and the descrambling of the basic stream, and extracts data in units of 1 word (12 bits) in synchronization with the clock signal of 148.5 MHz. Then, the receiving unit 141-1 supplies the data to the TRS detection unit 942-1.

The TRS detection unit 942-1 detects the SAV and the EAV included in the basic stream so as to synchronize the words in the basic stream. Then, the TRS detection unit 942-1 extracts data in units of 48 bits sequentially from the head of the SAV of the basic stream in four clocks (12 bits×4 clocks) of the clock signal of 148.5 MHz, and stores the data to the RAM 943-1.

The 8B/10B encoder 944-1 reads blocks of the data in the units of 48 bits from the RAM 943-1 in each set of four clocks of the clock signal of 148.5 MHz, and performs 8B/10B conversion of the read data blocks. Then, the 8B/10B encoder 944-1 supplies 60-bit data blocks obtained by the 8B/10B conversion to the data stream generating unit 932.

Note that, as shown in the right parts of FIGS. 56 and 57, also in basic streams on the other channels, which are input to the multiplexing unit 912-1, 8B/10B conversion is performed sequentially from the head of an SAV in the units of blocks of 48 bits. Then, the 60-bit data blocks obtained by the 8B/10B conversion are supplied to the data steam generating unit 932.

Figure 58:
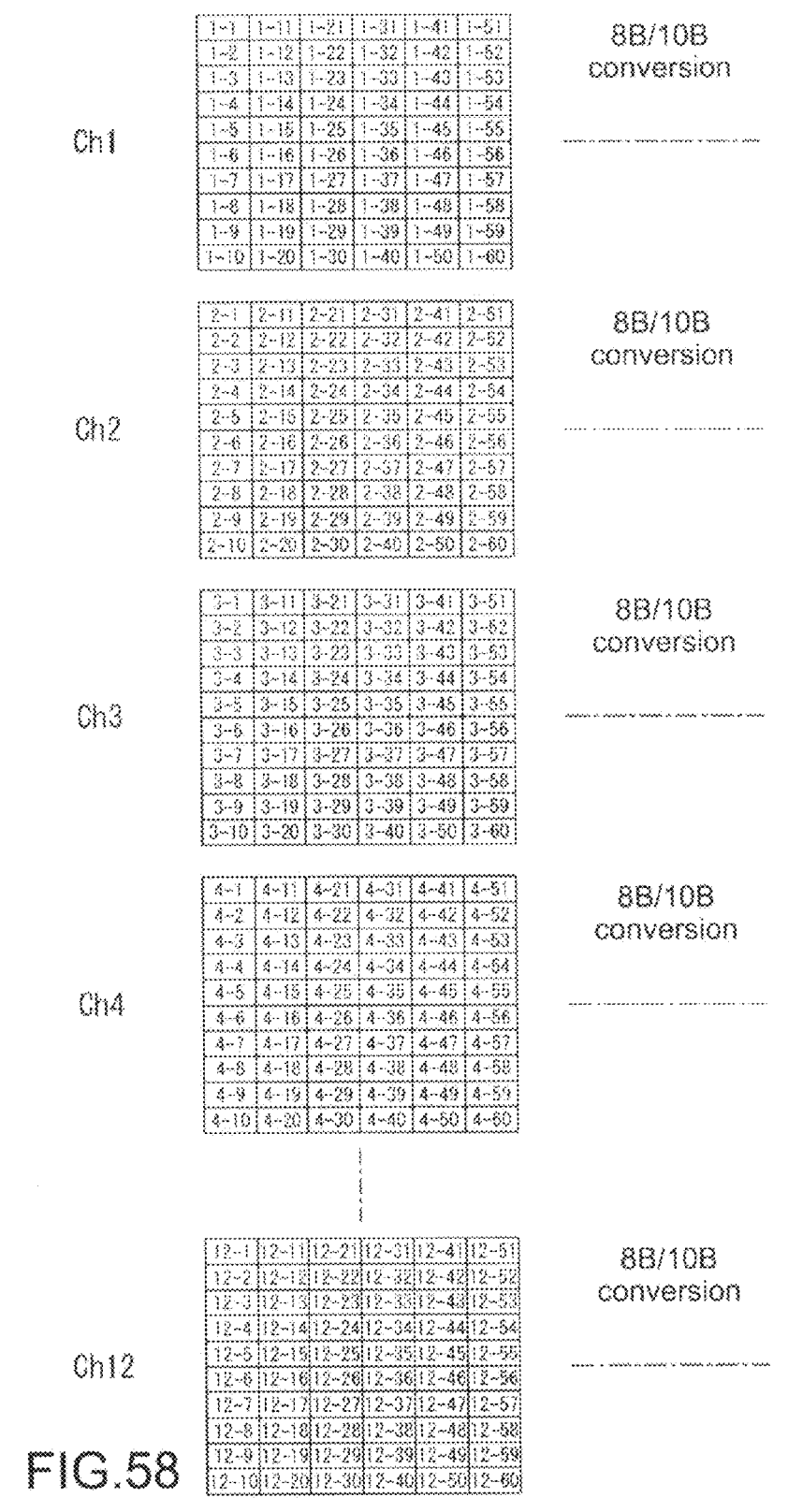
Figure 59:
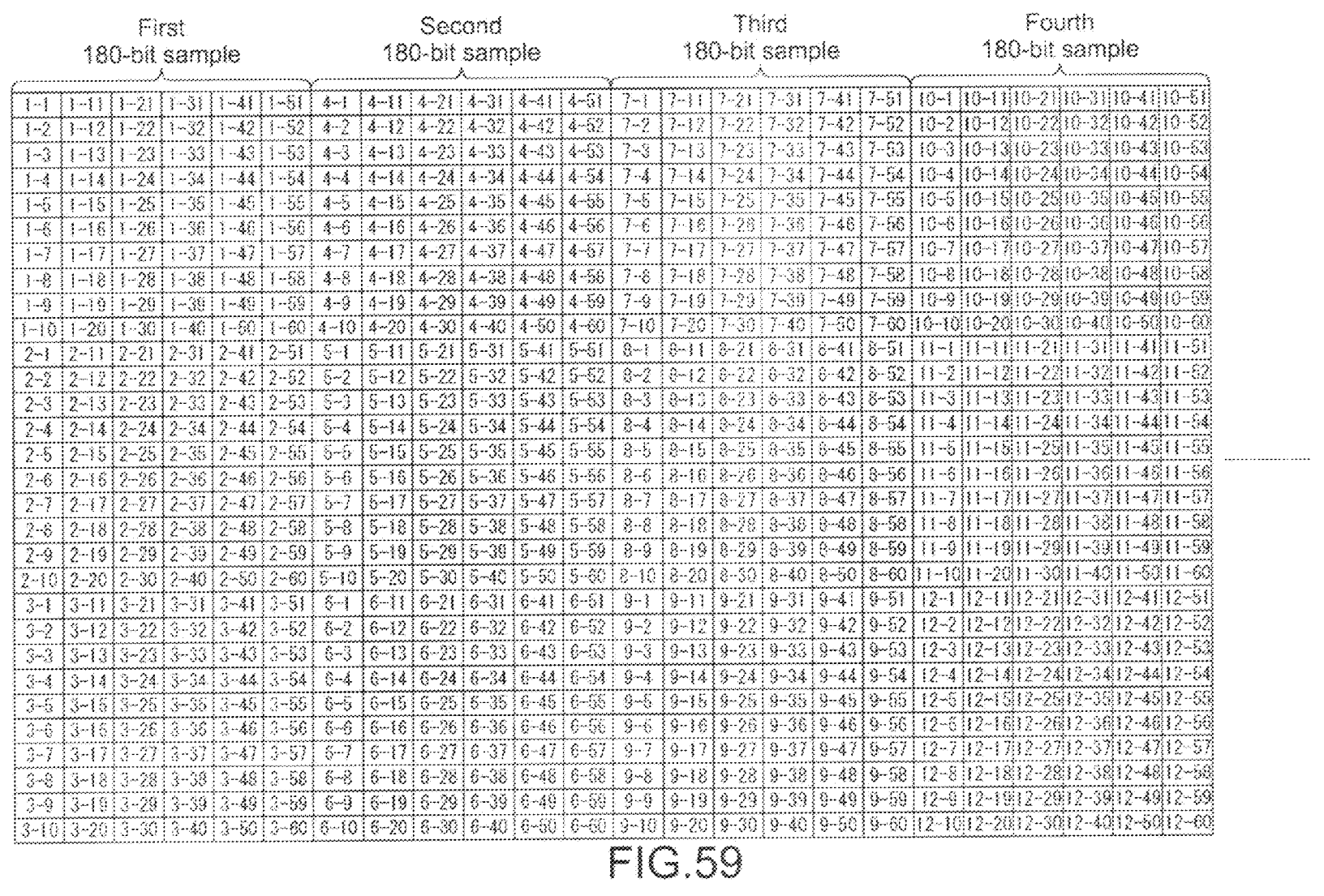

In this way, as shown schematically in FIG. 58, the 60-bit data block generated from each of the basic streams on the channels 1 to 12 is supplied to the data stream generating unit 932 in each of the sets of four clocks. With this, as modeled in FIG. 59, substantially, a process of supplying a 180-bit/sample data item to the data steam generating unit 932 in each clock is repeated in cycles of four clocks. Thus, data streams of substantially 180 bits×148.5 MHz are supplied to the data stream generating unit 932.

Note that, the same process is executed also in the multiplexing units 912-2 to 912-4. Specifically, the 8B/10B conversion in the units of 48 bits is performed sequentially from the head of an SAV of each of the basic streams on 12 channels, which are input to each of the multiplexing units 912. Then, the 60-bit data blocks obtained by the 8B/10B conversion are supplied to the data steam generating unit 932.

Referring back to FIG. 55, in Step S403, the multiplexing units 912 generate the transmission data streams.

Specifically, in synchronization with the clock signal of 167.0625 MHz, the data stream generating unit 932 of the multiplexing unit 912-1 arrays, in a predetermined order, the data blocks supplied from the 8B/10B encoders 944, and extracts data in 160-bit units. Then, the data steam generating unit 932 generates parallel data having a 160-bit word length from the extracted data, and outputs the parallel data to the P/S conversion unit 134.

In this way, a transmission data stream is generated by multiplexing the basic streams on the channels 1 to 12, and supplied to the P/S conversion unit 134. Further, the bit rate of the data stream is converted from 180 bits×148.5 MHz to 160 bits×167.0625 MHz.

Further, at this time, the data stream generating unit 932 overwrites a data item of first two or more words (24 bits or more) from an SAV of each line of the basic stream on the channel 1 with the comma character for 8B/10B codes, such as K28.5. The overwritten data item is used as a synchronization signal for the transmission data stream.

Further, the data stream generating unit 932 of each of the multiplexing units 912-2 to 912-4 generates and supplies the transmission data stream to the P/S conversion unit 134 by executing the same process as that by the data stream generating unit 932 of the multiplexing unit 912-1. With this, transmission data streams are generated by respectively multiplexing the basic streams on the channels 13 to 24, the channels 25 to 36, and the channels 37 to 48, and supplied to the P/S conversion unit 134.

Note that, as well as that of the basic stream on the channel 1, a data item of first two or more words from an SAV of each line of each of the basic streams on the channels 13, 25, and 37 is overwritten by the comma character for 8B/10B codes, such as K28.5.

In Step S404, by the same process as that of Step S4 in FIG. 10, those four-lane transmission data streams are sent.

(Video Signal Reception Process According to Seventh Embodiment)

Figure 60:
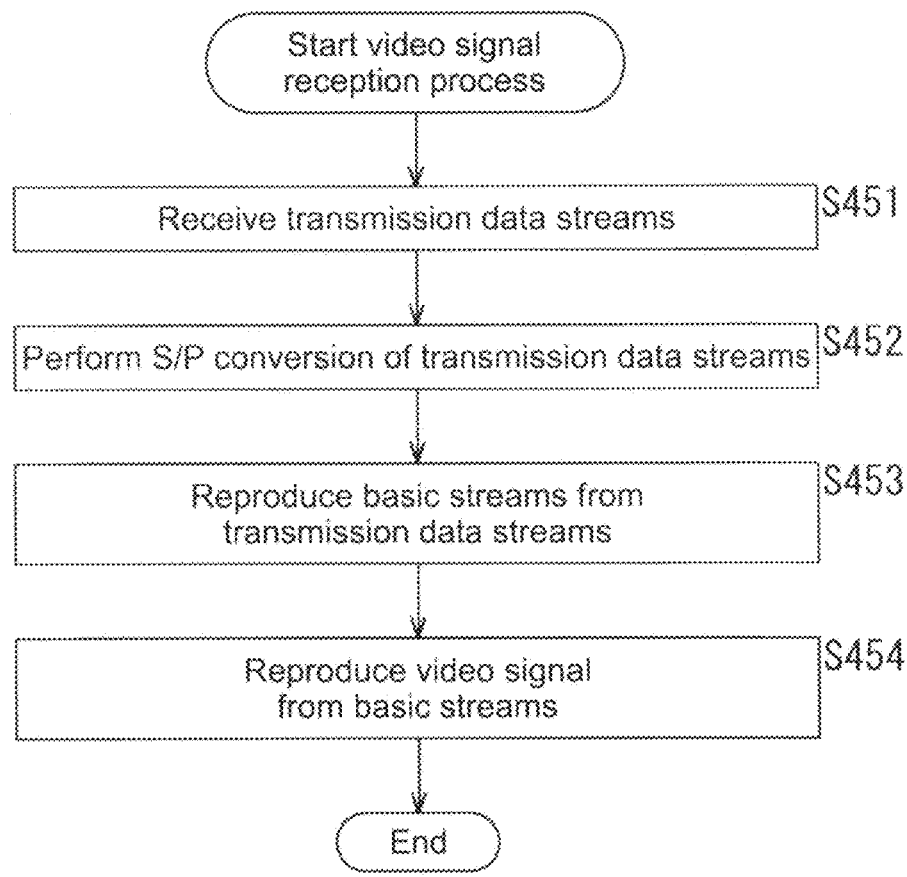
FIG. 60 is an explanatory flowchart of a video signal reception process according to the seventh embodiment.

Next, with reference to the flowchart of FIG. 60, description is made of a video signal reception process to be executed by the CCU 12e correspondingly to the video signal transmission process of FIG. 55.

In Step S451, by the same process as that of Step S51 in FIG. 23, the four-lane transmission data streams are received.

In Step S452, by the same process as that of Step S52 in FIG. 23, the four-lane transmission data streams are subjected to the S/P conversion.

In Step S453, the word synchronization detection-data stream reproducing unit 1011 reproduces basic streams from the transmission data streams. Specifically, the word synchronization detection-data stream reproducing unit 1011 detects word synchronization signals that are multiplexed in the four-lane transmission data streams so as to synchronize the words in the transmission data streams. Then, the word synchronization detection-data stream reproducing unit 1011 executes processes reverse to those by the multiplexing units 912 of the broadcasting camera 11e so as to reproduce the basic streams on 48 channels from the four-lane transmission data streams. Next, the word synchronization detection-data stream reproducing unit 1011 supplies the reproduced basic streams on 48 channels to the video reproducing unit 1012.

In Step S454, the video reproducing unit 1012 reproduces a video signal from the basic streams. Specifically, the video reproducing unit 1012 executes processes reverse to those by the mapping unit 911 of the broadcasting camera 11e so as to reproduce the original 8K signal from the basic streams on 48 channels. Then, the video reproducing unit 1012 supplies the reproduced 8K signal to the video processing unit 203.

In this way, the video signal of 7680×4320/50P-60P/4:4:4,4:2:2/10 bits or 12 bits can be transmitted in the form of the four-lane transmission data streams via 100 GbE devices.

10. Eighth Embodiment

Next, with reference to FIGS. 61 to 69, description is made of the eighth embodiment of the present technology.

In the eighth embodiment, an 8K signal at 100P-120P is transmitted via a 100 GbE device. Examples of the 8K signal at 100P-120P include video signals of 7680×4320/100P-120P/4:4:4,4:2:2/10 bits or 12 bits.

(Configuration Example of Broadcasting Camera 11f)

Figure 61:
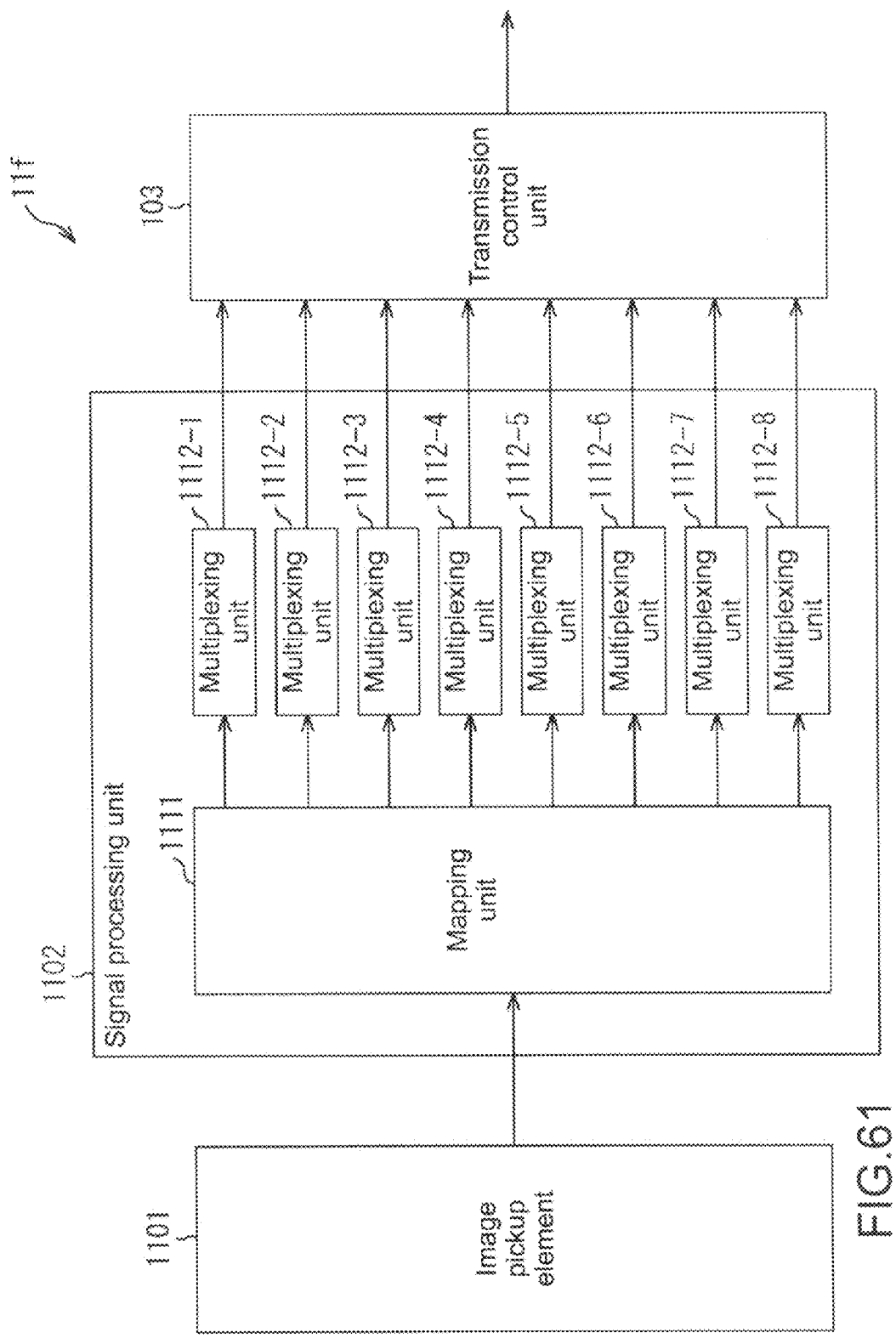
FIG. 61 is a block diagram showing a configuration example of functions of a broadcasting camera according to an eighth embodiment.

FIG. 61 is a block diagram showing a configuration example of functions of a broadcasting camera 11f as an embodiment of the broadcasting cameras 11 according to the eighth embodiment. Note that, in the figure, the parts equivalent to those of the broadcasting camera 11e of FIG. 52 are denoted by the same reference symbols, and redundant descriptions of parts to execute the same processes are omitted as appropriate.

The broadcasting camera 11f is different from the broadcasting camera 11e in that an image pickup element 1101 and a signal processing unit 1102 are provided respectively instead of the image pickup element 901 and the signal processing unit 902.

Examples of the image pickup element 1101 include a CMOS image sensor and a CCD image sensor. The image pickup element 1101 supplies video signals obtained as a result of imaging to a mapping unit 1111 of the signal processing unit 1102. Examples of the video signals include video signals of 7680×4320/100P-120P/4:4:4,4:2:2/10 bits or 12 bits.

The signal processing unit 1102 multiplexes the video signals supplied from the image pickup element 1101 into data streams of a type that can be transmitted via 100 GbE devices, and supplies the data streams to the transmission control unit 103. The signal processing unit 1102 includes the mapping unit 1111 and multiplexing units 1112-1 to 1112-8.

As described below, the mapping unit 1111 maps the video signals supplied from the image pickup element 1101 so as to generate basic streams on 48 channels. Then, the mapping unit 1111 supplies basic streams on channels 1 to 6 to the multiplexing unit 1112-1, and supplies basic streams on channels 7 to 12 to the multiplexing unit 1112-2. Further, the mapping unit 1111 supplies basic streams on channels 13 to 18 to the multiplexing unit 1112-3, and supplies basic streams on channels 19 to 24 to the multiplexing unit 1112-4. Still further, the mapping unit 1111 supplies basic streams on channels 25 to 30 to the multiplexing unit 1112-5, and supplies basic streams on channels 31 to 36 to the multiplexing unit 1112-6. Yet further, the mapping unit 1111 supplies basic streams on channels 37 to 42 to the multiplexing unit 1112-7, and supplies basic streams on channels 43 to 48 to the multiplexing unit 1112-8.

As described below, the multiplexing units 1112-1 to 1112-8 each perform multiplexing by channel coding of the basic streams on six channels supplied from the mapping unit 1111. With this, transmission data streams are generated. Then, the multiplexing units 1112-1 to 1112-8 supply the generated transmission data streams to the transmission control unit 103.

Note that, in the following, unless the multiplexing units 1112-1 to 1112-8 need not be distinguished from each other, those units are simply referred to as multiplexing units 1112.

(Configuration Example of Multiplexing Unit 1112)

Figure 62:
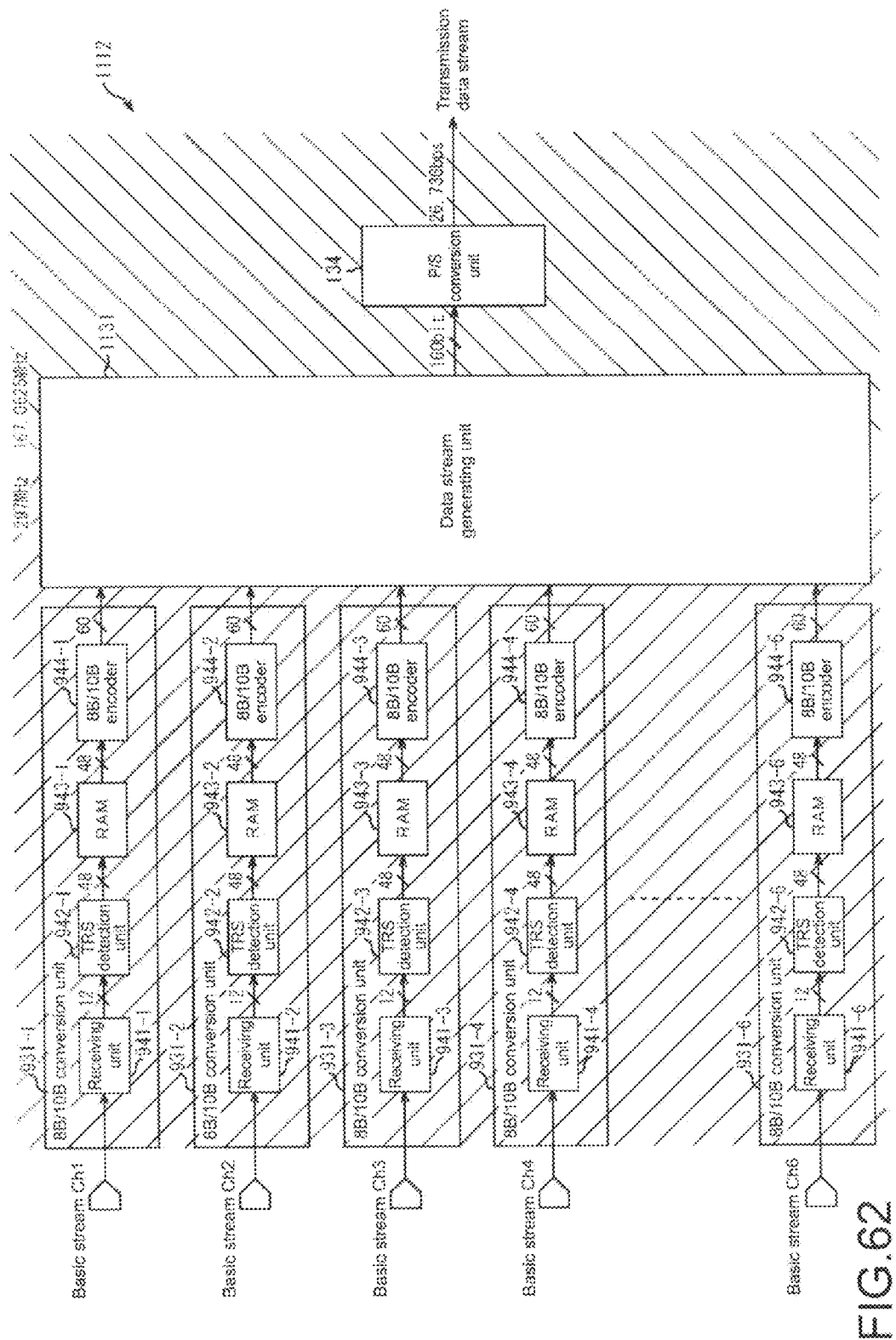
FIG. 62 is a block diagram showing a configuration example of functions of a multiplexing unit of the broadcasting camera according to the eighth embodiment.

FIG. 62 is a block diagram showing a configuration example of functions of the multiplexing unit 1112. Note that, in the figure, the parts equivalent to those of the multiplexing unit 912 of FIG. 53 are denoted by the same reference symbols, and redundant descriptions of parts to execute the same processes are omitted.

The multiplexing unit 1112 is different from the multiplexing unit 912 in that a data steam generating unit 1131 is provided instead of the data steam generating unit 932 and in that the number of the 8B/10B conversion units 931 is reduced from twelve to six.

The data stream generating unit 1131 generates a parallel transmission data stream having a predetermined word length by multiplexing, by a predetermined procedure, the data blocks supplied from the 8B/10B encoders 944-1 to 944-6. The data stream generating unit 1131 supplies the generated transmission data stream to the P/S conversion unit 134.

(Configuration Example of CCU 12f)

Figure 63:
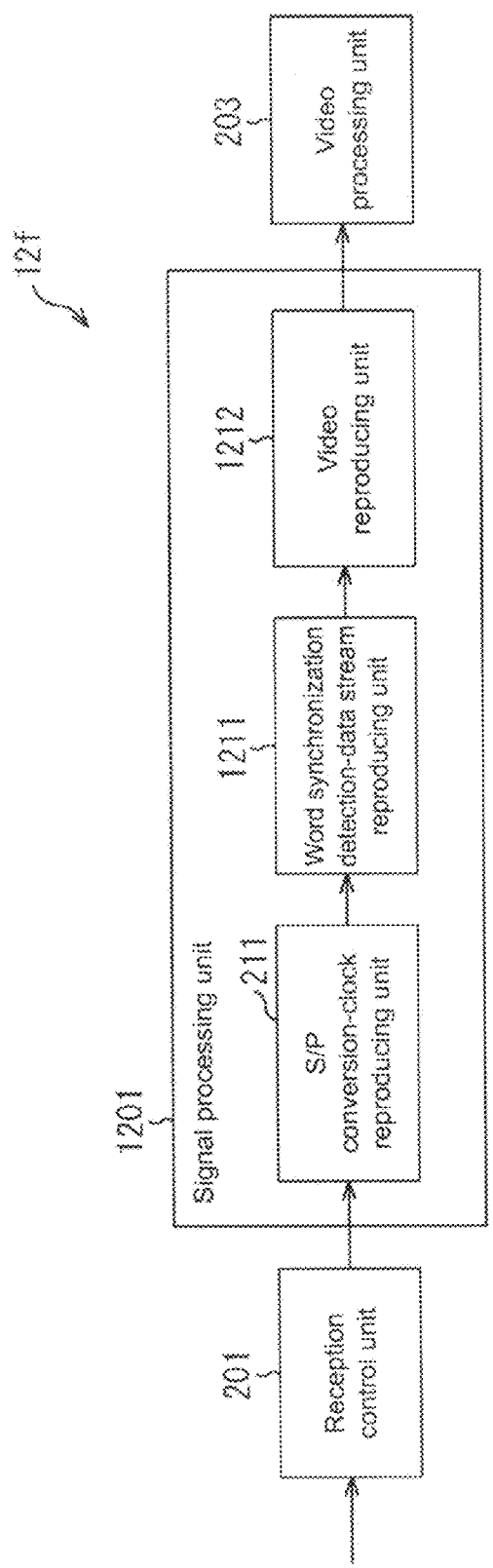
FIG. 63 is a block diagram showing a configuration example of functions of a CCU according to the eighth embodiment.

FIG. 63 is a block diagram showing a configuration example of functions of a CCU 12f as an embodiment of the CCU 12 according to the eighth embodiment. Note that, in the figure, the parts equivalent to those of the CCU 12e of FIG. 54 are denoted by the same reference symbols, and redundant descriptions of parts to execute the same processes are omitted as appropriate.

The CCU 12f is different from the CCU 12e in that a signal processing unit 1201 is provided instead of the signal processing unit 1001. The signal processing unit 1201 is different from the signal processing unit 1001 in that a word synchronization detection-data stream reproducing unit 1211 and a video reproducing unit 1212 are provided respectively instead of the word synchronization detection-data stream reproducing unit 1011 and the video reproducing unit 1012.

The word synchronization detection-data stream reproducing unit 1211 detects the word synchronization signals from the transmission data streams subjected to the S/P conversion so as to synchronize words in the transmission data streams. Further, the word synchronization detection-data stream reproducing unit 1211 executes processes reverse to those by the multiplexing units 1112 of the broadcasting camera 11f so as to reproduce the basic streams on 48 channels from the transmission data streams. Then, the word synchronization detection-data stream reproducing unit 1211 supplies the basic streams to the video reproducing unit 1212.

The video reproducing unit 1212 executes processes reverse to those by the mapping unit 1111 of the broadcasting camera 11f so as to reproduce the original 8K signal from the basic streams on 48 channels. Then, the video reproducing unit 1212 supplies the 8K signal to the video processing unit 203.

(Video Signal Transmission Process According to Eighth Embodiment)

Figure 64:
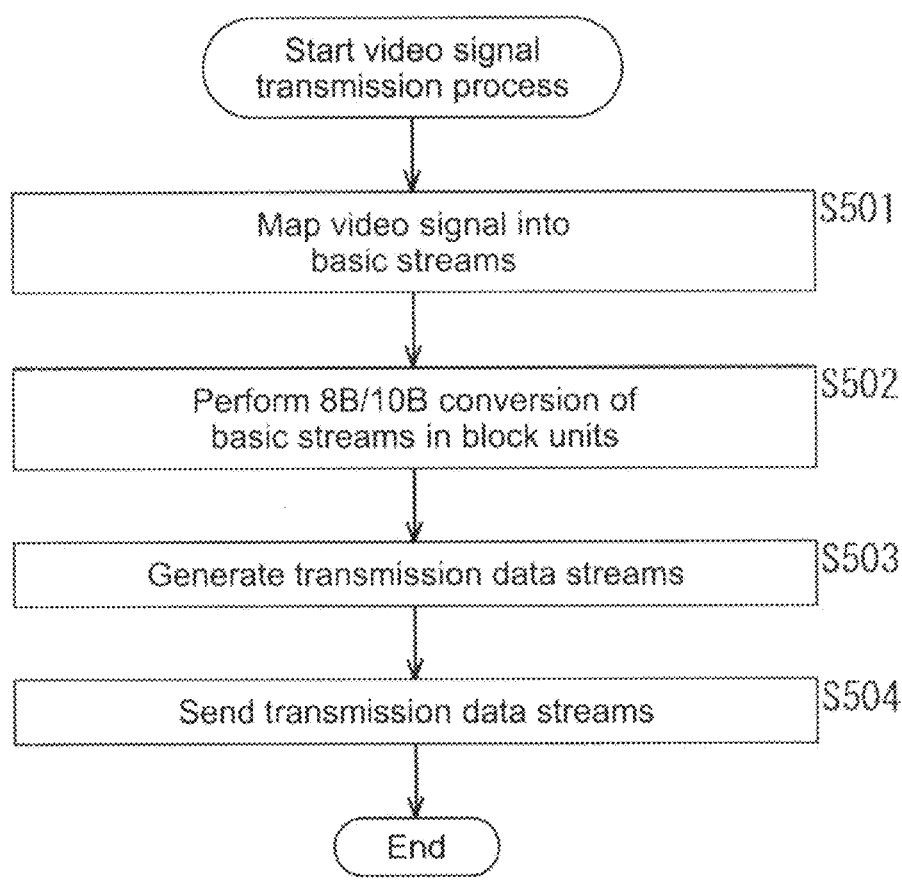
FIG. 64 is an explanatory flowchart of a video signal transmission process according to the eighth embodiment.

Next, with reference to the flowchart of FIG. 64, description is made of a video signal transmission process to be executed by the broadcasting camera 11f according to the eighth embodiment.

In Step S501, the mapping unit 1111 of the signal processing unit 1102 maps a video signal into basic streams. Specifically, by the same process as that of Step S401 in FIG. 55, which is executed by the mapping unit 911, the mapping unit 1111 maps an 8K signal into basic streams on 48 channels. Further, at this time, the mapping unit 1111 multiplexes ancillary data and extra pixels on the left and right of the video signal into a horizontal ancillary data area of each of the basic streams.

Figure 65:
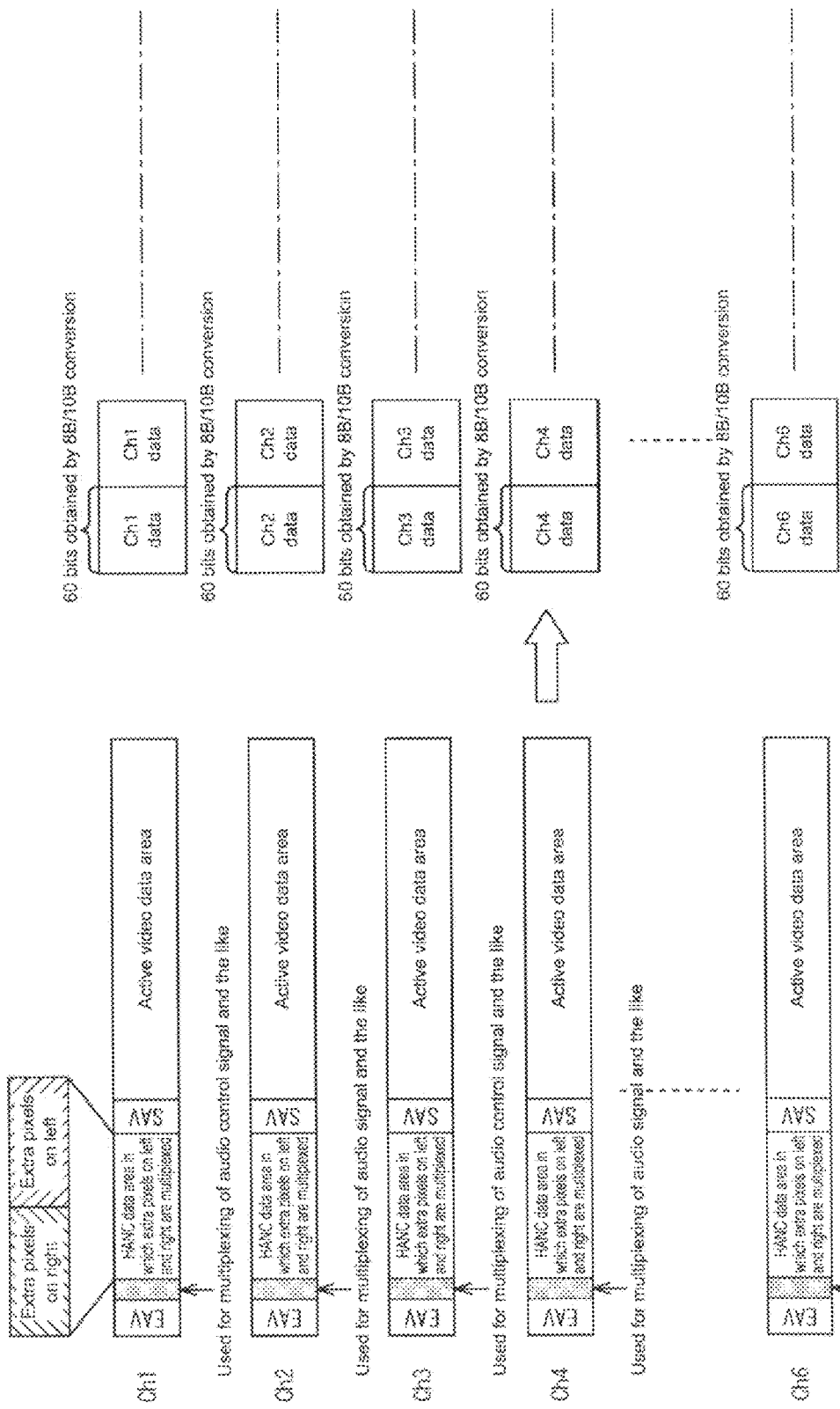
FIG. 65 is an explanatory diagram of a first example of a multiplexing method for ancillary data and extra pixels and a method of generating data blocks in the video signal transmission process according to the eighth embodiment.
Figure 66:
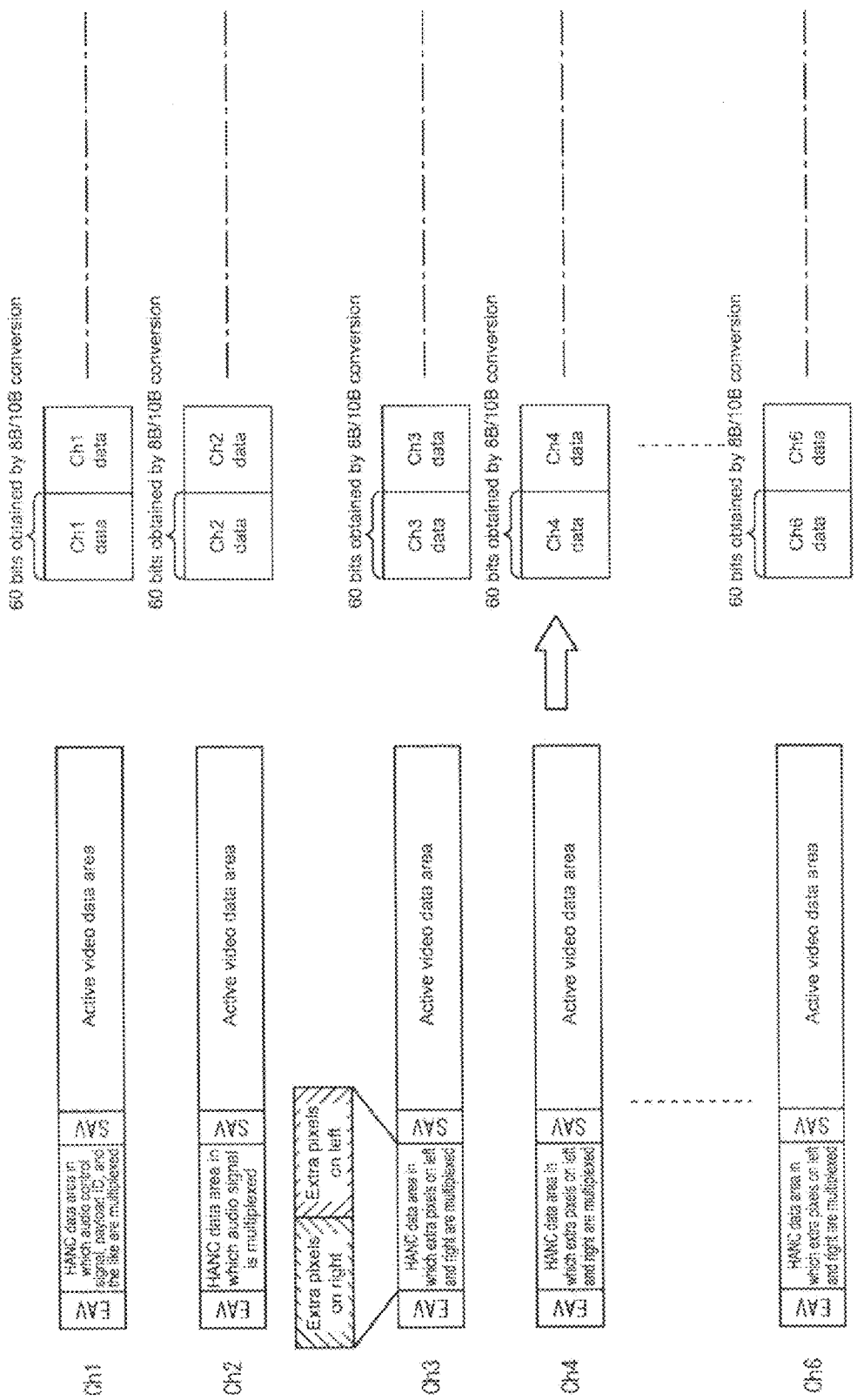
FIG. 66 is an explanatory diagram of a second example of the multiplexing method for ancillary data and extra pixels and the method of generating data blocks in the video signal transmission process according to the eighth embodiment.

Here, with reference to FIGS. 65 and 66, description is made of specific examples of a multiplexing method for ancillary data and extra pixels.

(First Multiplexing Method for Ancillary Data and Extra Pixels)

The left part of FIG. 65 shows a first multiplexing method for ancillary data and extra pixels. Note that, FIG. 65 shows only the basic streams on the channels 1 to 6, which are supplied from the mapping unit 1111 to the multiplexing unit 1112-1. However, ancillary data and extra pixels are similarly multiplexed into the basic streams on the other channels 7 to 48.

Specifically, by this first multiplexing method, ancillary data and extra pixels are multiplexed similar to the first multiplexing method according to the seventh embodiment. More specifically, ancillary data multiplexing areas are secured in the horizontal ancillary data area of the basic stream on each of the channels. Further, the audio data packets conforming to the specifications of SMPTE 299-1 are multiplexed into ancillary data multiplexing areas of the basic streams on even-numbered channels. Still further, an audio control packet, a time code, a payload ID, and the like are multiplexed into ancillary data multiplexing areas of the basic stream on odd-numbered channels. Yet further, in an extra pixel multiplexing area except the ancillary data multiplexing areas in the horizontal ancillary data area of the basic stream on each of the channels, data items of pixel samples in left and right extra pixel areas of the 8K signal are multiplexed.

Thus, as well as the first multiplexing method according to the first embodiment, up to 24 audio data packets can be multiplexed into the basic streams on 48 channels.

In this context, for example, 48-kHz sampled audio signals are sampled approximately 0.426 (=48 kHz÷100 Hz÷1,125 lines) times on average per line of a 1920×1125/100P basic stream. Further, for example, the 48-kHz sampled audio signals are sampled approximately 0.356 (=48 kHz÷120 Hz÷1,125 lines) times on average per line of a 1920×1125/120P basic stream. In other words, the 48-kHz sampled audio signals are sampled once in each pair of two lines or each set of three lines of the 1920×1125/100P or 120P basic stream.

Thus, in a case where the 48-kHz sampled audio signals are multiplexed in the 1920×1125/100P or 120P basic stream prior to transmission, audio signals on respective channels need to be multiplexed into up to one sample in two lines. In this context, as described above, twenty-four audio data packets can be multiplexed, and hence the 48-kHz sampled audio signals on up to 192 channels (=4 channels×24 audio data packets×2) can be multiplexed prior to transmission.

Note that, the 32-kHz or 44.1-kHz sampled audio signals on up to 192 channels can be transmitted as well. Meanwhile, the 96-kHz sampled audio signals on up to 96 channels, which is half of the 192 channels, can be transmitted.

Note that, values of the extra pixel multiplexing area relative proportion are the same as those in the first multiplexing method according to the seventh embodiment.

(Second Multiplexing Method for Ancillary Data and Extra Pixels)

The left part of FIG. 66 shows a second multiplexing method for ancillary data and extra pixels. Note that, FIG. 66 shows only the basic streams on the channels 1 to 6, which are supplied from the mapping unit 1111 to the multiplexing unit 1112-1. However, ancillary data and extra pixels are similarly multiplexed into the basic streams on the other channels 7 to 48.

Specifically, up to four audio data packets are multiplexed twice into the horizontal ancillary data area of the basic stream on each of the channels 2, 8, 14, 20, 26, 32, 38, and 44. Further, an audio control packet, a time code, a payload ID, and the like are multiplexed into the ancillary data multiplexing areas of the basic stream on each of the channels 1, 7, 13, 19, 25, 31, 37, and 43.

Thus, up to 64 audio data packets can be multiplexed into the basic streams on 48 channels. With this, the 32-kHz, the 44.1-kHz, or the 48-kHz sampled audio signals on up to 256 channels can be multiplexed and transmitted. Further, the 96-kHz sampled audio signals on up to 128 channels can be multiplexed and transmitted.

Note that, as described above, in the case where the active video data area of each of the basic streams occupies 2,048 samples, the number of audio data packets that can be multiplexed into the horizontal ancillary data area is reduced to half of that in the case where the active video data area occupies 1,920 samples. Thus, in the case where the active video data area of each of the basic streams occupies 2,048 samples, the 32-kHz, the 44.1-kHz, or the 48-kHz sampled audio signals on up to 128 channels can be multiplexed and transmitted. Further, the 96-kHz sampled audio signals on up to 64 channels can be multiplexed and transmitted.

Further, each on 40 channels except the channels 1, 2, 7, 8, 13, 14, 19, 20, 25, 26, 31, 32, 37, 38, 43, and 44 into which ancillary data items are multiplexed, the entire of the horizontal ancillary data area is allocated to the extra pixel multiplexing area.

In this case, values of the extra pixel multiplexing area relative proportion are obtained using the following equations (25) and (26). Note that, the equation (25) represents a proportion in a case where a 7680×4320/120P video signal is transmitted, and the equation (26) represents a proportion in a case where a 7680×4320/100P video signal is transmitted.

$$(2200-1920-12) \times 32 \div 48 \div 1920 = 0.093 \text{-} 9.3\% \tag{25}$$

$$(2640-1920-12) \times 32 \div 48 \div 1920 = 0.246 = 24.6\% \tag{26}$$

In this way, the extra pixel multiplexing area can be sufficiently secured in the active video data area. As a result, all the data items of the pixel samples in the left and right extra pixel areas of the 8K signal can be multiplexed and transmitted.

Note that, all the data items in upper and lower extra pixel areas of the 8K signal can be transmitted by being multiplexed into vertical blanking areas of each of the basic images.

In this way, the 8K signal is mapped into basic streams on 48 channels. Note that, the method of mapping the 8K signal described above is merely an example, and the 8K signal may be mapped into basic streams on 48 channels by using other methods.

Then, the mapping unit 1111 supplies the basic streams on the channels 1 to 6 to the multiplexing unit 1112-1, and supplies the basic streams on the channels 7 to 12 to the multiplexing unit 1112-2. Further, the mapping unit 1111 supplies the basic streams on the channels 13 to 18 to the multiplexing unit 1112-3, and supplies the basic streams on the channels 19 to 24 to the multiplexing unit 1112-4. Still further, the mapping unit 1111 supplies the basic streams on the channels 25 to 30 to the multiplexing unit 1112-5, and supplies the basic streams on the channels 31 to 36 to the multiplexing unit 1112-6. Yet further, the mapping unit 1111 supplies the basic streams on the channels 37 to 42 to the multiplexing unit 1112-7, and supplies the basic streams on the channels 43 to 48 to the multiplexing unit 1112-8.

Referring back to FIG. 64, in Step S502, by the same process as that of Step S402 in FIG. 55, the basic streams on 48 channels are subjected to 8B/10B conversion in block units. Then, 60-bit data blocks obtained by the 8B/10B conversion are supplied to the data steam generating unit 1131. Note that, unlike the process of Step S402 in FIG. 55, the 8B/10B conversion is performed in each set of four clocks of a clock signal of 297 MHz.

In this way, as shown schematically in FIG. 67, for example, the 60-bit data block generated from each of the basic streams on the channels 1 to 6 is supplied from the multiplexing unit 1112-1 to the data steam generating unit 1131 in each of the sets of four clocks. With this, as modeled in FIG. 68, substantially, a process of supplying a 90-bit/sample data item from the multiplexing unit 1112-1 to the 1131 in each clock is repeated in cycles of four clocks. Thus, data streams of substantially 90 bits×297 MHz are supplied from each of the multiplexing units 1112 to the data steam generating unit 1131.

In Step S503, the multiplexing units 1112 generate the transmission data streams.

Specifically, in synchronization with the clock signal of 167.0625 MHz, the data stream generating unit 1131 of the multiplexing unit 1112-1 arrays, in a predetermined order, the data blocks supplied from the 8B/10B encoders 944, and extracts data in 160-bit units. Then, the data steam generating unit 1131 generates parallel data having a 160-bit word length from the extracted data, and outputs the parallel data to the P/S conversion unit 134.

In this way, a transmission data stream is generated by multiplexing the basic streams on the channels 1 to 6, and supplied to the P/S conversion unit 134. Further, the bit rate of the data stream is converted from 90 bits×297 MHz to 160 bits×167.0625 MHz.

Further, at this time, the data stream generating unit 1131 overwrites a data item of first two or more words (24 bits or more) from an SAV of each line of the basic stream on the channel 1 with the comma character for 8B/10B codes, such as K28.5. The overwritten data item is used as a synchronization signal for the transmission data stream.

Still further, the data stream generating unit 932 of each of the multiplexing units 1112-1 to 1112-8 generates and supplies the transmission data stream to the P/S conversion unit 134 by executing the same process as that by the data steam generating unit 1131 of the multiplexing unit 1112-1. With this, transmission data streams are generated by respectively multiplexing the basic streams on the channels 7 to 12, the channels 13 to 18, the channels 19 to 24, the channels 25 to 30, the channels 31 to 36, the channels 37 to 42, and the channels 43 to 48, and supplied to the P/S conversion unit 134.

Note that, as well as that of the basic stream on the channel 1, a data item of first two or more words from an SAV of each line of each of the basic streams on the channels 7, 13, 19, 25, 31, 37, and 43 is overwritten by the comma character for 8B/10B codes, such as K28.5.

In Step S504, by the same process as that of Step S4 in FIG. 10, those eight-lane transmission data streams are sent. At this time, as described above, the eight-lane transmission data streams can be transmitted at once via the single optical fiber cable 13.

(Video Signal Reception Process According to Eighth Embodiment)

Figure 69:
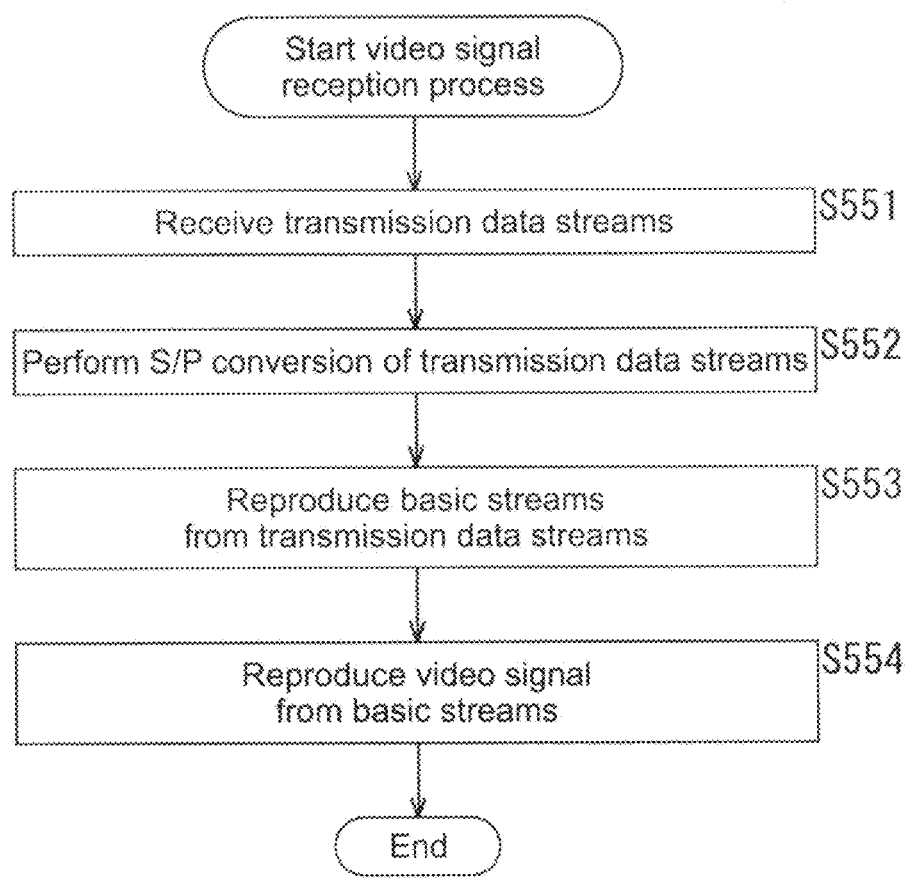
FIG. 69 is an explanatory flowchart of a video signal reception process according to the eighth embodiment.

Next, with reference to the flowchart of FIG. 69, description is made of a video signal reception process to be executed by the CCU 12*f* correspondingly to the video signal transmission process of FIG. 64.

In Step S551, by the same process as that of Step S51 in FIG. 23, the eight-lane transmission data streams are received.

In Step S552, by the same process as that of Step S52 in FIG. 23, the eight-lane transmission data streams are subjected to the S/P conversion.

In Step S553, the word synchronization detection-data stream reproducing unit 1211 reproduces basic streams from the transmission data streams. Specifically, the word synchronization detection-data stream reproducing unit 1211 detects word synchronization signals that are multiplexed in the eight-lane transmission data streams so as to synchronize the words in the transmission data streams. Then, the word synchronization detection-data stream reproducing unit 1211 executes processes reverse to those by the multiplexing units 1112 of the broadcasting camera 11*f* so as to reproduce the basic streams on 48 channels from the eight-lane transmission data streams. Next, the word synchronization detection-data stream reproducing unit 1211 supplies the reproduced basic streams on 48 channels to the video reproducing unit 1212.

In Step S554, the video reproducing unit 1212 reproduces a video signal from the basic streams. Specifically, the video reproducing unit 1212 executes processes reverse to those by the mapping unit 1111 of the broadcasting camera 11*f* so as to reproduce the original 8K signal from the basic streams on 48 channels. Then, the video reproducing unit 1212 supplies the reproduced 8K signal to the video processing unit 203.

In this way, the video signal of 7680×4320/100P-120P/4:4:4,4:2:2/10 bits or 12 bits can be transmitted in the form of the eight-lane transmission data streams via the 100 GbE device.

As described above, according to the first to eight embodiments of the present technology, 8K or 4K video signals can be transmitted via 100 GbE devices.

Development and commercialization of UHDTV have been promoted. Specifically, ITU has standardized video signal standards of UHDTV, and Ministry of Internal Affairs and Communication of Japan has approved UHDTV broadcasting ahead of schedule. Meanwhile, as for interfaces in studios, the method specified in SMPTE 2036-3 adapts to frame rates of up to 60P, and hence transmission methods suited to a UHDTV/120P signal standardized by ITU have not yet been provided. Further, as for a UHDTV2/120P signal, which is an extraordinarily-large-volume video signal having a bit rate of up to 144 Gbps, transmission methods suited to this UHDTV2/120P signal also have not yet been provided. In view of the circumstances, by application of the present technology, the video signals of UHDTV/120P and UHDTV2/120P can be transmitted via 100 GbE optical modules that are likely to prevail and become inexpensive in the future.

Further, the first to sixth embodiments according to the present technology are compatible with existing standards such as SMPTE 2036-3, and hence technologies and products in related art can be easily employed or applied.

Still further, according to the embodiments of the present technology, multi-channel audio signals are multiplexed and transmitted whether the active pixel area occupies 1,920 samples or 2,048 samples. Further, all the data items of the pixel samples in the extra pixel areas in both the vertical direction and the horizontal direction of the 8K or 4K video signals can be multiplexed and transmitted.

Yet further, according to the embodiments of the present technology, the same signal processes are executed on both the active pixel areas and the extra pixel areas. Thus, signal processes are simplified, for example, to downsize circuits or to save processing time periods.

11. Modifications

In the examples described in the first to sixth embodiments, video signals are mapped by mapping units into HD-SDI data streams on a plurality of channels, and the HD-SDI data streams are supplied to multiplexing units. However, the video signals may be mapped not only into data streams of the 3G-SDI but also into data streams of 6G-SDI and 12G-SDI that SMPTE have recently started to deliberate, and supplied to the multiplexing units.

For example, according to the first and second embodiments, the 8K signal can be mapped into 3G-SDIs on 32 channels. According to the third embodiment, the 8K signal can be mapped into 3G-SDIs on 16 channels. According to the fifth embodiment, the 4K RAW signal can be mapped into 3G-SDIs on 16 channels.

Note that, the 3G-SDIs are obtained basically by word interleaving of HD-SDIs, and hence transmission data streams can be generated by the same process as that for mapping the video signals into the HD-SDIs. Further, ancillary data and extra pixels only have to be multiplexed into horizontal ancillary data areas of HD-SDIs prior to generation of the 3G-SDIs.

Further, combinations of the data streams (HD-SDIs, 3G-SDIs, or basic streams) to be multiplexed into the transmission data streams are not limited to those in the examples described above, and may be arbitrarily set.

For example, in the example described in the first embodiment, the transmission data stream in the first lane is generated from the HD-SDIs on the channels 1 to 16, the transmission data stream in the second lane is generated from the HD-SDIs on the channels 17 to 32, the transmission data stream in the third lane is generated from the HD-SDIs on the channels 33 to 48, and the transmission data stream in the fourth lane is generated from the HD-SDIs on the channels 49 to 64.

Alternatively, for example, the transmission data streams in the first and second lanes may be generated from the channels 1 to 32, the transmission data streams in the third and fourth lanes may be generated from the channels 33 to 64, or the transmission data streams in the first to fourth lanes may be generated from the channels 1 to 64. In the former case, for example, the HD-SDIs on the channels 1 to 32 are multiplexed into the transmission data stream in the first lane and the transmission data stream in the second lane. Further, in the latter case, for example, the HD-SDIs on the channels 1 to 64 are multiplexed into the transmission data streams in the first to fourth lanes.

Further, for example, of the HD-SDIs on the channels 1 to 32, HD-SDIs on odd-numbered channels may be multiplexed into the transmission data stream in the first lane, and HD-SDIs on even-numbered channels may be multiplexed into the transmission data stream in the second lane.

Note that, the multiplexing methods for ancillary data and extra pixels are varied in accordance with patterns of the combinations of the data streams to be multiplexed into the transmission data streams.

Still further, for example, in the first to sixth embodiments, the HD-SDIs on odd-numbered channels and the HD-SDIs on even-numbered channels may be replaced with each other. Specifically, in the first embodiment, the HD-SDIs on the even-numbered channels may be scrambled, and the HD-SDIs on the odd-numbered channels may be subjected to 8B/10B conversion.

Yet further, clock frequencies of the clock signals in the multiplexing units of the broadcasting cameras are not limited to those in the examples described above. Specifically, the clock signal of 148.5/1.001 MHz may be used instead of the clock signal of 148.5 MHz, or a clock signal of 167.0625/1.001 MHz may be used instead of the clock signal of 167.0625 MHz. Alternatively, a clock signal of 297/1.001 MHz may be used instead of the clock signal of 297 MHz.

Yet further, the word lengths of the parallel transmission data streams to be supplied from the data stream generating units to the P/S conversion unit 134 are not limited to the 160 bits described above. Specifically, the word lengths may be set to other word lengths that can be input to the P/S conversion unit 134, such as 80 bits and 40 bits.

In this case, for example, a clock frequency z of a clock signal for operating a data stream generating unit only has to be set to have a bit of x (bps)÷y, where x (bps) is a bit rate of a data stream to be input to the data stream generating unit, and y is a word length of a transmission data stream to be output from the data stream generating unit. Specifically, in a case where the data stream to be input to the data stream generating unit has a bit rate of 180 bits×148.5 MHz, the clock frequency z only has to be set to have a bit of 180 bits×148.5 MHz÷y. Further, specifically, in a case where the data stream to be input to the data stream generating unit has a bit rate of 180 bits×148.5/1.001 MHz, the clock frequency z only has to be set to have a bit of 180 bits×148.5/1.001 MHz÷y.

(Configuration Example of Computer)

A series of the processes described above may be executed by hardware or by software. In a case of executing the series of processes by using the software, programs of the software are installed to the computer. Examples of the computer include a computer incorporated in dedicated hardware, and a general purpose personal computer capable of exerting various functions with various programs installed thereto.

Figure 70:
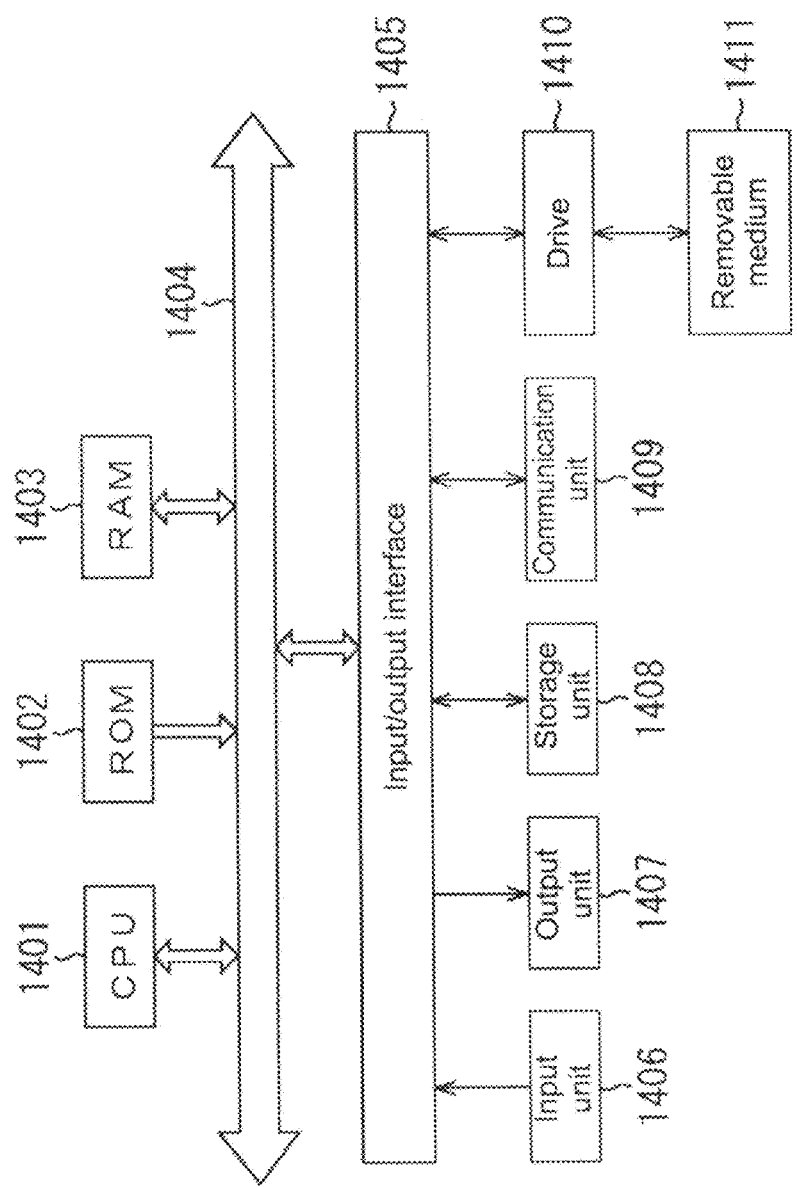
FIG. 70 is a block diagram showing a configuration example of a computer.

FIG. 70 is a block diagram showing a configuration example of hardware of a computer configured to execute the series of processes described above with programs.

In the computer, a CPU (Central Processing Unit) 1401, a ROM (Read Only Memory) 1402, a RAM (Random Access Memory) 1403 are interconnected to each other with a bus 1404.

An input/output interface 1405 is also connected to the bus 1404. An input unit 1406, an output unit 1407, a storage unit 1408, a communication unit 1409, and a drive 1410 are connected to the input/output interface 1405.

Examples of the input unit 1406 include a keyboard, a mouse, and a microphone. Examples of the output unit 1407 include a display and a speaker. Examples of the storage unit 1408 include a hard disk and a non-volatile memory. Examples of the communication unit 1409 include a network interface. The drive 1410 drives removable media 1411 such as a magnetic disc, an optical disc, a magneto optical disc, or a semiconductor memory.

In the computer configured as described above, for example, the CPU 1401 loads programs stored in the storage unit 1408 to the RAM 1403 via the input/output interface 1405 and the bus 1404, and executes the programs. In this way, the series of processes described above is executed.

The programs to be executed by the computer (CPU 1401) may be provided, for example, as data recoded in the removable medium 1411 in the form of a packaged medium and the like. Alternatively, the programs may be provided via wired or wireless transmission media such as a local area network, the Internet, and digital satellite broadcasting.

In the computer, the programs may be installed from the removable media 1411, which are mounted to the drive 1410, to the storage unit 1408 via the input/output interface 1405. Alternatively, the programs may be received with the communication unit 1409 via wired and wireless transmission media, and installed to the storage unit 1408. Still alternatively, the programs may be pre-installed in the ROM 1402 or the storage unit 1408.

Note that, the programs to be executed by the computer may be executed in time series in the order described in this specification, or may be executed parallel to each other or at necessary timings such as a timing of a call.

Further, in this specification, the "system" refers to a collection of a plurality of components (such as apparatus and modules (parts)), and all the components need not necessarily be provided in the same casing. Thus, both a plurality of apparatus that are connected to each other via a network while being contained respectively in their casings, and a single apparatus that has a single casing containing a plurality of modules are encompassed in the definition of the "system."

In addition, the embodiments of the present disclosure are not limited to the embodiments described above, and various modifications may be made thereto without departing from the gist of the present disclosure.

For example, Steps described above with reference to the flowcharts may be executed in a single apparatus, or may be shared with and executed in a plurality of apparatus.

Still further, in a case where a plurality of processes are contained in a single Step, the plurality of processes contained in the single Step may be executed in a single apparatus, or may be shared with and executed in a plurality of apparatus.

Note that, the present disclosure may employ the following configurations.

(1) A signal processing apparatus, including:
   a mapping unit configured to map one of an 8K video signal and a 4K video signal into SDI data streams on a plurality of channels, the SDI data streams on the plurality of channels each conforming to a predetermined Serial Digital Interface (SDI) format; and
   multiplexing units configured to perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

(2) The signal processing apparatus according to Item (1), in which
   the mapping unit maps one of
   an 8K video signal of 48P-60P/4:4:4/10 bits,
   an 8K video signal of 48P-60P/4:4:4/12 bits, and
   an 8K video signal of 48P-60P/4:2:2/12 bits into one of
      first SDI data streams on 64 channels, the first SDI data streams on the 64 channels each conforming to an HD-SDI format, and
      second SDI data streams on 32 channels, the second SDI data streams on the 32 channels each conforming to a 3G-SDI format, and
   the multiplexing units each
   perform the 8B/10B conversion in units of 40 bits of the one of
      the first SDI data streams on any one of odd-numbered channels and even-numbered channels of the 64 channels, and
      the second SDI data streams on any one of odd-numbered channels and even-numbered channels of the 32 channels,
   extract 32-bit data items from each of the units of 40 bits of the one of
      the first SDI data streams on another of the odd-numbered channels and the even-numbered channels of the 64 channels, and
      the second SDI data streams on another of the odd-numbered channels and the even-numbered channels of the 32 channels,
   perform the 8B/10B conversion of the extracted 32-bit data items, and
   multiplex the one of
      the first SDI data streams on both the odd-numbered channels and the even-numbered channels of the 64 channels subjected to the 8B/10B conversion, and
      the second SDI data streams on both the odd-numbered channels and the even-numbered channels of the 32 channels subjected to the 8B/10B conversion, to thereby generate serial data streams in four lanes as the serial data streams in the plurality of lanes.

(3) The signal processing apparatus according to Item (1), in which
   the mapping unit maps an 8K video signal of 48P-60P/4:2:2/10 bits into one of
      first SDI data streams on 32 channels, the first SDI data streams on the 32 channels each conforming to an HD-SDI format, and
      second SDI data streams on 16 channels, the second SDI data streams on the 16 channels each conforming to a 3G-SDI format, and
   the multiplexing units each
   perform the 8B/10B conversion in units of 40 bits of the one of
      the first SDI data streams on any one of odd-numbered channels and even-numbered channels of the 32 channels, and
      the second SDI data streams on any one of odd-numbered channels and even-numbered channels of the 16 channels,
   perform scrambling in each of the units of 40 bits of the one of
      the first SDI data streams on another of the odd-numbered channels and the even-numbered channels of the 32 channels, and
      the second SDI data streams on another of the odd-numbered channels and the even-numbered channels of the 16 channels, and
   multiplex the one of
      the first SDI data streams on both the odd-numbered channels and the even-numbered channels of the 32 channels respectively subjected to corresponding ones of the 8B/10B conversion and the scrambling, and
      the second SDI data streams on both the odd-numbered channels and the even-numbered channels of the 16 channels respectively subjected to corresponding ones of the 8B/10B conversion and the scrambling, to thereby generate serial data streams in two lanes as the serial data streams in the plurality of lanes.

(4) The signal processing apparatus according to Item (1), in which the mapping unit maps one of
an 8K video signal of 48P-60P/4:4:4/10 bits,
an 8K video signal of 48P-60P/4:4:4/12 bits, and
an 8K video signal of 48P-60P/4:2:2/12 bits into one of
first SDI data streams on 64 channels, the first SDI data streams each conforming to an HD-SDI format, and
second SDI data streams on 32 channels, the second SDI data streams each conforming to a 3G-SDI format, and
the multiplexing units each
perform scrambling in units of 40 bits of the one of
the first SDI data streams on any one of odd-numbered channels and even-numbered channels of the 64 channels, and
the second SDI data streams on any one of odd-numbered channels and even-numbered channels of the 32 channels,
extract 32-bit data items from each of the units of 40 bits of the one of
the first SDI data streams on another of the odd-numbered channels and the even-numbered channels of the 64 channels, and
the second SDI data streams on another of the odd-numbered channels and the even-numbered channels of the 32 channels,
perform the 8B/10B conversion of the extracted 32-bit data items, and
multiplex the one of
the first SDI data streams on both the odd-numbered channels and the even-numbered channels of the 64 channels respectively subjected to corresponding ones of the scrambling and the 8B/10B conversion, and
the second SDI data streams on both the odd-numbered channels and the even-numbered channels of the 32 channels respectively subjected to corresponding ones of the scrambling and the 8B/10B conversion, to thereby generate serial data streams in four lanes as the serial data streams in the plurality of lanes.

(5) The signal processing apparatus according to Item (1), in which the mapping unit maps a 4K RAW signal of 48P-60P/4:4:4/16 bits into one of
first SDI data streams on 32 channels, the first SDI data streams on the 32 channels each conforming to an HD-SDI format, and
second SDI data streams on 16 channels, the second SDI data streams on the 16 channels each conforming to a 3G-SDI format, and
the multiplexing units each
perform the 8B/10B conversion in units of 40 bits of the one of
the first SDI data streams on any one of odd-numbered channels and even-numbered channels of the 32 channels, and
the second SDI data streams on any one of odd-numbered channels and even-numbered channels of the 16 channels,
extract 32-bit data items from each of the units of 40 bits of the one of
the first SDI data streams on another of the odd-numbered channels and the even-numbered channels of the 32 channels, and
the second SDI data streams on another of the odd-numbered channels and the even-numbered channels of the 16 channels,
perform the 8B/10B conversion of the extracted 32-bit data items, and
multiplex the one of
the first SDI data streams on both the odd-numbered channels and the even-numbered channels of the 32 channels subjected to the 8B/10B conversion, and
the second SDI data streams on both the odd-numbered channels and the even-numbered channels of the 16 channels subjected to the 8B/10B conversion, to thereby generate serial data streams in two lanes as the serial data streams in the plurality of lanes.

(6) The signal processing apparatus according to any one of Items (1) to (5), in which the mapping unit maps one of
an 8K video signal at 96P-120P and
a 4K video signal at 96P-120P
into the SDI data streams on the plurality of channels in units of two frames.

(7) The signal processing apparatus according to Item (1), in which
the mapping unit maps one of
an 8K video signal of 50P-60P/4:4:4/10 bits and
an 8K video signal of 50P-60P/4:4:4/12 bits into SDI data streams on 48 channels as the SDI data streams on the plurality of channels, the SDI data streams on the 48 channels each having a 12-bit word length, and
the multiplexing units each
perform the 8B/10B conversion in units of 48 bits of the SDI data streams on the 48 channels, and
multiplex the SDI data streams on the 48 channels subjected to the 8B/10B conversion, to thereby generate serial data streams in four lanes as the serial data streams in the plurality of lanes.

(8) The signal processing apparatus according to Item (1), in which
the mapping unit maps one of
an 8K video signal of 100P-120P/4:4:4/10 bits and
an 8K video signal of 100P-120P/4:4:4/12 bits into SDI data streams on 48 channels as the SDI data streams on the plurality of channels, the SDI data streams on the 48 channels each having a 12-bit word length, and
the multiplexing units each
perform the 8B/10B conversion in units of 48 bits of the SDI data streams on the 48 channels, and
multiplex the SDI data streams on the 48 channels subjected to the 8B/10B conversion, to thereby generate serial data streams in eight lanes as the serial data streams in the plurality of lanes.

(9) The signal processing apparatus according to any one of Items (1) to (8), in which
the multiplexing units are provided as many as the number of lanes of the serial data streams in the plurality of lanes, and
the multiplexing units each include
a plurality of signal processing units configured to
allow the SDI data streams on the plurality of channels to be input respectively to the plurality of signal processing units,
perform one of the 8B/10B conversion and the scrambling of the input SDI data streams on the plurality of channels in the units of the predetermined bit, to thereby generate predetermined-bit data blocks, a data stream generating unit configured to generate a parallel data stream having a predetermined word length by multiplexing, in a predetermined order, the predetermined-bit data blocks generated by the plurality of signal processing units, and a parallel/serial conversion unit configured to perform parallel/serial conversion of the parallel data stream, to thereby generate the serial data streams in the plurality of lanes.

(10) The signal processing apparatus according to Item (9), in which the plurality of signal processing units execute processes in synchronization with one of a clock signal of 148.5 MHz and a clock signal of 148.5/1.001 MHz, and output data of a total of 720 bits in each set of four clocks, the data stream generating unit operates in synchronization with a clock signal of x MHz, and outputs one of parallel data of 180 bits×148.5 MHz÷x MHz (bits) and parallel data of 180 bits×148.5/1.001 MHz÷x MHz (bits) in each clock.

(11) The signal processing apparatus according to Item (9), in which the data stream generating unit multiplexes a predetermined synchronization signal into a head of each line of each of the serial data streams in the plurality of lanes.

(12) The signal processing apparatus according to any one of Items (1) to (11), in which the mapping unit secures an area for multiplexing ancillary data containing audio data within a horizontal ancillary data area of each of the SDI data streams on the plurality of channels, and multiplexes data of pixel samples in extra pixel areas in a horizontal direction of the one of the 8K video signal and the 4K video signal into rest of the horizontal ancillary data area.

(13) The signal processing apparatus according to Items (1) to (11), in which the mapping unit multiplexes ancillary data containing audio data into a horizontal ancillary data area of each of the SDI data streams on predetermined channels of the plurality of channels, and data of pixel samples in extra pixel areas in a horizontal direction of the one of the 8K video signal and the 4K video signal into a horizontal ancillary data area of each of the SDI data streams on other channels of the plurality of channels than the predetermined channels on which the ancillary data is multiplexed.

(14) The signal processing apparatus according to any one of Items (1) to (13), further including a transmission control unit configured to control the serial data streams in the plurality of lanes so that the serial data streams in the plurality of lanes are subjected to wavelength multiplexing and sent via a 100 Gbps Ethernet device.

(15) A signal processing method, including:

mapping one of an 8K video signal and a 4K video signal into SDI data streams on a plurality of channels, the SDI data streams on the plurality of channels each conforming to a predetermined SDI format;

performing one of 8B/10B conversion and scrambling of the SDI data streams on the plurality of channels in units of a predetermined bit; and multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

(16) A program for causing a computer to execute a process including:

mapping one of an 8K video signal and a 4K video signal into SDI data streams on a plurality of channels, the SDI data streams on the plurality of channels each conforming to a predetermined SDI format;

performing one of 8B/10B conversion and scrambling of the SDI data streams on the plurality of channels in units of a predetermined bit; and multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps.

(17) A signal processing apparatus, including:

a data stream reproducing unit configured to reproduce SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and a video reproducing unit configured to reproduce the one of the 8K video signal and the 4K video signal from the SDI data streams on the plurality of channels.

(18) A signal processing method, including:

reproducing SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and reproducing the one of the 8K video signal and the 4K video signal from the SDI data streams on the plurality of channels.

(19) A program for causing a computer to execute a process including:

reproducing SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps; and reproducing the one of the 8K video signal and the 4K video signal from the SDI data streams on the plurality of channels.

(20) A signal transmission system, including:
a signal transmission apparatus including
a mapping unit configured to map one of an 8K video signal and a 4K video signal into SDI data streams on a plurality of channels, the SDI data streams on the plurality of channels each conforming to a predetermined SDI format,
multiplexing units configured to perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps, and
a transmission control unit configured to control sending of the serial data streams in the plurality of lanes; and
a signal receiving apparatus including
a reception control unit configured to control reception of the serial data streams in the plurality of lanes,
a data stream reproducing unit configured reproduce the SDI data streams on the plurality of channels from the serial data streams in the plurality of lanes, and
a video reproducing unit configured to reproduce the one of the 8K video signal and the 4K video signal from the SDI data streams on the plurality of channels.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus, comprising:
circuitry configured to:
map one of an 8K video signal and a 4K video signal into Serial Digital Interface (SDI) data streams on a plurality of channels, the SDI data streams on the plurality of channels each conforming to a predetermined SDI format;
perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps; and
secure an area for multiplexing ancillary data containing audio data within a horizontal ancillary data area of each of the SDI data streams on the plurality of channels.

2. The signal processing apparatus according to claim 1, wherein the circuitry is configured to:
an 8K video signal of 48P-60P/4:4:4/10 bits,
an 8K video signal of 48P-60P/4:4:4/12 bits, and
an 8K video signal of 48P-60P/4:2:2/12 bits into one of first SDI data streams on 64 channels, the first SDI data streams on the 64 channels each conforming to an HD-SDI format, and
second SDI data streams on 32 channels, the second SDI data streams on the 32 channels each conforming to a 3G-SDI format,
perform the 8B/10B conversion in units of 40 bits of the one of
the first SDI data streams on any one of odd-numbered channels and even-numbered channels of the 64 channels, and
the second SDI data streams on any one of odd-numbered channels and even-numbered channels of the 32 channels,
extract 32-bit data items from each of the units of 40 bits of the one of
the first SDI data streams on another of the odd-numbered channels and the even-numbered channels of the 64 channels, and
the second SDI data streams on another of the odd-numbered channels and the even-numbered channels of the 32 channels,
perform the 8B/10B conversion of the extracted 32-bit data items, and
multiplex the one of
the first SDI data streams on both the odd-numbered channels and the even-numbered channels of the 64 channels subjected to the 8B/10B conversion, and
the second SDI data streams on both the odd-numbered channels and the even-numbered channels of the 32 channels subjected to the 8B/10B conversion, to thereby generate serial data streams in four lanes as the serial data streams in the plurality of lanes.

3. The signal processing apparatus according to claim 1, wherein the circuitry is configured to:
map an 8K video signal of 48P-60P/4:2:2/10 bits into one of
first SDI data streams on 32 channels, the first SDI data streams on the 32 channels each conforming to an HD-SDI format, and
second SDI data streams on 16 channels, the second SDI data streams on the 16 channels each conforming to a 3G-SDI format,
perform the 8B/10B conversion in units of 40 bits of the one of
the first SDI data streams on any one of odd-numbered channels and even-numbered channels of the 32 channels, and
the second SDI data streams on any one of odd-numbered channels and even-numbered channels of the 16 channels,
perform scrambling in each of the units of 40 bits of the one
the first SDI data streams on another of the odd-numbered channels and the even-numbered channels of the 32 channels, and
the second SDI data streams on another of the odd-numbered channels and the even-numbered channels of the 16 channels, and
multiplex the one of
the first SDI data streams on both the odd-numbered channels and the even-numbered channels of the 32 channels respectively subjected to corresponding ones of the 8B/10B conversion and the scrambling, and
the second SDI data streams on both the odd-numbered channels and the even-numbered channels of the 16 channels respectively subjected to corresponding ones of the 8B/10B conversion and the scrambling, to thereby generate serial data streams in two lanes as the serial data streams in the plurality of lanes.

4. The signal processing apparatus according to claim 1, wherein the circuitry is configured to:
  map one of
    an 8K video signal of 48P-60P/4:4:4/10 bits,
    an 8K video signal of 48P-60P/4:4:4/12 bits, and
    an 8K video signal of 48P-60P/4:2:2/12 bits into one of
      first SDI data streams on 64 channels, the first SDI data streams each conforming to an HD-SDI format, and
      second SDI data streams on 32 channels, the second SDI data streams each conforming to a 3G-SDI format,
  perform scrambling in units of 40 bits of the one of
    the first SDI data streams on any one of odd-numbered channels and even-numbered channels of the 64 channels, and
    the second SDI data streams on any one of odd-numbered channels and even-numbered channels of the 32 channels,
  extract 32-bit data items from each of the units of 40 bits of the one of
    the first SDI data streams on another of the odd-numbered channels and the even-numbered channels of the 64 channels, and
    the second SDI data streams on another of the odd-numbered channels and the even-numbered channels of the 32 channels,
  perform the 8B/10B conversion of the extracted 32-bit data items, and multiplex the one of
    the first SDI data streams on both the odd-numbered channels and the even-numbered channels of the 64 channels respectively subjected to corresponding ones of the scrambling and the 8B/10B conversion, and
    the second SDI data streams on both the odd-numbered channels and the even-numbered channels of the 32 channels respectively subjected to corresponding ones of the scrambling and the 8B/10B conversion, to thereby generate serial data streams in four lanes the serial data streams in the plurality of lanes.

5. The signal processing apparatus according to claim 1, wherein the circuitry is configured to:
  map a 4K RAW signal of 48P-60P/4:4:4/16 bits into one of
    first SDI data streams on 32 channels, the first SDI data streams on the 32 channels each conforming to an HD-SDI format, and
    second SDI data streams on 16 channels, the second SDI data streams on the 16 channels each conforming to a 3G-SDI format,
  perform the 8B/10B conversion in units of 40 bits of the one of
    the first SDI data streams on any one of odd-numbered channels and even-numbered channels of the 32 channels, and
    the second SDI data streams on any one of odd-numbered channels and even-numbered channels of the 16 channels,
  extract 32-bit data items from each of the units of 40 bits of the one of
    the first SDI data streams on another of the odd-numbered channels and the even-numbered channels of the 32 channels, and
    the second SDI data streams on another of the odd-numbered channels and the even-numbered channels of the 16 channels,
  perform the 8B/10B conversion of the extracted 32-bit data items, and multiplex the one of
    the first SDI data streams on both the odd-numbered channels and the even-numbered channels of the 32 channels subjected to the 8B/10B conversion, and
    the second SDI data streams on both the odd-numbered channels and the even-numbered channels of the 16 channels subjected to the 8B/10B conversion, to thereby generate serial data streams in two lanes as the serial data streams in the plurality of lanes.

6. The signal processing apparatus according to claim 1, wherein the circuitry is configured to map one of
  an 8K video signal at 96P-120P and
  a 4K video signal at 96P-120P
into the SDI data streams on the plurality of channels in units of two frames.

7. The signal processing apparatus according to claim 1, wherein the circuitry is configured to:
  map one of
    an 8K video signal of 50P-60P/4:4:4/10 bits and
    an 8K video signal of 50P-60P/4:4:4/12 bits into SDI data streams on 48 channels as the SDI data streams on the plurality of channels, the SDI data streams on the 48 channels each having a 12-bit word length,
  perform the 8B/10B conversion in units of 48 bits of the SDI data streams on the 48 channels, and
  multiplex the SDI data streams on the 48 channels subjected to the 8B/10B conversion, to thereby generate serial data streams in four lanes as the serial data streams in the plurality of lanes.

8. The signal processing apparatus according to claim 1, wherein the circuitry is configured to:
  map one of
    an 8K video signal of 100P-120P/4:4:4/10 bits and
    an 8K video signal of 100P-120P/4:4:4/12 bits
  into SDI data streams on 48 channels as the SDI data streams on the plurality of channels, the SDI data streams on the 48 channels each having a 12-bit word length,
  perform the 8B/10B conversion in units of 48 bits of the SDI data streams on the 48 channels, and
  multiplex the SDI data streams on the 48 channels subjected to the 8B/10B conversion, to thereby generate serial data streams in eight lanes as the serial data streams in the plurality of lanes.

9. The signal processing apparatus according to claim 1, wherein
  the circuitry is configured to:
    allow the SDI data streams on the plurality of channels to be input respectively to the plurality of signal processing units,
    perform one of the 8B/10B conversion and the scrambling of the input SDI data streams on the plurality of channels in the units of the predetermined bit, to thereby generate predetermined-bit data blocks,
    generate a parallel data stream having a predetermined word length by multiplexing, in a predetermined order, the predetermined-bit data blocks generated by the plurality of signal processing units, and
    perform parallel/serial conversion of the parallel data stream, to thereby generate the serial data streams in the plurality of lanes.

10. The signal processing apparatus according to claim 9, wherein the circuitry is configured to:

execute processes in synchronization with one of a clock signal of 148.5 MHz and a clock signal of 148.5/1.001 MHz, output data of a total of 720 bits in each set of four clocks, operate in synchronization with a clock signal of x MHz, and output one of parallel data of 180 bits×148.5 MHz÷x MHz (bits) and parallel data of 180 bits×148.5/1.001 MHz÷x MHz (bits) in each clock.

11. The signal processing apparatus according to claim 9, wherein the circuitry is configured to multiplex a predetermined synchronization signal into a head of each line of each of the serial data streams in the plurality of lanes.

12. The signal processing apparatus according to claim 1, wherein the circuitry is configured to:

multiplex data of pixel samples in extra pixel areas in a horizontal direction of the one of the 8K video signal and the 4K video signal into rest of the horizontal ancillary data area.

13. The signal processing apparatus according to claim 1, wherein the circuitry is configured to multiplex the ancillary data containing audio data into the horizontal ancillary data area of each of the SDI data streams on predetermined channels of the plurality of channels, and data of pixel samples in extra pixel areas in a horizontal direction of the one of the 8K video signal and the 4K video signal into a horizontal ancillary data area of each of the SDI data streams on other channels of the plurality of channels than the predetermined channels on which the ancillary data is multiplexed.

14. The signal processing apparatus according to claim 1, wherein the circuitry is configured to control the serial data streams in the plurality of lanes so that the serial data streams in the plurality of lanes are subjected to wavelength multiplexing and sent via a 100 Gbps Ethernet device.

15. A signal processing method, comprising:

mapping one of an 8K video signal and a 4K video signal into SDI data streams on a plurality of channels, the SDI data streams on the plurality of channels each conforming to a predetermined SDI format;

performing one of 8B/10B conversion and scrambling of the SDI data streams on the plurality of channels in units of a predetermined bit;

multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps; and securing an area for multiplexing ancillary data containing audio data within a horizontal ancillary data area of each of the SDI data streams on the plurality of channels.

16. A non-transitory computer readable medium having a computer program recorded thereon, the computer program configured to perform a method when executed on a computer, the method comprising:

mapping one of an 8K video signal and a 4K video signal into SDI data streams on a plurality of channels, the SDI data streams on the plurality of channels each conforming to a predetermined SDI format;

performing one of 8B/10B conversion and scrambling of the SDI data streams on the plurality of channels in units of a predetermined bit;

multiplexing the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps; and securing an area for multiplexing ancillary data containing audio data within a horizontal ancillary data area of each of the SDI data streams on the plurality of channels.

17. A signal processing apparatus, comprising:

circuitry configured to:

reproduce SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, performing one of 8B/10B conversion and scrambling of the SDI data streams on the plurality of channels in nits of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 GBps;

secure an area for multiplexing ancillary data containing audio data within a horizontal ancillary data each of the SDI data streams on the plurality of channels; and reproduce the one of the 8K video signal and the 4K video signal from the SDI data streams on the plurality of channels.

18. A signal processing method, comprising:

reproducing SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps;

securing an area for multiplexing ancillary data containing audio data within a horizontal ancillary data area of each of the SDI data streams on the plurality of channels; and reproducing the one of the 8K video signal and the 4K video signal from the SDI data streams on the plurality of channels.

19. A non-transitory computer readable medium having a computer program recorded thereon, the computer program configured to perform a method when executed on a computer, the method comprising:

reproducing SDI data streams on a plurality of channels from serial data streams in a plurality of lanes, the serial data streams in the plurality of lanes being generated by mapping one of an 8K video signal and a 4K video signal into the SDI data streams on the plurality of channels, the SDI data streams on the plurality of channels each conforming to a predetermined SDI format, and performing one of 8B/10B conversion and scrambling of the SDI data streams on the plurality of channels in units of a predetermined bit, and multiplexing the SDI data streams on the plurality of channels subjected to the one of the 8B/10B conversion and the scrambling, the serial data streams in the plurality of lanes each having a bit rate within a range of from 25 Gbps to 28.3 Gbps;

securing an area for multiplexing ancillary data containing audio data within a horizontal ancillary data area of each of the SDI data streams on the plurality of channels: and reproducing the one of the 8K video signal and the 4K video signal from the SDI data streams on the plurality of channels.

20. A signal transmission system, comprising:

a signal transmission apparatus including circuitry configured to:

map one of an 8K video signal and a 4K video signal into SDI data streams on a plurality of channels, the SDI data streams on the plurality of channels each conforming to a predetermined SDI format, perform one of 8B/10B conversion and scrambling of the SDI data streams on the plurality of channels in units of a predetermined bit, and multiplex the SDI data streams on the plurality of channels subjected to the one of the 8B/10B conversion and the scrambling, to thereby generate serial data streams in a plurality of lanes, the serial data streams in the plurality of lanes each having a bit rate within a range of from 25 Gbps to 28.3 Gbps, secure an area for multiplexing ancillary data containing audio data within a horizontal ancillary data area of each of the SDI data streams on the plurality of channels, and control sending of the serial data streams in the plurality of lanes: and a signal receiving apparatus including circuitry configured to:

control reception of the serial data streams in the plurality of lanes, reproduce the SDI data streams on the plurality of channels from the serial data streams in the plurality of lanes, and reproduce the one of the 8K video signal and the 4K video signal from the SDI data streams on the plurality of channels.

* * * * *